(12) United States Patent
Tanaka et al.

(10) Patent No.: US 9,704,081 B2
(45) Date of Patent: Jul. 11, 2017

(54) INFORMATION CODE, INFORMATION CODE PRODUCING METHOD, INFORMATION CODE READER, AND SYSTEM WHICH USES INFORMATION CODE

(71) Applicant: DENSO WAVE INCORPORATED, Chita-gun, Aichi-pref. (JP)

(72) Inventors: Masami Tanaka, Handa (JP); Takuya Yoda, Obu (JP); Kunihiko Ito, Chiryu (JP); Motoaki Watabe, Toyokawa (JP); Kenichi Yoshida, Obu (JP); Takao Ushijima, Toyoake (JP)

(73) Assignee: DENSO WAVE INCORPORATED, Aichi-pref. (JP)

( * ) Notice: Subject to any disclaimer, the term of this patent is extended or adjusted under 35 U.S.C. 154(b) by 0 days.

(21) Appl. No.: 14/654,119

(22) PCT Filed: Dec. 18, 2013

(86) PCT No.: PCT/JP2013/083909
§ 371 (c)(1),
(2) Date: Oct. 6, 2015

(87) PCT Pub. No.: WO2014/098133
PCT Pub. Date: Jun. 26, 2014

(65) Prior Publication Data
US 2016/0042262 A1 Feb. 11, 2016

(30) Foreign Application Priority Data

Dec. 19, 2012 (JP) .................................. 2012-276910
Jan. 23, 2013 (JP) .................................. 2013-010222
(Continued)

(51) Int. Cl.
*G06K 19/06* (2006.01)
*G06K 1/12* (2006.01)
(Continued)

(52) U.S. Cl.
CPC ......... *G06K 19/06056* (2013.01); *G06K 1/12* (2013.01); *G06K 7/1417* (2013.01);
(Continued)

(58) Field of Classification Search
USPC ................................. 235/494; 382/165, 181
See application file for complete search history.

(56) References Cited

U.S. PATENT DOCUMENTS 5,541,396 A 7/1996 Rentsch
2007/0277150 A1 11/2007 Oouchi
(Continued)

FOREIGN PATENT DOCUMENTS

JP 2001-256501 A 9/2001
JP 2004-206674 A 7/2004
(Continued)

OTHER PUBLICATIONS

"Information technology—automatic identification and data capture techniques—QR code 2005 bar code symbology specification" International Standard ISO/IEC 18004; Second Edition; Sep. 1, 2006; Annex M; pp. 109.
(Continued)

*Primary Examiner* — Allyson Trail
(74) *Attorney, Agent, or Firm* — Oliff PLC

(57) ABSTRACT

An information code producing apparatus produces a free space inside the code region of an information code arranged on a medium such as sheets of paper. The free space is arranged at a position other than specification pattern regions. Data being interpreted, which are expressed by cells, are not recorded in the free space. The free space has a preset size which is larger than that of a single cell. The information code producing apparatus detects the size of this free space by, at least, either selection from a plurality of
(Continued)

candidate shapes prepared in advance or input of shape designating information provided from the outside.

20 Claims, 59 Drawing Sheets

(30) Foreign Application Priority Data

| Mar. 27, 2013 | (JP) | ................................. 2013-065835 |
| Sep. 20, 2013 | (JP) | ................................. 2013-195348 |
| Nov. 19, 2013 | (JP) | ................................. 2013-239366 |
| Dec. 10, 2013 | (JP) | ................................. 2013-255485 |

(51) Int. Cl.
  *G06K 7/14* (2006.01)
  *G06K 9/32* (2006.01)
(52) U.S. Cl.
  CPC ......... *G06K 7/1439* (2013.01); *G06K 9/3216* (2013.01); *G06K 19/06037* (2013.01); *G06K 19/06103* (2013.01); *G06K 19/06112* (2013.01); *G06K 19/06075* (2013.01)

(56) References Cited

U.S. PATENT DOCUMENTS

| 2007/0279474 A1* | 12/2007 | Sato | ....................... G06K 1/126 |
| | | | 347/110 |
| 2008/0000991 A1* | 1/2008 | Yin | ....................... G06K 1/123 |
| | | | 235/494 |
| 2009/0242649 A1 | 10/2009 | Mizukoshi et al. | |
| 2010/0310161 A1* | 12/2010 | Horovitz | .............. H04N 1/6033 |
| | | | 382/165 |
| 2013/0112760 A1* | 5/2013 | Schory | ............. G06K 19/06037 |
| | | | 235/494 |
| 2016/0055404 A1* | 2/2016 | Azuma | ............ G06K 19/06103 |
| | | | 235/494 |
| 2016/0189016 A1* | 6/2016 | Windmueller | ... G06K 19/06037 |
| | | | 235/494 |

FOREIGN PATENT DOCUMENTS

| JP | 2007-241327 A | 9/2007 |
| JP | 2008-152334 A | 7/2008 |
| JP | 2009-129410 A | 6/2009 |
| JP | 2009-259192 A | 11/2009 |
| JP | 2012-164236 A | 8/2012 |
| JP | 5057560 B2 | 10/2012 |
| WO | 2007/107533 A2 | 9/2007 |

OTHER PUBLICATIONS

Feb. 25, 2014 International Search Report issued in International Patent Application No. PCT/JP2013/083909.

Jul. 2, 2015 International Preliminary Report on Patentability issued in International Patent Application No. PCT/JP2013/083909.

\* cited by examiner

FIG.10
(A)
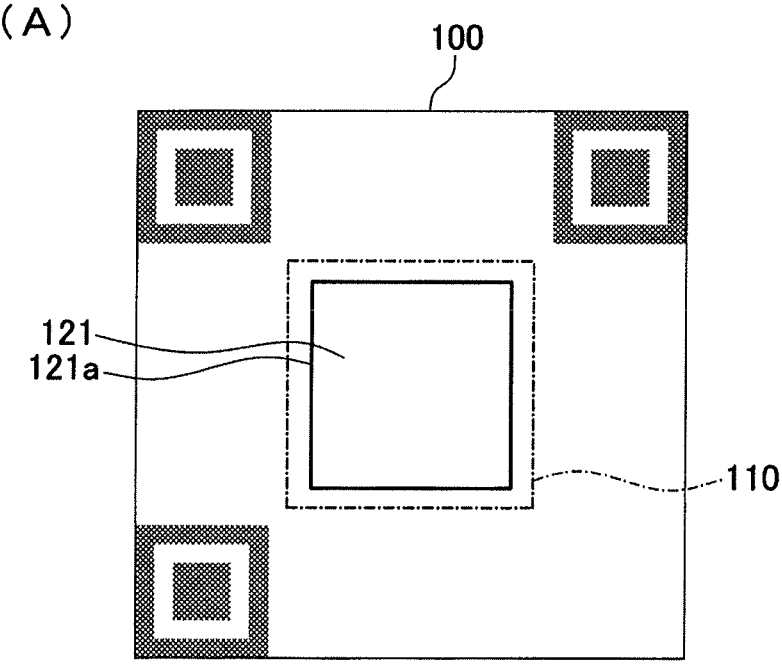
(B)
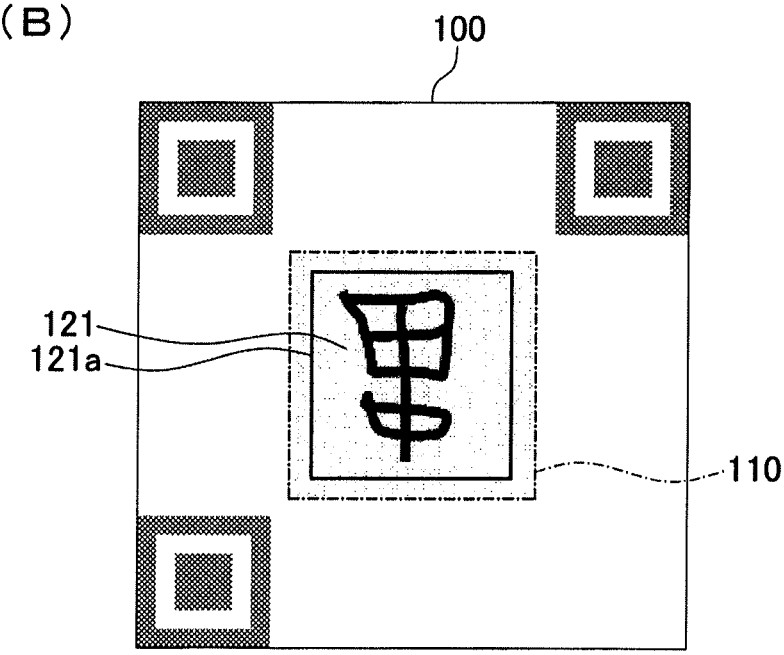

FIG.12
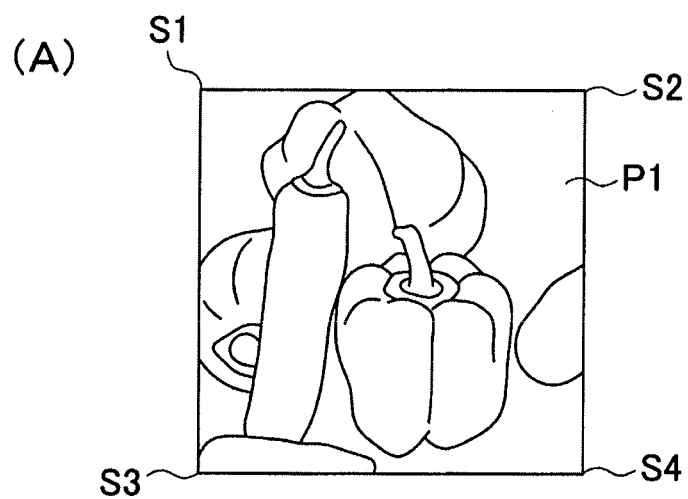
(A)
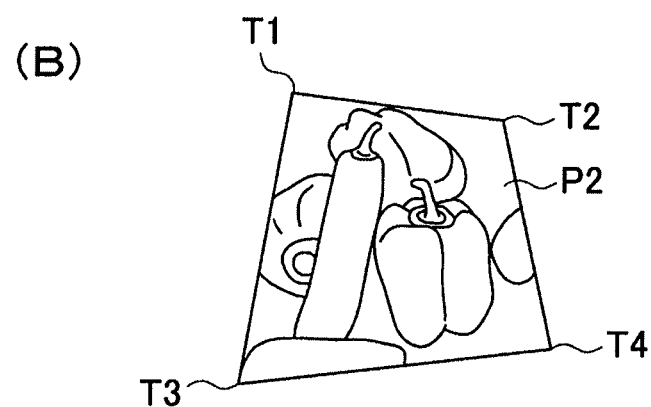
(B)

FIG.16
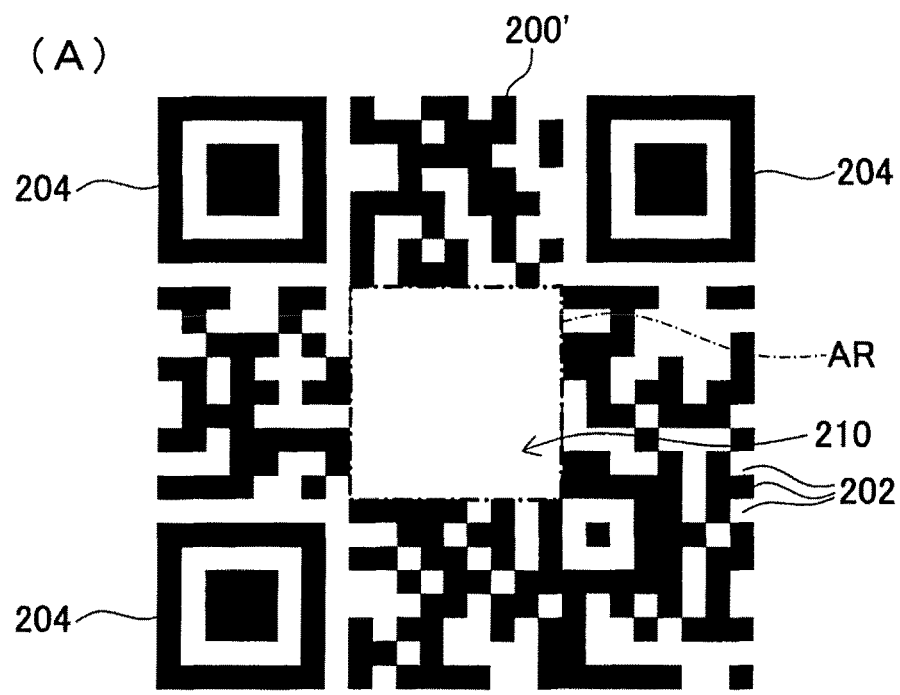
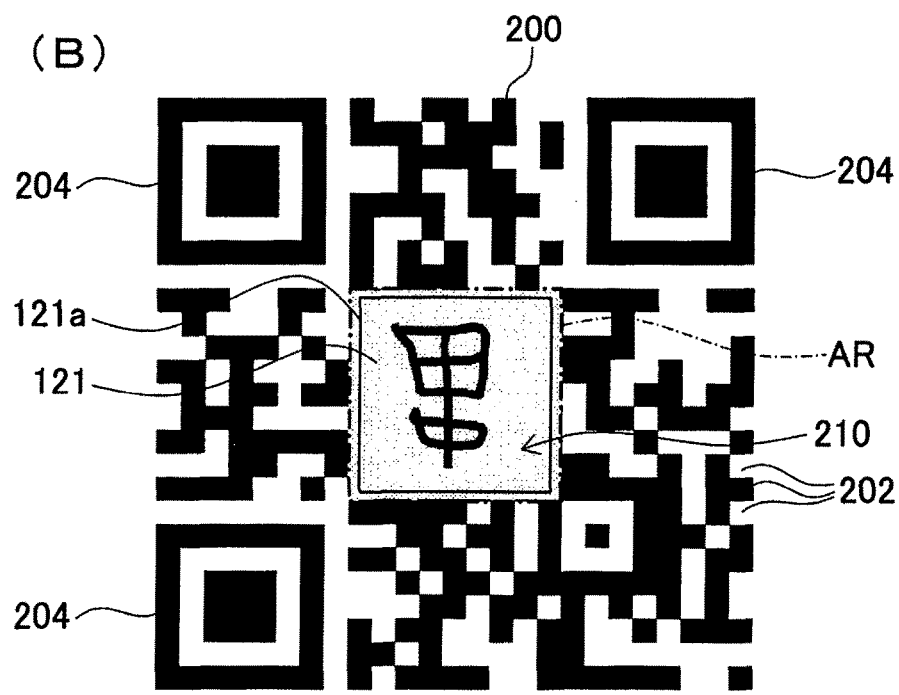

FIG.17
(A)
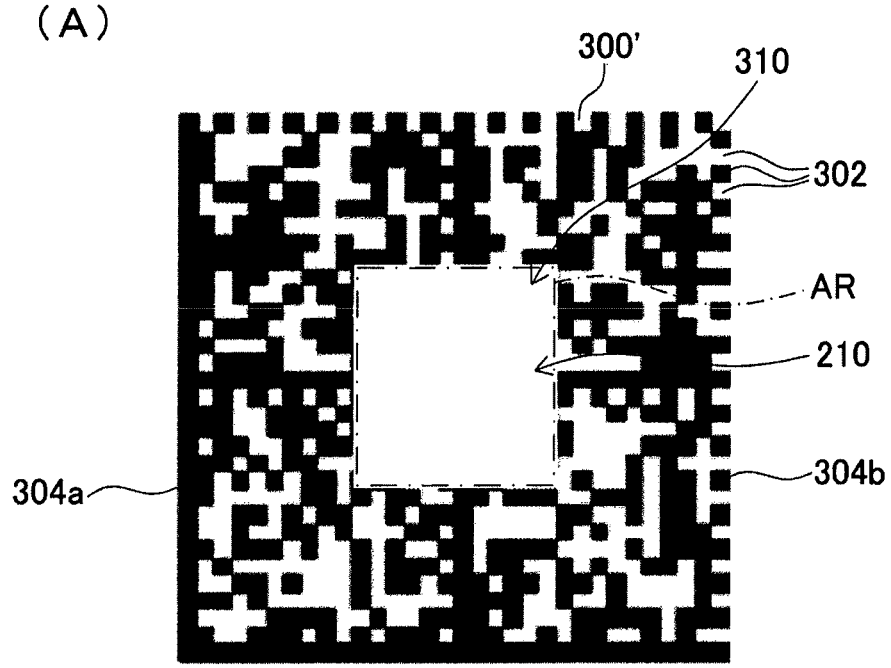
(B)
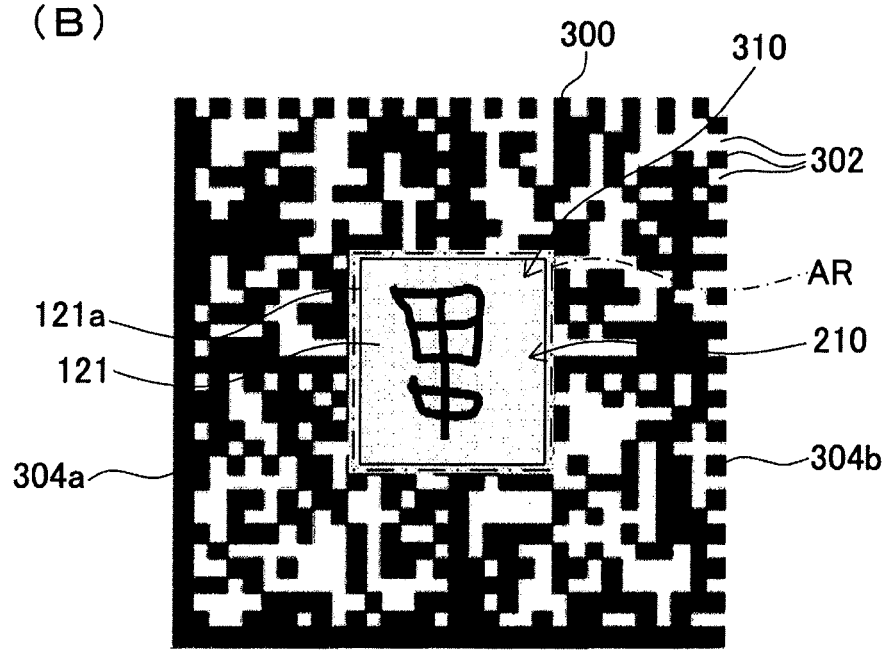

FIG.18
(A)
(B)
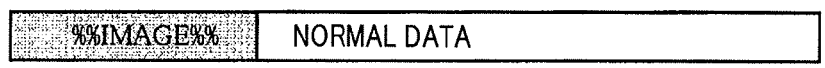

FIG.19
(A)
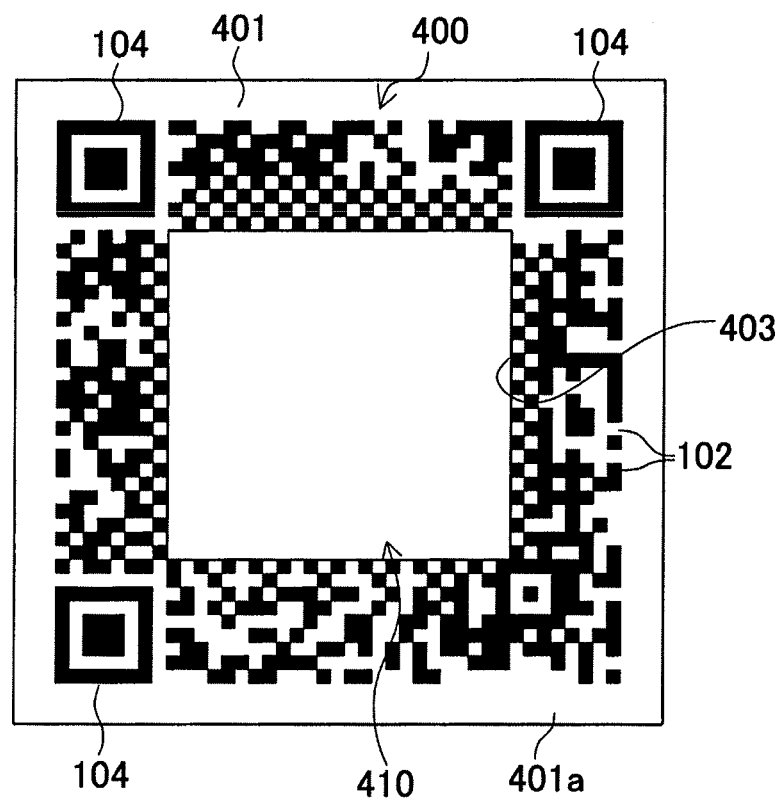
(B)
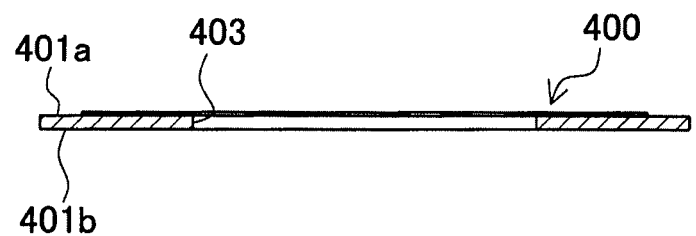

FIG.21
(A)
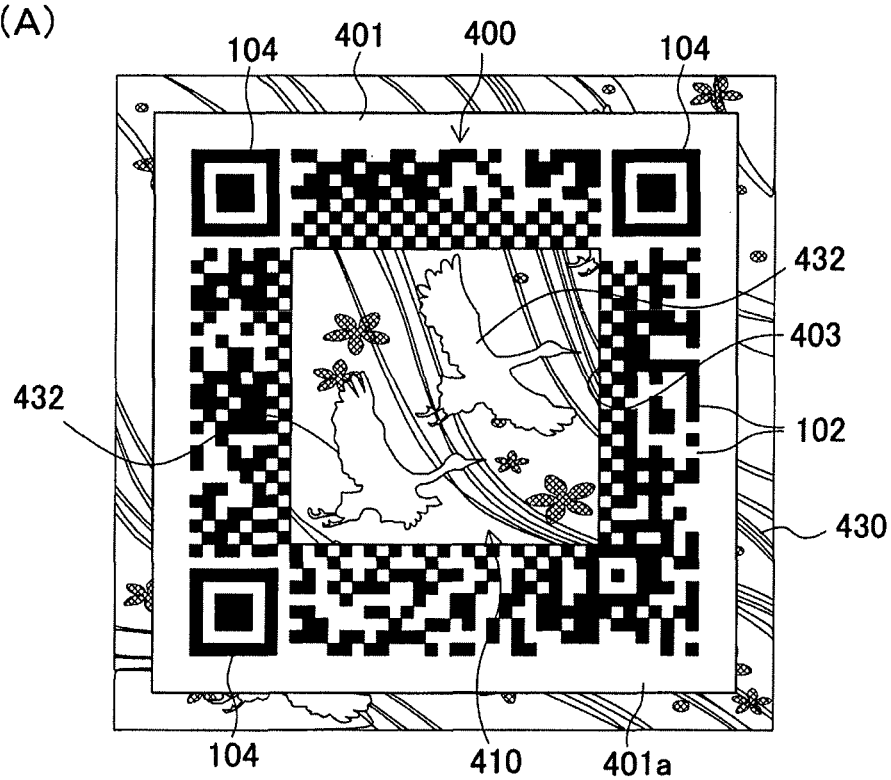
(B)
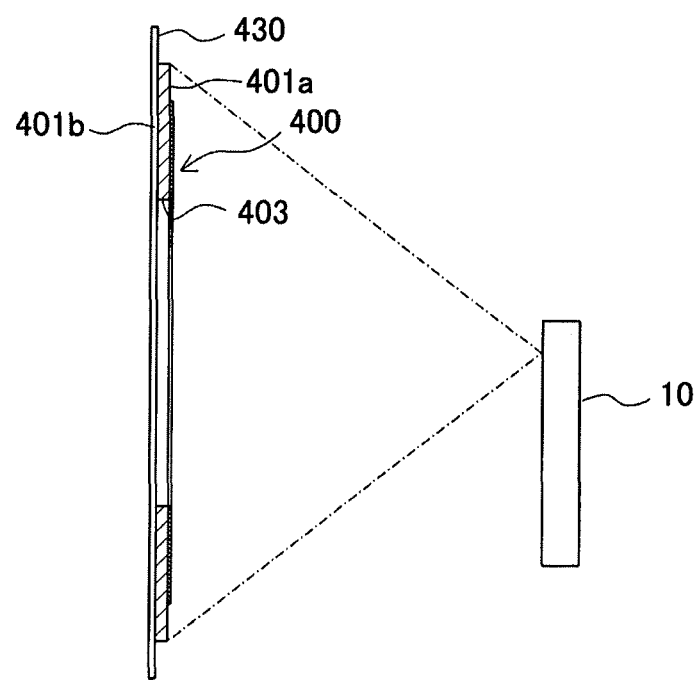

FIG.22
(A)
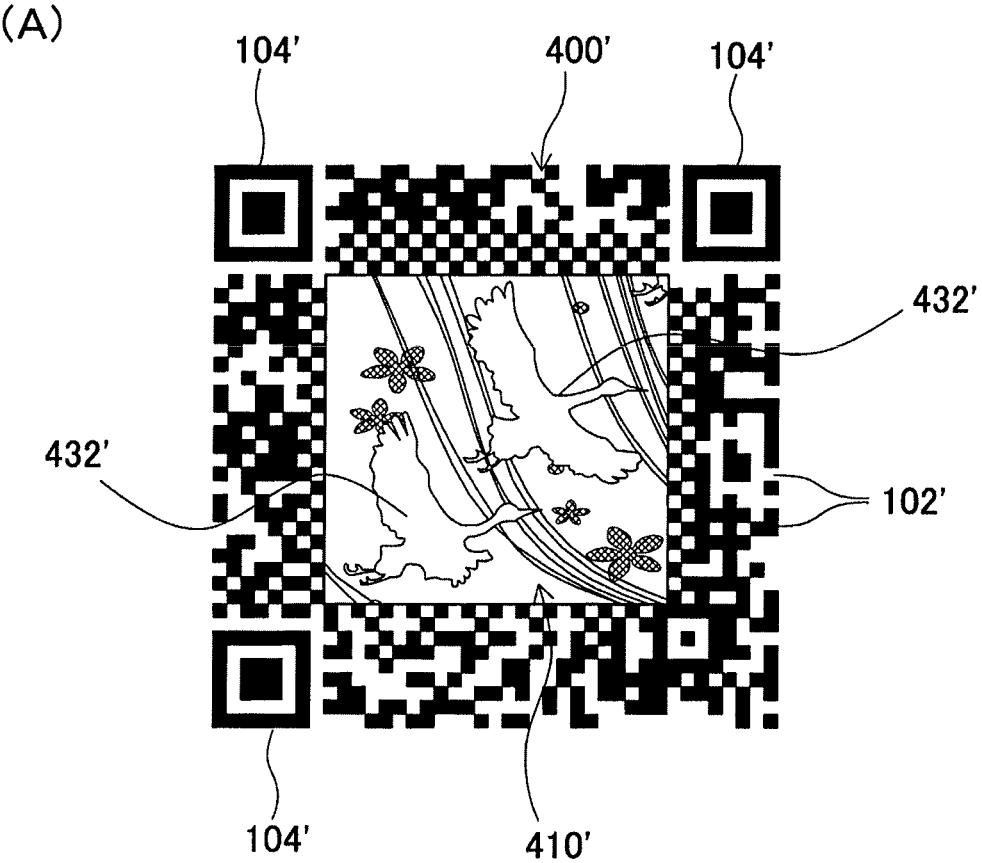
(B)
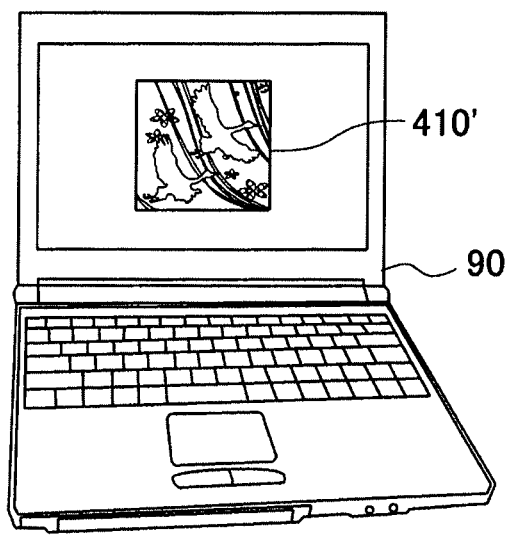

FIG.24
(A)
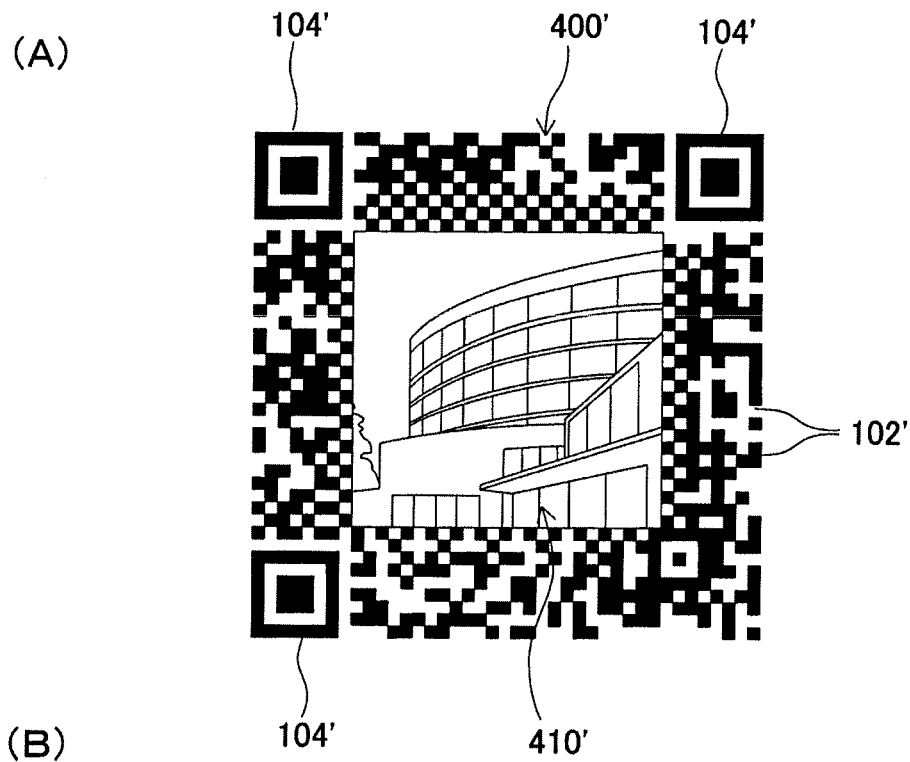
(B)
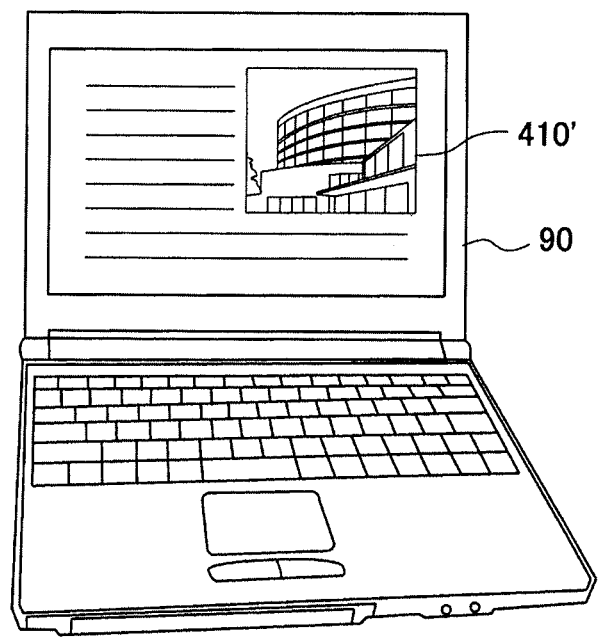

FIG.25
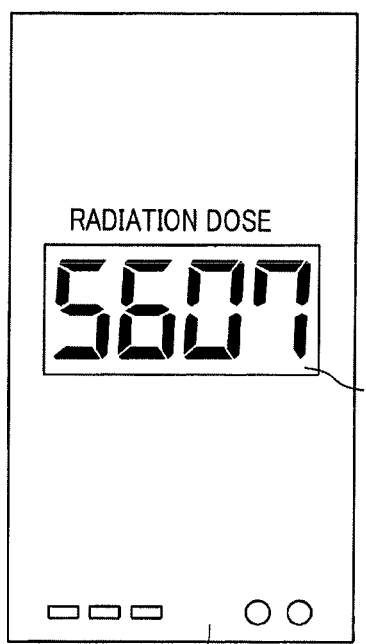
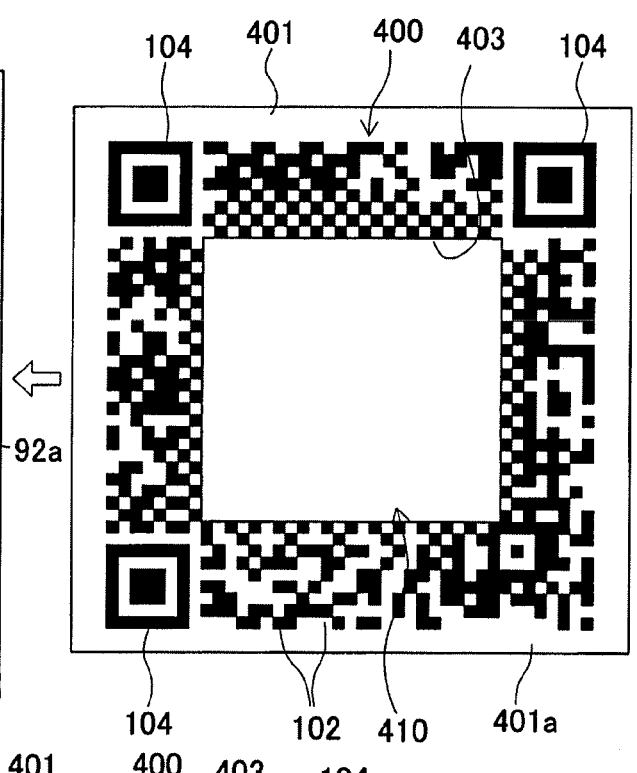
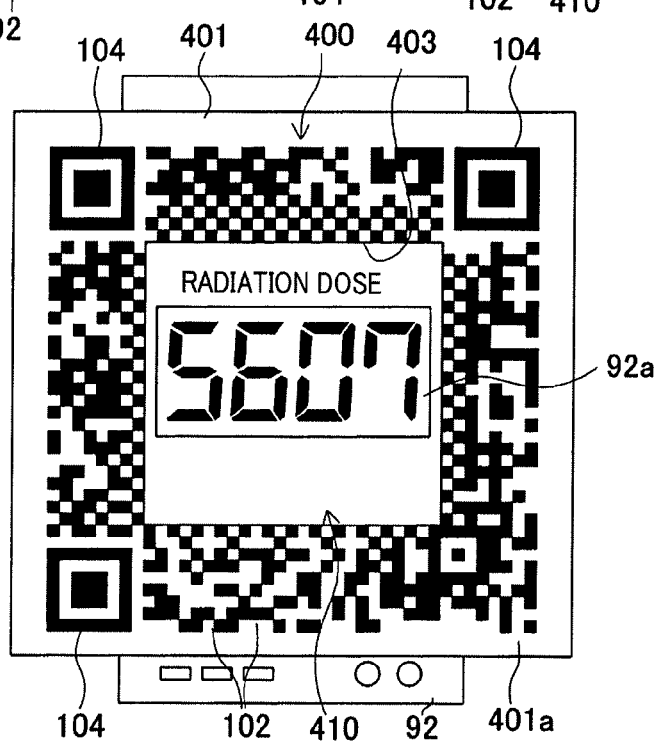

FIG.26
(A)
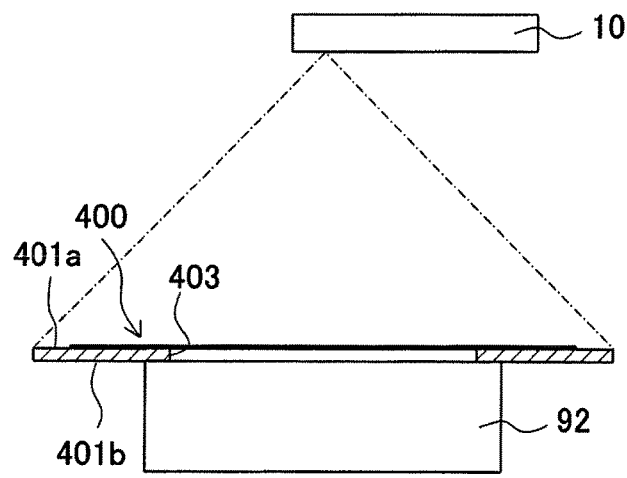
(B)
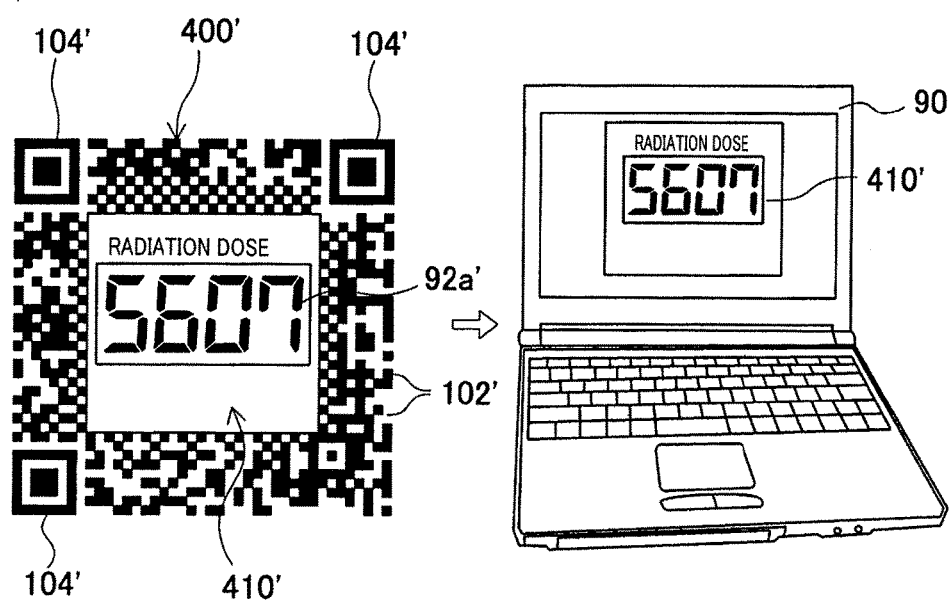

FIG.28
(A)
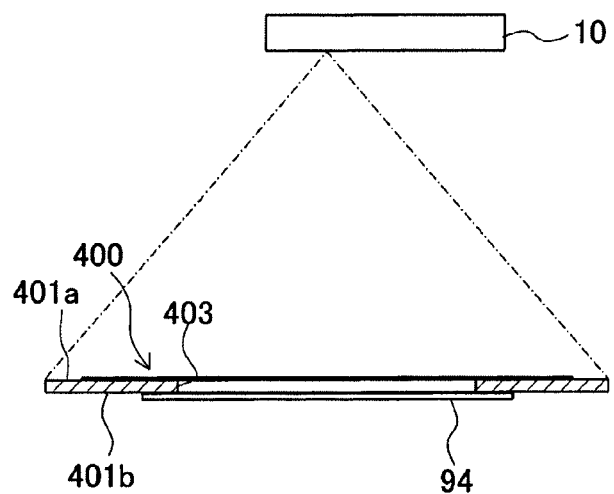
(B)
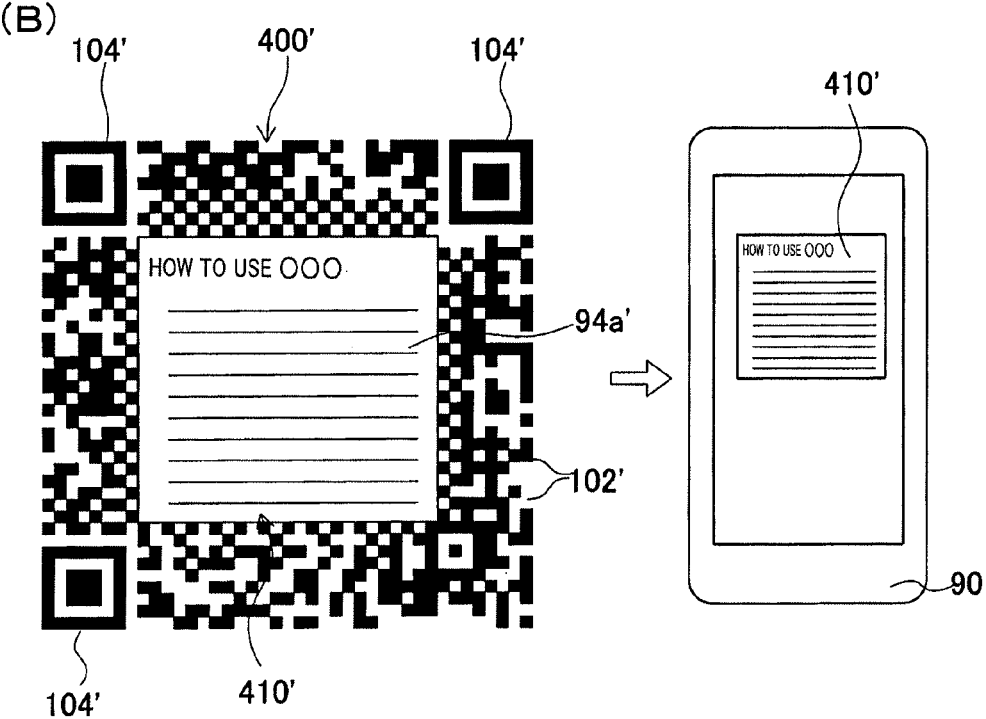

FIG.29
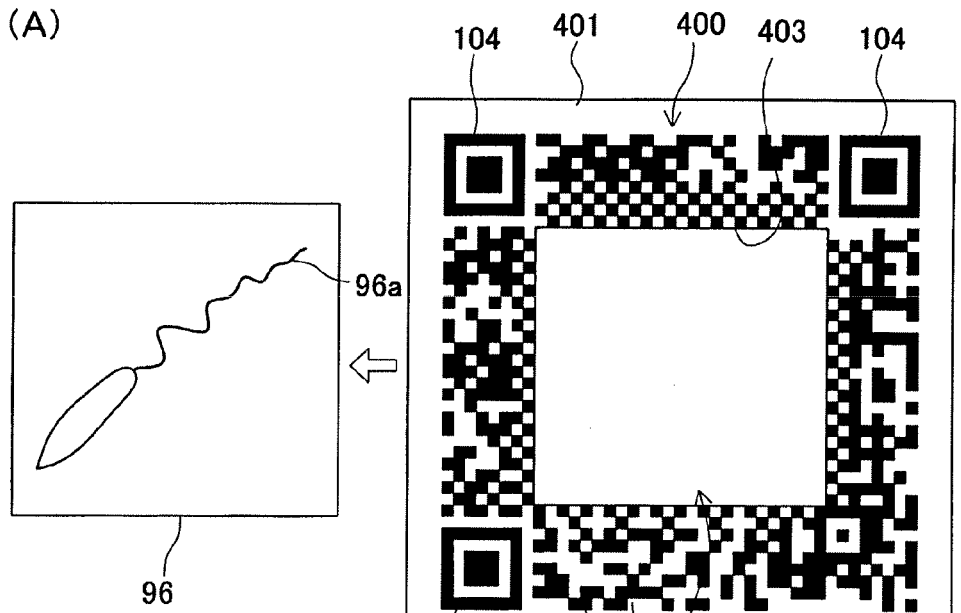
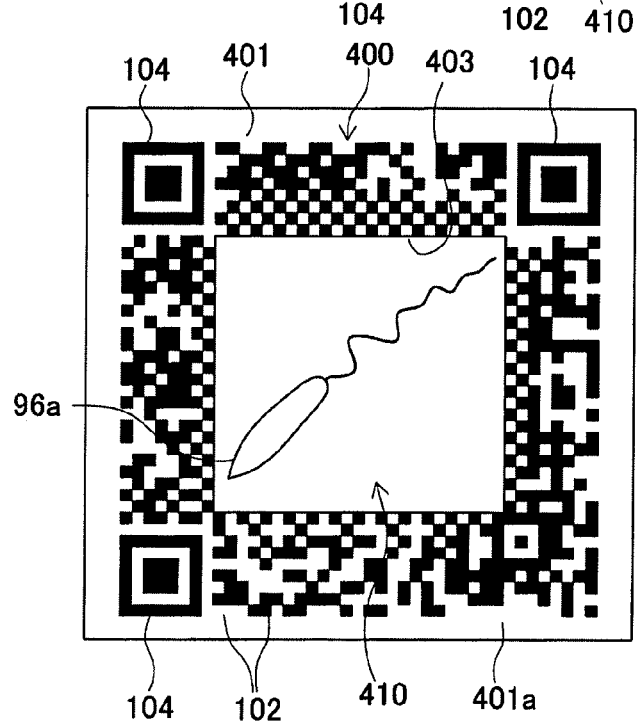

FIG.30
(A)
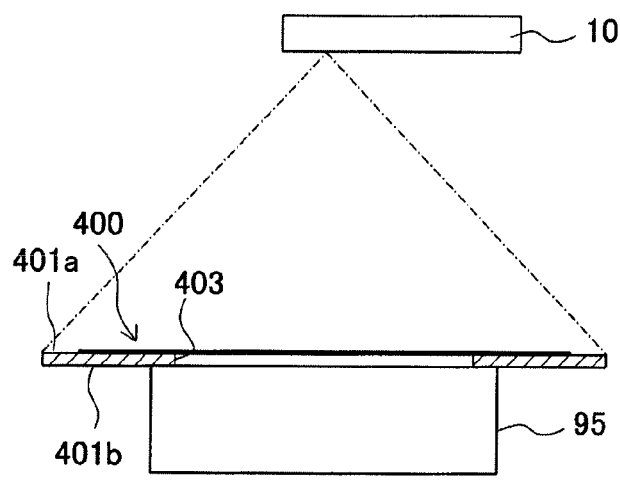
(B)
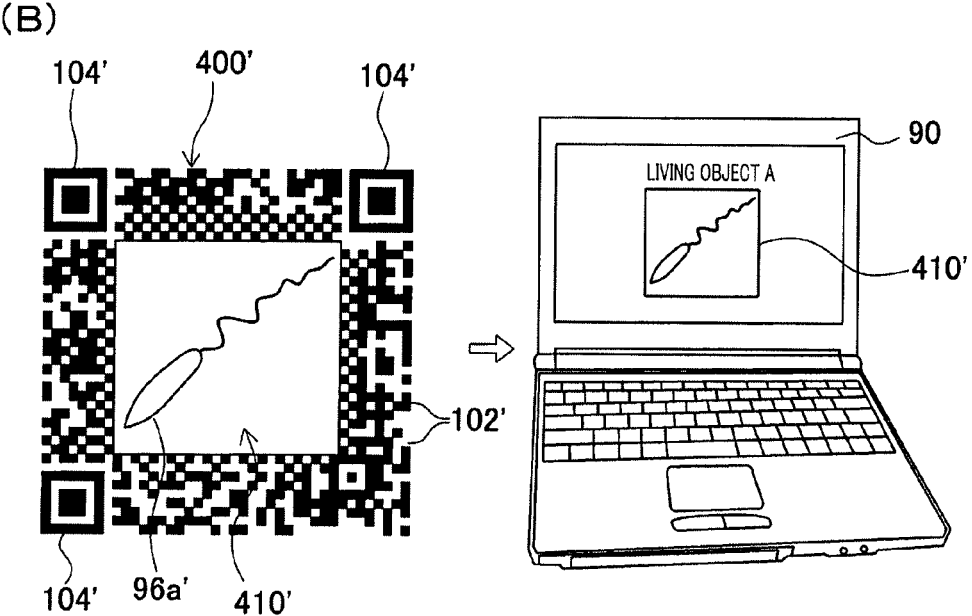

FIG. 31
(A)
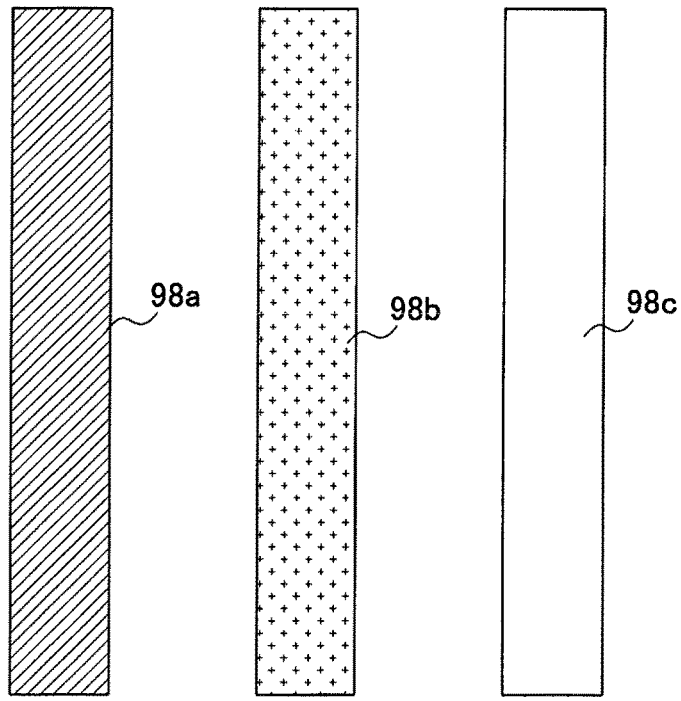
(B)
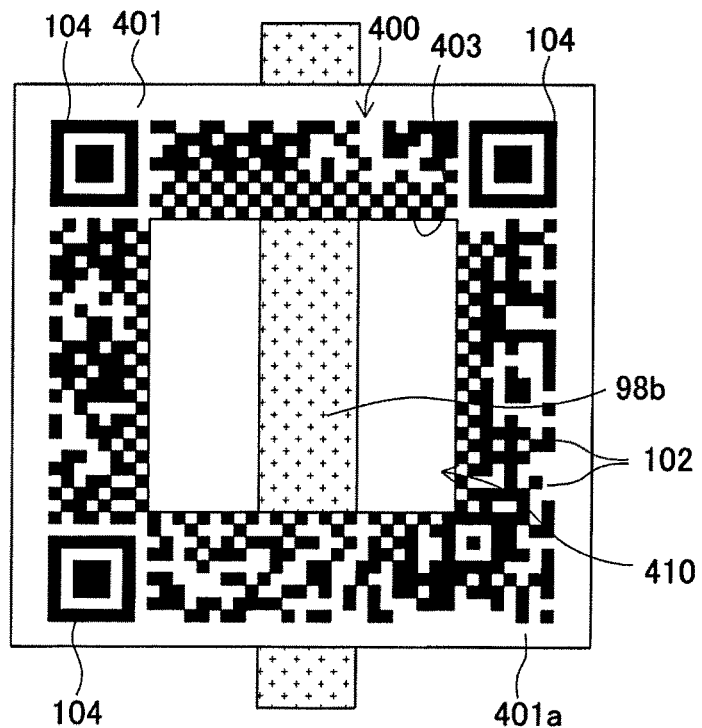

FIG. 32
(A)
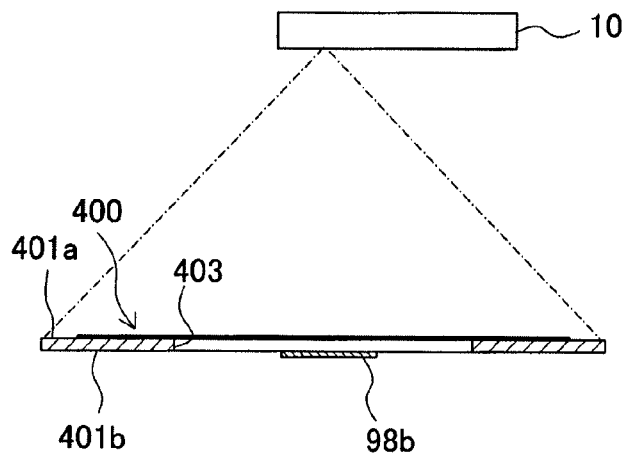
(B)
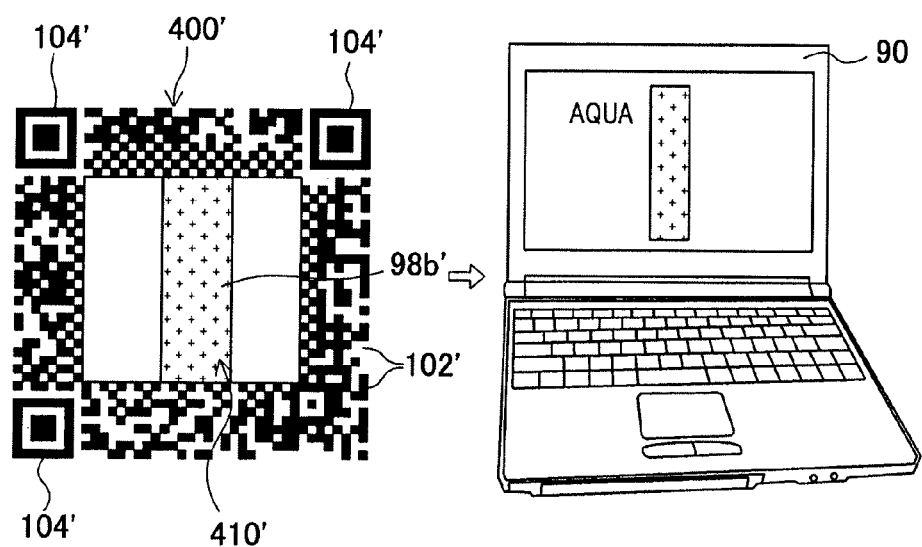

FIG.33
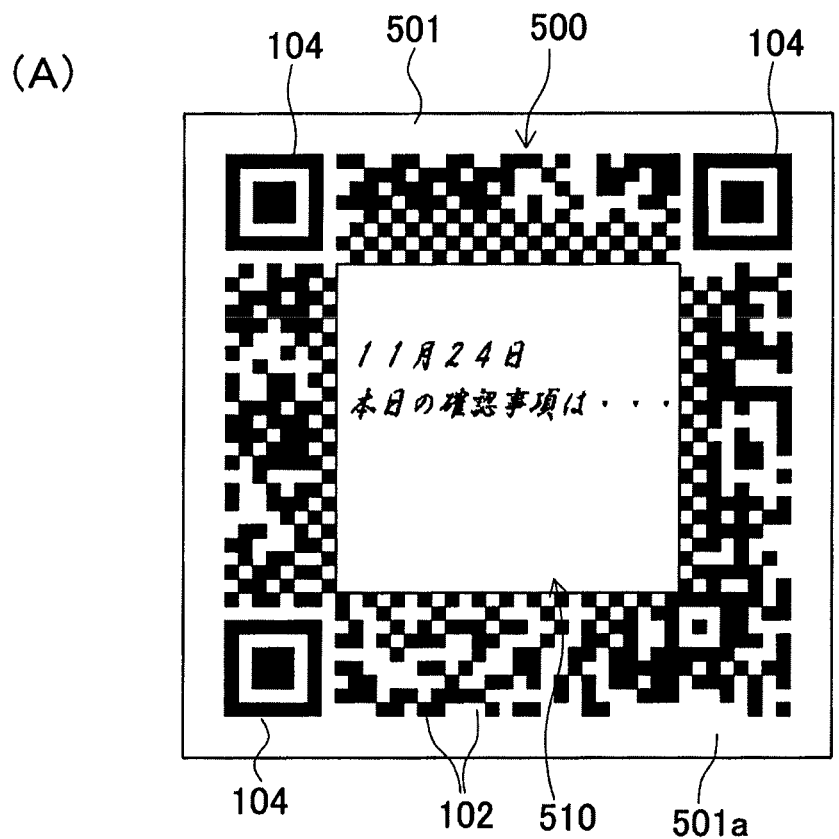
(A)
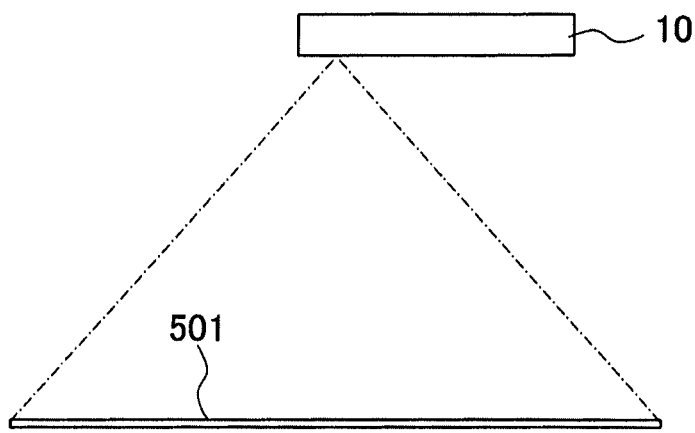
(B)

(A)

(B)

| DATA OF DATE AND HOUR | MEMO DATA |
|---|---|
| DATE AND HOUR "1" | MEMO DATA "1" |
| DATE AND HOUR "2" | MEMO DATA "2" |
| DATE AND HOUR "3" | MEMO DATA "3" |
| DATE AND HOUR "4" | MEMO DATA "4" |
| ⋮ | ⋮ |

• BRANCHING POINT
+ EDGE POINT

FIG.37

| CHARACTERISTIC POINT | VALUE SHOWING TYPE | VALUE SHOWING POSITION IN X-DIRECTION | VALUE SHOWING POSITION IN Y-DIRECTION |
|---|---|---|---|
| P1 | A1 | X1 | Y1 |
| P2 | A2 | X2 | Y2 |
| P3 | A3 | X3 | Y3 |
| P4 | A4 | X4 | Y4 |
| P5 | A5 | X5 | Y5 |
| ⋮ | ⋮ | ⋮ | ⋮ |
| P15 | A15 | X15 | Y15 |

FIG.42
(A)
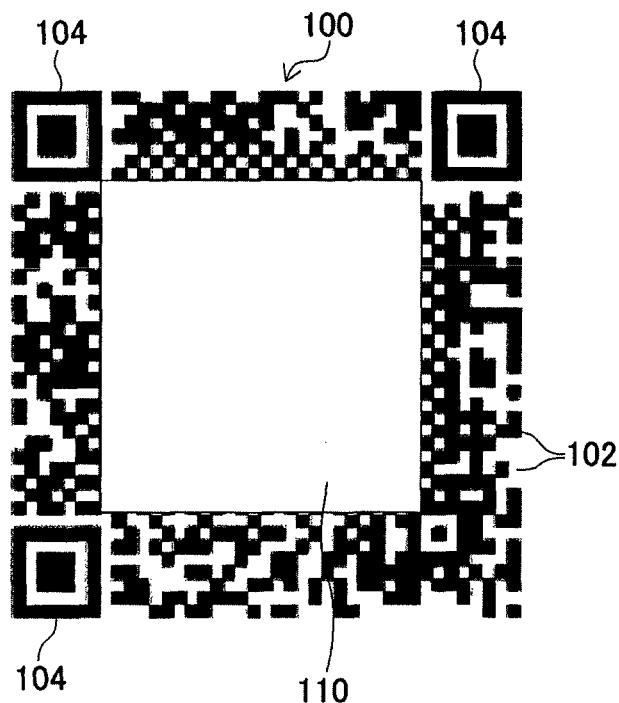
(B)
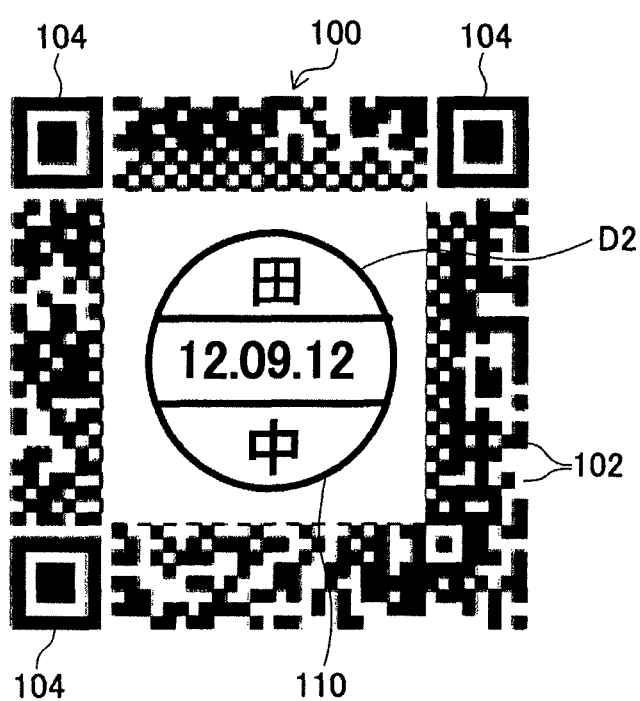

FIG.45
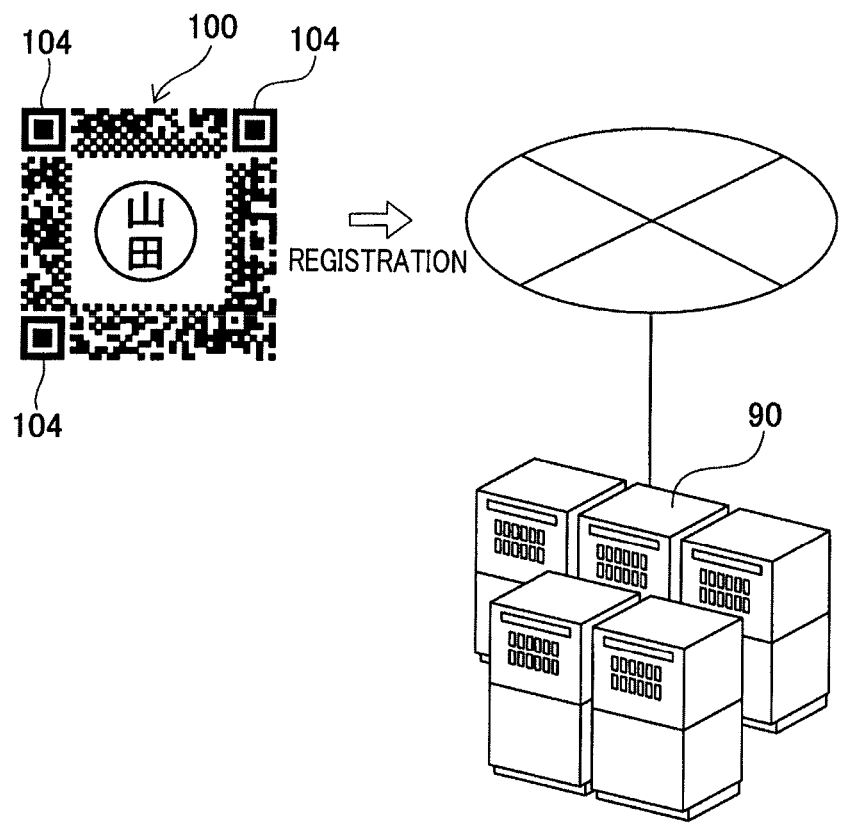
REGISTRATION OF PLURAL PERSONAL SEALS
NUMBER: 12345678
TARO YAMADA
NUMBER: 12345699
HANKO ITO

FIG.47
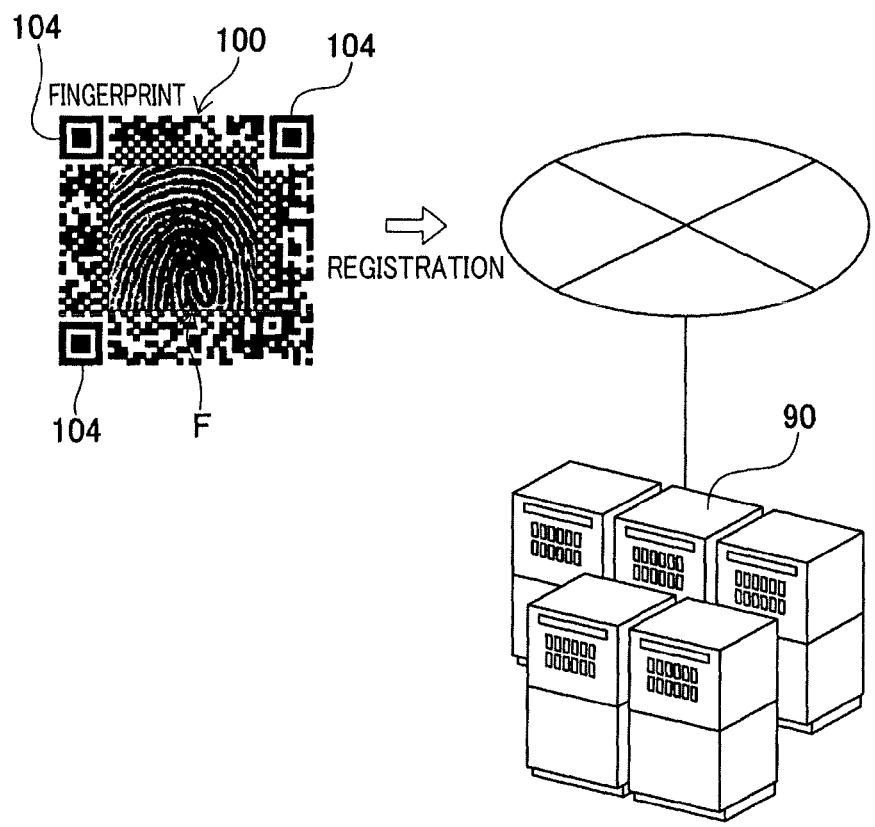
REGISTRATION OF PLURAL FINGERPRINTS
NUMBER: A12345
TARO YAMADA
NUMBER: A12346
HANKO ITO

(A)

(B)

<EXAMPLE OF CODE DATA>

※DISCLOSED
・ITEM NAME, ITEM NUMBER, PRICE, PACKING LOT

※NONDISCLOSED (ENCRYPTED)
・SPECIFIC ID (SERIAL NUMBER etc.)
・SHOP INFORMATION

FIG.53
(A)
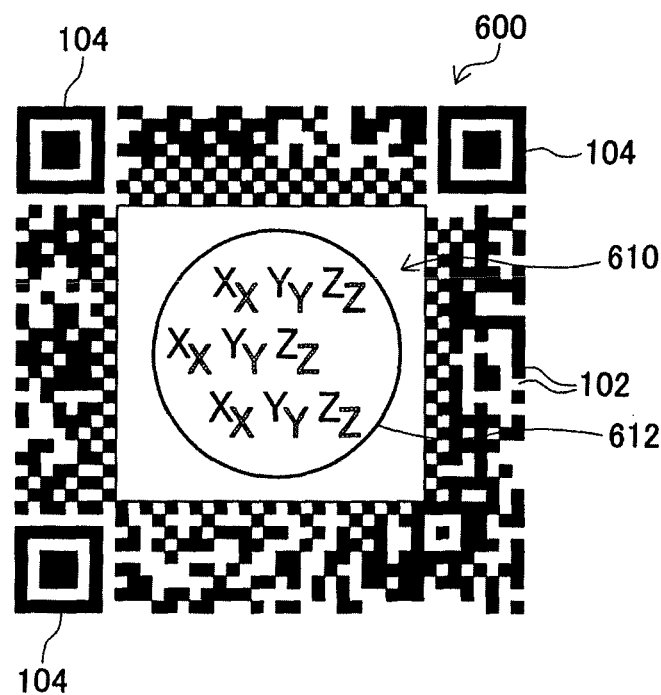
(B)
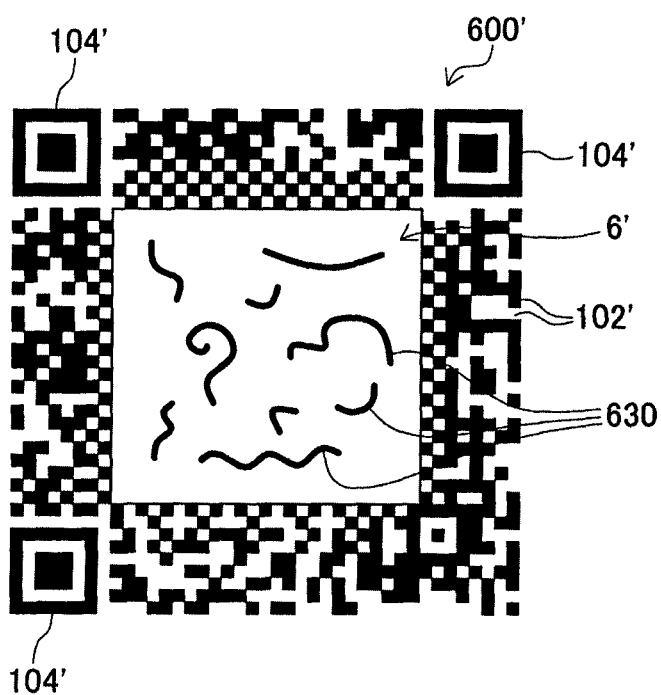

INFORMATION CODE, INFORMATION CODE PRODUCING METHOD, INFORMATION CODE READER, AND SYSTEM WHICH USES INFORMATION CODE

CROSS-REFERENCE TO RELATED APPLICATIONS

This application is based on and claims the benefit of priority from earlier Japanese Patent Applications:
2012-276910 filed Dec. 19, 2012;
2013-010222 filed Jan. 23, 2013;
2013-065835 filed Mar. 27, 2013;
2013-195348 filed Sep. 20, 2013;
2013-255485 filed Dec. 10, 2013; and
2013-239366 filed Nov. 19, 2013
the descriptions of which are incorporated herein by reference in their entireties.

TECHNICAL FIELD

The present invention relates to an information code such as a two-dimensional code, a production method for producing the information code, an information code reader that reads the information code, and a system which uses an information code that uses the information code.

BACKGROUND ART

Information codes such as two-dimensional codes are now being used in many applications. A technique in which a photograph, a drawing, or the like is arranged within a code region has also been proposed. For example, a technique provided by patent literature 1 involves a two-dimensional code in which strings of reverse-converted bits that have been reversely converted from strings of bits are determined. These strings of bits form a region in the two-dimensional code that is read as a single gray level. The two-dimensional code is produced by the reverse-converted bit strings being converted based on format information of the two-dimensional code. A unique two-dimensional code that has a design region composed of the single gray level is thereby produced.

CITATION LIST

Patent Literature

[PTL 1] JP Patent No. 5057560

SUMMARY OF INVENTION

Technical Problem

In the technique shown by the foregoing patent literature 1, if the unique two-dimensional code has a design region composed of white modules, given design data are combined with the unique two-dimensional code such that a design composed of gray levels which can be read as white is formed in the design region. In contrast, if the unique two-dimensional code has a design region composed of black modules, given design data are combined with the unique two-dimensional code such that a design composed of gray levels which can be read as black is formed in the design region However, in the information code including a design region that has been used since the past, only the data expressed by cell arrangements and the like are subjected to analysis and reading. Illustrations and the like in the design region are exclusively used for presentation aimed at the user. In other words, the idea of using the design or the like that is attached in the information code through analysis on the reader side did not exist. Usability could not be improved through use of the design region when reading.

Furthermore, the present invention has been achieved to solve the above-described issues. An object of the present invention is to provide an information code that enables use of an image other than cells attached within the information code, an information code production method, an information code reader, and a system which uses an information code.

Solution to Problem

In order to accomplish the object, a first aspect of the present invention provides a method of producing an information code by an information code producing apparatus, cells being arranged inside a predetermined code region of a medium, each of the cells functioning as a unit of information. The method is characterized by comprising:
arranging, in the code region, i) a specification pattern region in which predetermined-shape specification patterns are arranged, the specification patterns including patterns indicating a position of the code area, and ii) a data recording region in which data are recorded using a plurality of types of the cells; and
configuring, in the code region, an image region to which a predetermined image recognition process is applied by the image information code reader.

A second aspect of the present invention provides an information code, wherein cells are arranged inside a predetermined code region of a medium, each of the cells functioning as a unit of information. The information code is characterized in that
a specification pattern region is arranged in the code region, predetermined-shape specification patterns being arranged in the specification pattern region, the specification patterns including patterns indicating a position of the code area;
a data recording region is arranged in the code region, data being recorded in the data recording region using a plurality of types of the cells; and
an image region is configured in the code region, a predetermined image recognition process being applied to the image region by the image information code reader.

A third aspect of the present invention provides an information code reader which reads an information code in which cells are arranged inside a predetermined code region of a medium, each of the cells functioning as a unit of information. The reader is characterized in that
a specification pattern region arranged in the code region, predetermined-shape specification patterns being arranged in the specification pattern region, the specification patterns including patterns indicating a position of the code area;
a data recording region arranged in the code region, data being recorded in the data recording region using a plurality of types of the cells; and
an image region configured in the code region, an image different from an image based on the cells being provided in the image region, and the information code reader comprises:
an imaging unit imaging the information code as a code image;
a data-recording-region reading section reading the data recorded in the data recording region based on contents of the data recording region provided in the code image of the information code when the information code is imaged by the imaging unit; and
an image processing section performs a process for recognizing an image of the image region provided in the code image, based on a method which is different from an interpretation process to be applied to the data performed by the data-recording-region reading section.

A fourth aspect of the present invention provides a system which uses an information code, characterized in the system comprises:
an information code producing apparatus producing an information code in which cells are arranged inside a predetermined code region of a medium, each of the cells functioning as a unit of information; and
an information code reader reading the information code produced by the information code producing apparatus,
wherein the information code producing apparatus produces the information code comprising:
a specification pattern region arranged in the code region, predetermined-shape specification patterns being arranged in the specification pattern region, the specification patterns including patterns indicating a position of the code area;
a data recording region arranged in the code region, data being recorded in the data recording region using a plurality of types of the cells; and
an image region configured in the code region, an image different from an image based on the cells being provided in the image region, and
wherein the information code reader comprises:
an imaging unit imaging the information code as a code image;
a data-recording-region reading section reading the data recorded in the data recording region based on contents of the data recording region provided in the code image of the information code when the information code is imaged by the imaging unit; and
an image processing section performs a process for recognizing an image of the image region provided in the code image, based on a method which is different from an interpretation process to be applied to the data performed by the data-recording-region reading section.

In order to accomplish the object, the present invention further provides a fifth aspect and a sixth aspect.

A fifth aspect relates to an information code reader which reads an information code in which cells are arranged inside a predetermined code region of a medium, each of the cells functioning as a unit of information. The system is characterized in that:
the information code comprises:
a specification pattern region arranged in the code region, predetermined-shape specification patterns being arranged in the specification pattern region, the specification patterns including patterns indicating a position of the code area;
a data recording region arranged in the code region, data being recorded in the data recording region using a plurality of types of the cells; and
an image region configured in the code region, an image different from an image based on the cells being provided in the image region; and the information code reader comprises:
an imaging unit imaging the information code as a code image;
a data-recording-region reading section reading the data recorded in the data recording region when the information code is imaged by the imaging unit; and
an image processing section performs a predetermined image processing of an image of the image region provided in the code image of the information code imaged by the imaging unit, based on a method which is different from an interpretation process to be applied to the data performed by the data-recording-region reading section, wherein:
usage data is recorded in the data recording region, the usage data being used when the image processing section performs the image processing of an image of the image region; and
the image processing section uses the usage data read by the data-recording-region reading section, and performs the image processing of an image of the image region.

Moreover, the sixth aspect relates to a system which uses an information code. The system is characterized in the system comprises:
an information code producing apparatus producing an information code in which cells are arranged inside a predetermined code region of a medium, each of the cells functioning as a unit of information; and
an information code reader reading the information code produced by the information code producing apparatus,
wherein the information code producing apparatus produces the information code comprising:
a specification pattern region arranged in the code region, predetermined-shape specification patterns being arranged in the specification pattern region, the specification patterns including patterns indicating a position of the code area;
a data recording region arranged in the code region, data being recorded in the data recording region using a plurality of types of the cells; and
an image region configured in the code region, an image different from an image based on the cells being provided in the image region, and
wherein the information code reader comprises:
an imaging unit imaging the information code as a code image;
a data-recording-region reading section reading the data recorded in the data recording region when the information code is imaged by the imaging unit; and
an image processing section performs a predetermined image processing of an image of the image region provided in the code image of the information code imaged by the imaging unit, based on a method which is different from an interpretation process to be applied to the data performed by the data-recording-region reading section, wherein:
the information code producing apparatus records usage data in the data recording region, the usage data being used when the image processing section performs the image processing of an image of the image region; and
the image processing section of the information code reader uses the usage data read by the data-recording-region reading section, and performs the image processing of an image of the image region.

Advantageous Effects of Invention

According to the first aspect of the present invention, it is possible to obtain, as objects being interpreted, both an image recorded in the data recording region and an image arranged in the image region arranged in the code area. Additionally, the information code can be provided such that the image from the image region is usable by applications other than interpretation for the data recording region.

In the second aspect of the present invention, it is also possible to obtain, as objects being interpreted, both an image recorded in the data recording region and an image arranged in the image region arranged in the code area. Additionally, the information code can also be provided such that the image from the image region is usable by applications other than interpretation for the data recording region.

In the third aspect of the present invention, it is also possible to obtain, as objects being interpreted, both information recorded by the cells in the data recording region and an image formed in the image region. Additionally, the image from the image region is usable by applications other than interpretation for the data recording region.

In the third aspect of the present invention, an object being read is an information code provided with a special display portion, which enables a predetermined display when being imaged a predetermined imaging method and disenables the predetermined display when being imaged by a method different from the predetermined imaging method. Hence, it is possible to read data form the information code and recognize the predetermined display performed by the predetermined display portion. Recognizing this predetermined display makes it possible to perform authentication about the predetermined display.

In the fifth aspect, the information code reader recognizes both information recorded by the cells in the data recording region and an image (which is different from the cells) provided in the image region in the code region. Hence, by the reader, an image other than the cells can be used by applications other than interpretation of the data recording region.

Moreover, the information code, which is an object being read, is configured such that data used for processing images are recorded in the data recording region. The reader uses the data from the data recording region to process an image provided in the image region. It is thus possible to process the image in association with data recorded in the recording region, not simply processing the image in the image region. Accordingly, for using the image in the image region, a degree of freedom of the use increases, widening applications of the image in the image region.

One example of the fifth aspect is to record comparison data in the data recording region of the information code. The comparison data are for comparison with data obtained by analyzing at least part of the image in the image region or the image in the image region. The image processing section of the reader uses the comparison data to determine whether or no the image in the image region is a given normal image.

By this configuration, an image being used and the comparison data for comparison with the image can be obtained at the same time by one time of imaging, thereby providing both the image and the comparison data which are to be mutually associated, in an accurate manner. Work time and processing time can be shortened easily.

Incidentally, a prior art is disclosed by a patent literature 2 (JP-A-2001-256501) providing a verification technique. A two-dimensional code adhering on an article is read and an authenticated person's palm is then read. The data from the code and the data showing characteristic points in the palm pattern are mutually compared. However, this technique is based on both data of the two-dimensional code and the authenticated person (his or her palm) which are separately collected. For example, after reading a two-dimensional code, if some undesirable conditions happen (e.g., talking from other persons, occurring other higher priority events, or others), reading a person's palm may forget or resulting in cancellation of the reading job. If this kind of conditions happen, the reading and authentication jobs may be suspended or result in failure, thus lowering effectiveness and reliably of such jobs. In addition, the technique disclosed by the patent literature 2 needs mutually separate structures, i.e., the two-dimensional code and an authentication object (person's palm), thus making it larger in size mediums being read.

However, in this respect, in the fifth aspect, an image in the image region and the comparison data associated with the image are expressed in the same information code. Hence, these image and data can be imaged at the same time, improving the various difficulties caused by the patent literature 2.

Further, in the sixth aspect, the information code reader can read the information code, during which time information recorded by the cells in the data recording region is read and an image in the image region (which is an image different from the cell image) is also recognized. Hence, described above, an image other than the cells can be utilized by applications except for interpreting the data recording region.

Furthermore, in producing the information code, data used for processing images are recorded in the data recording region. The reader uses the data from the data recording region to process an image provided in the image region. It is thus possible to process the image in association with data recorded in the recording region, not simply processing the image in the image region. Accordingly, for using the image in the image region, a degree of freedom of the use increases, widening applications of the image in the image region.

BRIEF DESCRIPTION OF DRAWINGS

In the accompanying drawings:

FIG. 10(A) is an explanatory diagram of the information code used in the system which uses an information code in FIG. 1 in a state in which an image is not formed in the free space, and FIG. 10(B) is an explanatory diagram of a state in which an image is formed in the free space in the information code.

FIG. 12(A) is an explanatory diagram of an image example of an original image, and FIG. 12(B) is an explanatory diagram of an image example of an image deformed by tilting or the like.

FIG. 16 is an explanatory diagram that explains an information code used in a system which uses an information code according to a fifth embodiment in which FIG. 16(A) is a diagram of a state in which the free space is blank and FIG. 16(B) is a diagram of a state in which an image region is provided in the free space.

FIG. 17 is an explanatory diagram that explains an information code used in a system which uses an information code according to a sixth embodiment in which FIG. 17(A) is a diagram of a state in which the free space is blank and FIG. 17(B) is a diagram of a state in which a design is attached to the free space.

FIG. 18(A) is an explanatory diagram that conceptually explains a data configuration of data to be interpreted in the information code in FIG. 16, and FIG. 18(B) is an explanatory diagram that conceptually explains a data configuration data to be interpreted in the information code in FIG. 17.

FIG. 19 is an explanatory diagram that explains an information code used in a system which uses an information code according to a seventh embodiment in which FIG. 19(A) is a planar view in which a formation subject medium is viewed from the front surface side and FIG. 19(B) is a cross-sectional schematic diagram that schematically shows a cross-section in which the formation subject medium is cut in a lateral direction at the center position in the vertical direction.

FIG. 21(A) is an explanatory diagram of a state in which the formation subject medium on which the information code is formed covers the subject, and FIG. 21(B) is an explanatory diagram that explains imaging by a reader of the formation subject medium covering the subject as in FIG. 21(A) and the like.

FIG. 22(A) is an explanatory diagram of an example of an image obtained by cutting out the interior of the code region from a captured image capturing an object to be captured as in FIG. 21(A), and FIG. 22(B) is an explanatory diagram that explains display of the image in the image region in an external apparatus at a transmission destination.

FIG. 24(A) is an explanatory diagram of an example of an image obtained by cutting out the interior of the code region from a captured image obtained by imaging as in FIG. 23, and FIG. 24(B) is an explanatory diagram that explains display of the image in the image region in the external apparatus at the transmission destination.

FIG. 25(A) is an explanatory diagram that relates to a second variation example according to the seventh embodiment and explains the formation subject medium on which the information code is formed and a subject (measurement instrument) covered thereby, and FIG. 25(B) is an explanatory diagram of a state in which the formation subject medium covers the subject.

FIG. 26(A) is an explanatory diagram that explains imaging by a reader of the formation subject medium covering the subject as in FIG. 25(B) and the like, and FIG. 26(B) is an explanatory diagram that explains transmission of the image obtained by cutting out the interior of the code region from a captured image obtained by imaging as in FIG. 26(A) to an external apparatus, and display of the image in the external apparatus at the transmission destination.

FIG. 28(A) is an explanatory diagram that explains imaging by a reader of the formation subject medium covering the subject as in FIG. 27(B) and the like, and FIG. 28(B) is an explanatory diagram that explains transmission of the image obtained by cutting out the interior of the code region from a captured image obtained by imaging as in FIG. 28(A) to an external apparatus, and display of the image in the external apparatus at the transmission destination.

FIG. 29(A) is an explanatory diagram that relates to a fourth variation example according to the seventh embodiment and explains the formation subject medium on which the information code is formed and a subject (observation subject) covered thereby, and FIG. 29(B) is an explanatory diagram of a state in which the formation subject medium covers the subject.

FIG. 30(A) is an explanatory diagram that explains imaging by a reader of the formation subject medium covering the subject as in FIG. 29(B) and the like, and FIG. 30(B) is an explanatory diagram that explains transmission of the image obtained by cutting out the interior of the code region from a captured image obtained by imaging as in FIG. 30(A) to an external apparatus, and display of the image in the external apparatus at the transmission destination.

FIG. 31(A) is an explanatory diagram that relates to a fifth variation example according to the seventh embodiment and shows an example of a plurality of color swatches serving as subject candidates, and FIG. 31(B) is an explanatory diagram of a state in which the formation subject medium covers any of the color swatches.

FIG. 32(A) is an explanatory diagram that explains imaging by a reader of the formation subject medium covering the subject as in FIG. 31(B) and the like, and FIG. 32(B) is an explanatory diagram that explains transmission of the image obtained by cutting out the interior of the code region from a captured image obtained by imaging as in FIG. 32(A) to an external apparatus, and display of the image in the external apparatus at the transmission destination.

FIG. 33(A) is an explanatory diagram that explains an information code used in a system which uses an information code according to an eighth embodiment, and FIG. 33(B) is an explanatory diagram that explains imaging by a reader of a formation subject medium to which the information code is attached.

FIG. 37 is an explanatory diagram that conceptually explains the comparison data used according to the ninth embodiment.

FIG. 40(A) is an explanatory diagram of an example of an information code produced by the producing apparatus in the system which uses an information code related to the second variation example according to the ninth embodiment, and FIG. 42(B) is an explanatory diagram of a state in which a stamp seal is attached to the information code.

FIG. 45 is an explanatory diagram that conceptually explains registration of a personal seal in the system which uses an information code in a second variation example according to the tenth embodiment.

FIG. 47 is an explanatory diagram that conceptually explains registration of a fingerprint in the system which uses an information code in a third variation example according to the tenth embodiment.

FIG. 53(A) is an explanatory diagram that explains an information code used in a system which uses an information code related to a second variation example according to the eleventh embodiment, and FIG. 53(B) is an explanatory diagram that explains an image obtained when imaging of the information code in FIG. 53(A) is performed by a predetermined imaging method.

DESCRIPTION OF EMBODIMENTS

Figure 1:
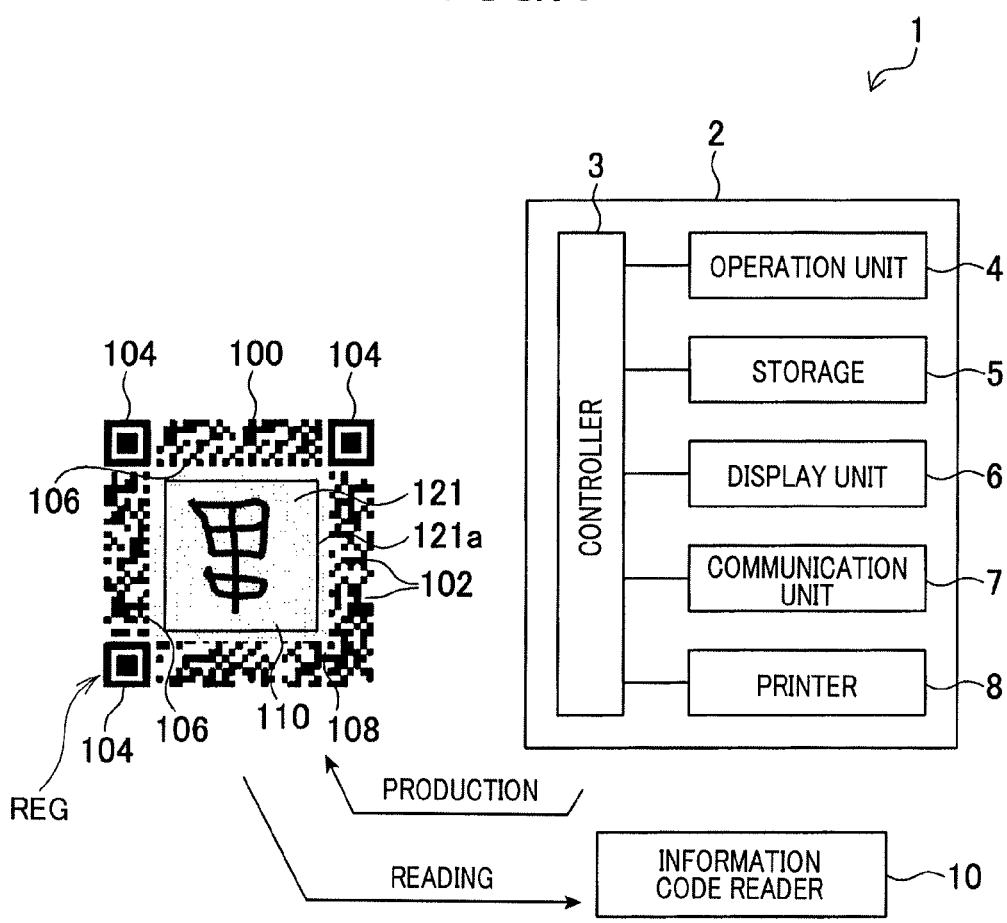
FIG. 1 is a schematic diagram that schematically shows an example of a system which uses an information code according to a first embodiment of the present invention.

Referring to the accompanying drawings, various types of embodiments of the present invention will now be described.

First Embodiment

Referring to the drawings, a first embodiment of the present invention will now be described.

FIG. 1 shows a system 1 which uses an information code. The system includes an information code producing apparatus 2 and an information code reader 10. The information code producing apparatus 2 produces an information code 100 provided with a predetermined code area in which cells are arranged, the cells being units composing information. The information code reader 10 reads the information code 100 produced by the information code producing apparatus 2.

(Information Code Producing Apparatus)

The information code producing apparatus 2 is configured by an information processing apparatus, which is a personal computer for example. This apparatus 2 is provided with a controller 3 including a CPU, an operation unit 4 including a key board, a mouse and other input devices, and a storage 5 including memory devices such as a ROM, a RAM, a HDD, and nonvolatile memories. The apparatus 2 further includes a display unit 6 equipped with known display devices (such as a liquid crystal display and/or other types of display devices), a communication unit 7 functioning as a communication interface to and from external devices via wired or wireless communication, and a printer 8 (printing device). The printer 8 is similar in hardware to known printers and is capable of printing the information code 100 and necessary information in reply to printing data sent from the controller 3.

(Information Code Reader)

Figure 2:
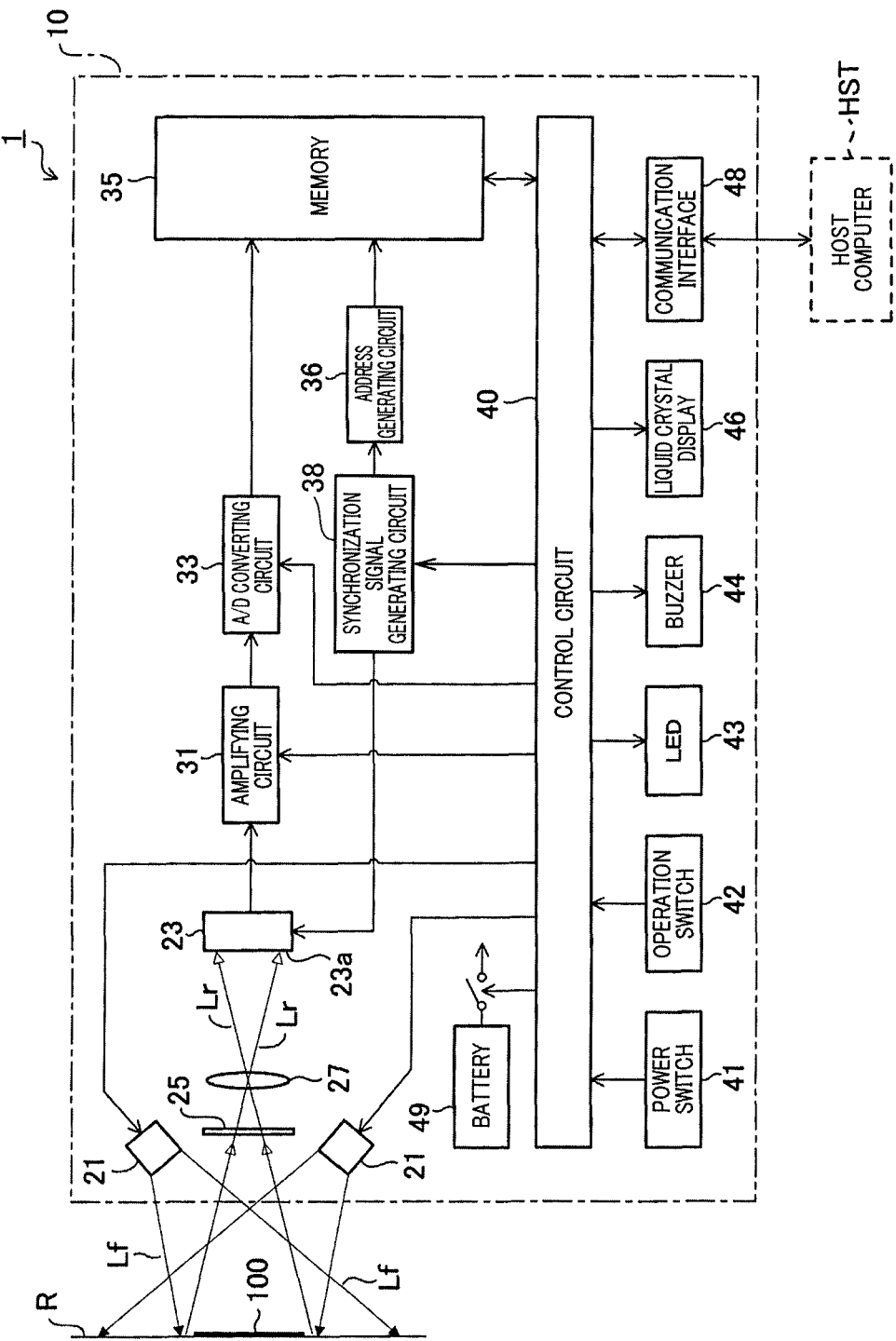
FIG. 2 is a block diagram that schematically shows an example of an electrical configuration of an information code reader configuring the system which uses an information code in FIG. 1.

The overall configuration of the information code reader 10 will now be described. As shown in FIG. 2, in terms of hardware, the information code reader 10 is configured as a code reader capable of reading two-dimensional codes. The reader is enclosed by a not-shown case (chassis), in which variety of types of electronic parts are accommodated.

The information code reader 10 includes, as its main components, an optical system provided with illuminating sources 21, a light receiving sensor 23, a filer 25 and an imaging lens 27; a microcomputer system (hereinafter called "a microcomputer") provided with memories 35, a control circuit 40, an operation switch 42, and a liquid crystal display 46; and a power supply system provided with a power switch 41 and a battery 49. These components are mounted on not-shown printed boards and/or implemented in the case (not shown), and assembled integrally with the case (chassis).

The optical system is configured to include the illuminating sources 21, light receiving sensor 23, filter 25 and imaging lens 27. The illuminating sources 21 function as light sources capable of emitting illuminating light Lf, and, for example, include red LEDs and lens systems disposed on the output side of the LEDs, in which the lens system include diffusing lenses and collecting lenses. In the present embodiment, the illuminating sources 21 are arranged on both sides of the light receiving sensor 23 and are able to emit the illuminating light Lf towards an object R being read via a reading opening (not shown) of the case. The object R being read is a medium carrying an information code or a medium in or on which an information code is formed or mapped. The object R being read may be various objects such as resin materials or metal materials, and an information code 100 (later described), which are as shown in FIG. 1 for example, is produced on the object R being read, by printing.

The light receiving sensor 23 is provided as one example of an imaging unit capable of imaging the information code 100 (which will be described later) and is able to receive reflected light Lr coming from the object R being read and the information code 100 which reflect the illuminating light. This light receiving sensor 23 is for example an area sensor in which light-receiving elements are arranged two-dimensionally, such elements being solid-state image sensing devices such as C-MOSs or CCDs. The light receiving sensor 23 is mounted on a not-shown printed circuit board and has a light receiving window 23a through which incident light arrives through the imaging lens 27, so that the sensor is able to receive the incident light.

The filter 25 is an optical low-pass filter disposed between the reading opening (not shown) of the case and the imaging lens 27. The filter 25 is able to, for example, allow to pass therethrough light whose wavelengths is equal to or less than a designated wavelength corresponding to the reflected light Lf and, in contrast, cut off light whose wavelength is over the designated wavelength. Hence unnecessary light components whose wavelengths are over that of the reflected light Lr are suppressed from incoming into the light receiving sensor 23. The imaging lens 27 is, by way of example, configured to include a lens barrel and a plurality of collecting lenses accommodated in the lens barrel. In the present embodiment, the imaging lens is configured to collect the reflected light Lr incoming through the reading opening (not shown) of the case, and form a code image of the information code 100 on the light receiving window 23a of the light receiving sensor 23.

The microcomputer system includes an amplifying circuit 31, an A/D converting circuit 33, a memory 35, an address generating circuit 36, a synchronization signal generating circuit 38, a control circuit 40, a power switch 42, an LED 43, a buzzer 44, a liquid crystal display 46, a communication interface 48, and other necessary components. In the microcomputer system, the control circuit 40 functioning as a microcomputer (i.e., information processing unit) and the memory 35 are key components in the function thereof, and image signals of the information code 100 imaged by the foregoing optical system can be processed.

An image signal (which is an analogue signal) outputted from the light receiving sensor 23 of the optical system is provided to the amplifying circuit 31 to be amplified there with a predetermined gain, and the amplified signal is then provided to the A/D converting circuit 33 to be converted to a digital signal from the analogue signal. The digitalized image signal, that is, image data (i.e., image information) is provided to the memory 35 so that the image data is stored in an image data storage area of the memory 35. The synchronization signal generating circuit 38 is configured to generate a synchronization signal sent to both the light receiving sensor 23 and the address generating circuit 36. The address generating circuit 36 is configured to generate addresses at which the image data are stored at the designated addresses in the memory 35, in response to the synchronization signal coming from the synchronization signal generating circuit 38.

The memory 35 is composed of memory devices such as semiconductor memory devices, which include RAMs (DRAMs, SRAMs, etc.) and ROMs (EPROMs, EEROMs, etc.). The RAMs of the memory 35 are arranged to provide not only the image data storage area, described above, but also an operation area and a reading condition table which are used during processing for arithmetic calculations and logic calculations performed by the control circuit 40. In the ROMs, system programs are stored in advance, which include predetermined programs assigned to a later-described reading process and other necessary programs, and which are used to control hardware components including the illuminating light sources 21 and the light receiving sensor 23.

The control circuit 40 is provided with a microcomputer configured to be able to control the information code reader 10, and the microcomputer includes a CPU, a system bus, and an input/output interface, whereby the microcomputer provides an information processing function. In the control circuit 40, the input/output interface is communicably connected to various input/output devices (called peripheral devices) which include, in the present embodiment, the power switch 41, the operation switch 42, the LED 43, the buzzer 44, the liquid crystal display 46 and the communication interface 48. The communication interface 48 is communicably connectable to the host computer HST and/or other systems which are provided as host systems of the information code reader 10.

The power system includes the power switch 41 and the battery 49, in which the power switch 41 can be turn on/off to control connection/disconnection of paths for drive voltage from the battery 49 to the foregoing devices and circuits, which is under control of the control circuit 40. The battery 49 is composed of a secondary battery capable of generating a predetermined DC voltage, and this battery is for example a lithium-ion battery.

(Information Code)

Figure 5:
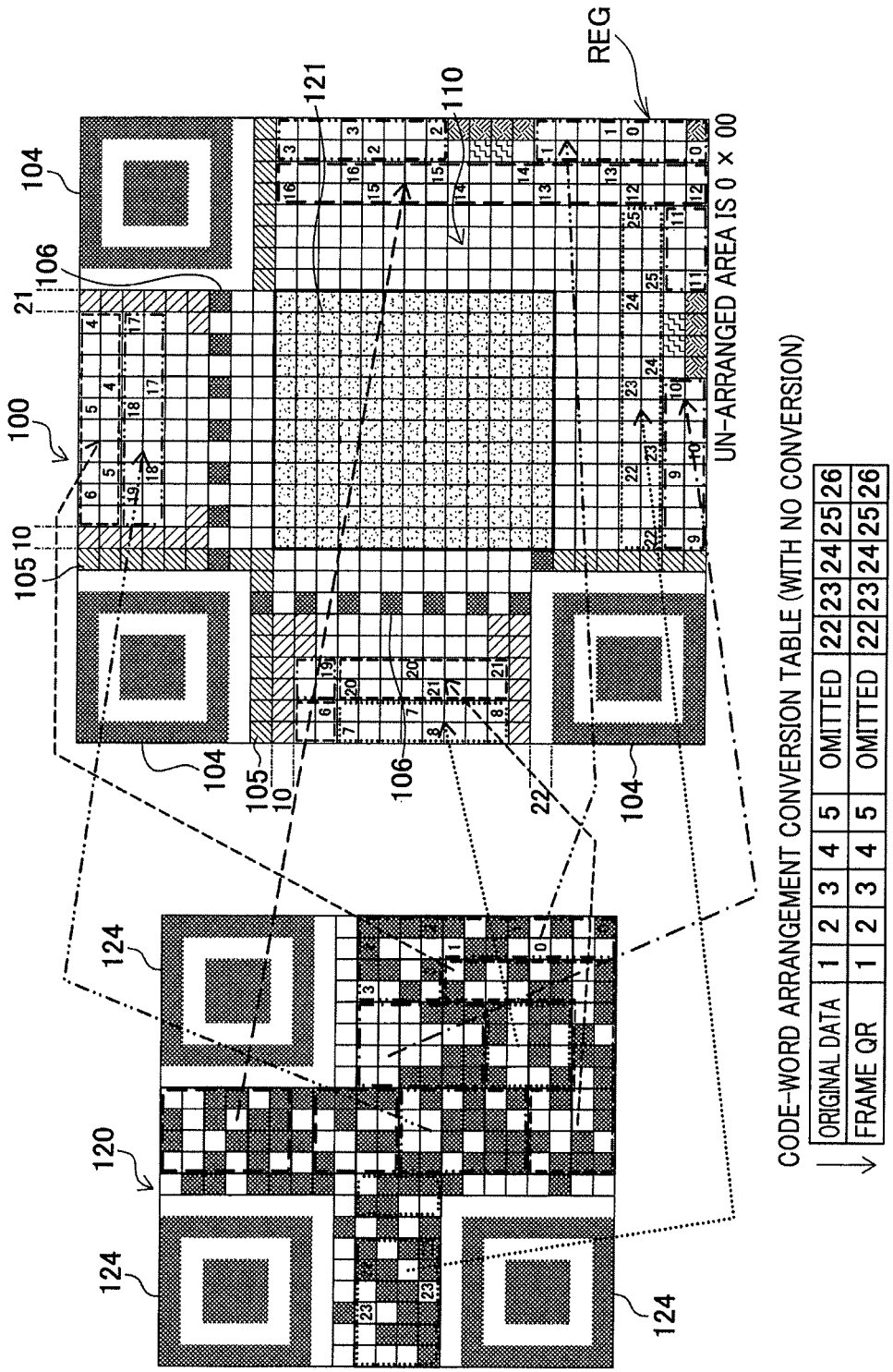
FIG. 5 is an explanatory diagram that explains the correspondence between the arrangement of each data word in the information code produced by an information code producing apparatus configuring the system which uses an information code in FIG. 1 and the arrangement of each data word in the other type of code.

With reference to FIGS. 1, 5, and other drawings, an information code 100 used in the system which uses the information code shown in FIG. 1 will now be described. Two codes exemplified in FIGS. 1 and 5 are configured based on the same basic scheme for configuring the codes and have similar characteristics, although arrangement of cells and the sizes of specification patterns are different from each other in the two codes. An information code 100 shown in FIGS. 1, 5 and other drawings is produced by the foregoing information code producing apparatus 2, for example, and has a predetermined code area REG in which cells 102, each corresponding to a unit for displaying pieces of information, are arranged. In the information code 100 shown in FIGS. 1, 5 and other drawings, the "code area" is a rectangular region REG which can contain all of a plurality of dark cells (refer to FIGS. 1 and 5), and practically, is a minimum square or oblong region which contains all cells composing the information code 100, in which the cells contain all of three position detecting patterns (finder patterns) 104.

Specifically the plurality of cells 102 are arranged or mapped according to a predetermined rule, so that the outer contours of some cells among those cells produce series of those contours which draw a square, rectangular, or other-shape area on or in a medium R differentiablly from the background. This area becomes the code area REG. Of course, when this information code is read, it is necessary that there is a quiet zone (margin) around the code area REG.

In the example shown in FIGS. 1, 5 and other drawings, each of the plurality of cells 102 is composed of a rectangular (e.g., square) light (e.g., white) cell or a rectangular dark (e.g., black) cell. Inside the code area, there is a free space (or called a canvas area) 110, which will be detailed later, and some of the cells 102 are located around the free space 110 in a matrix form. The light-color and dark-color cells are not necessarily limited to white and black cells. When the dark-color cell has a predetermined brightness, it is acceptable that the light-color cell has a brightness level higher than that of the black-color cell. In the information code 100, a light-color or dark-color margin zone is formed as a quiet zone to surround the code area. In the example shown in FIGS. 1, 5 and other drawings, a margin zone of a light color (such as white or another color whose brightness is higher than a dark-color cell) is adjacent to surround the code area. For example, the definitions of light and dark colors are explained in detail by references such as "International Standard ISO/IEC18004, second edition 2006 Sep. 1, page 109, Annex M, "M1 Symbol contrast"".

In the information code 100, there are provided a specification pattern region, a data recording region, and an error correction code recording region in its rectangular code (e.g., square, rectangular or any other shapes) code area. In the specification pattern region, predetermined-shaped specification patterns (practically, fixed-figure region wider in area than a single cell) are arranged. In the data recording region, data are recorded by the plurality of types of cells 102 and in the error correction code recording region, error correction codes are recorded by the plurality of types of cells 102. As shown in FIGS. 1, 5 and other drawings, by way of example, the specification patterns arranged in the information code 100 are the same in their shapes and positions as those of known predetermined models of a QR code (registered trademark) (in the example shown in FIG. 5, the predetermined models of the QR code standardized by JIS or other standards). In the example shown in FIGS. 1, 5 etc., three position detecting patterns (finder patterns) 104 are arranged at three corners of the code area respectively and, at predetermined positions, timing patterns 106 and alignment patterns 108 are arranged. The patterns 104, 106 and 108 serve as the specification patterns.

In this way, at the predetermined positions in the code area of the information code 100, there are arranged the fixed-shaped specification patterns (i.e., the position detecting patterns 104, timing patterns 106 and alignment patterns 108 (omitted from FIG. 5). Inside the code area, a space other than the later-described free space 110 is used for arrangement of such specification patterns, recording regions (each of which is the recording region or the error correction code recording region), and other necessary regions.

The reader 10 may use many methods to interpret the number of lines and the number of columns, which are composed of cells, of the information code 100, the shapes and positions of the specification patterns, the position of format information, candidate positions of code words (i.e., addresses specifying the arrangement order of code words), and others. For example, a plurality of versions may be set depending on types of the information code 100, where, for each of the versions, the number of lines of cells and the number of columns of cells, the shapes and positions of the specification patterns, the positions of format information, and candidate positions (addresses)) of code words may be predetermined. When version information is arranged at predetermined positions (reserved regions) in the code area, the reader 10 can read the version information at the predetermined positions. Based on this version information, the reader 10 can understand the number of lines of cells and the number of columns of cells, the shapes and positions of the specification patterns, the position of the format information, the candidate positions (addresses) of code words in the information code 100. The reader 10 may use an alternative approach to understand the foregoing pieces of information.

In addition, inside the code area, the free space 110 is formed to have a size larger than the size of the single cell 102. This free space 110 is located at a region other than the specification pattern regions, the data recording region, and the error correction code recording regions. The free space 110 can be set as a region in which data on the cells 102 are not recorded and to which error correction on error correction codes are not applied. In the example shown in FIGS. 1, 5 etc., the data recording region and the error correction code recording regions are arranged along the inner ends of the code area so that such regions are located in a ring and rectangular shape (that is, a rectangular frame shape), while the free space 110 is formed in a central part of the code area (i.e., a preset space containing the center of the code region).

The region into which no data is recorded by the cells 102 is defined as a region in which code words including data code words and error correction code words are not recorded and the format information is not recorded. Moreover, the region to which the error correction using error correction codes is not applied means a region to which the error correction using error correction codes recorded in the error correction code recording region is applied. In consequence, even when some sort of information (which is, for example, additional information described later in the present disclosure) is recorded in the free space 110, that information is not subjected to the error correction which uses error correction codes recorded in the error correction code recording region located around the free space 110.

In the following, a representative example will be explained in which a code configuration assigned to a predetermined version drawn as the right figure in FIG. 5 is made to correspond to a code configuration assigned to a further version (i.e., version number) smaller than the predetermined version as the left figure in FIG. 5. Moreover, the positions of respective code words of the information code 100 drawn on the right side of FIG. 5 are made to correspond to the positions of respective code words of another type of code 120 drawn on the left side of FIG. 5 by an arrangement conversion table shown in the lower part of FIG. 5. In this example, as long as an amount of data can be stored in the other type of code 120 shown on the left side in FIG. 5, such data can expressed in a region which remains after formation of the free space 110 the information code 100 on the right side in FIG. 5. When the information code 100 on the right side of FIG. 5 is read, the code words of this information code 100 can be read such that they are code words of the other type of code 120 on the left side in FIG. 5.

On the right figure of FIG. 5, the regions of the respective code words, which are mapped around the free space 110, are conceptually shown by dashed line frames. Regions in which the format information (i.e., the cells at the predetermined positions 105) are conceptually shown by a predetermined type of hatched lines. The regions in which the format information or the code words are recorded are shown by only squares, omitting practical light and dark cell arrangements from being drawn. In addition, although the example shown on the right side in FIG. 5 provides the free space 110 located at the central part of the code area has squares drawn therein, the free space 110 can be configured freely, so that the free space 110 may be drawn with a design as shown in FIG. 1 or with other forms. The free space 110 is formed such that the free space positionally corresponds to an arrangement of cells. In the present embodiment, the free space is also referred to as a canvas area.

Figure 6:
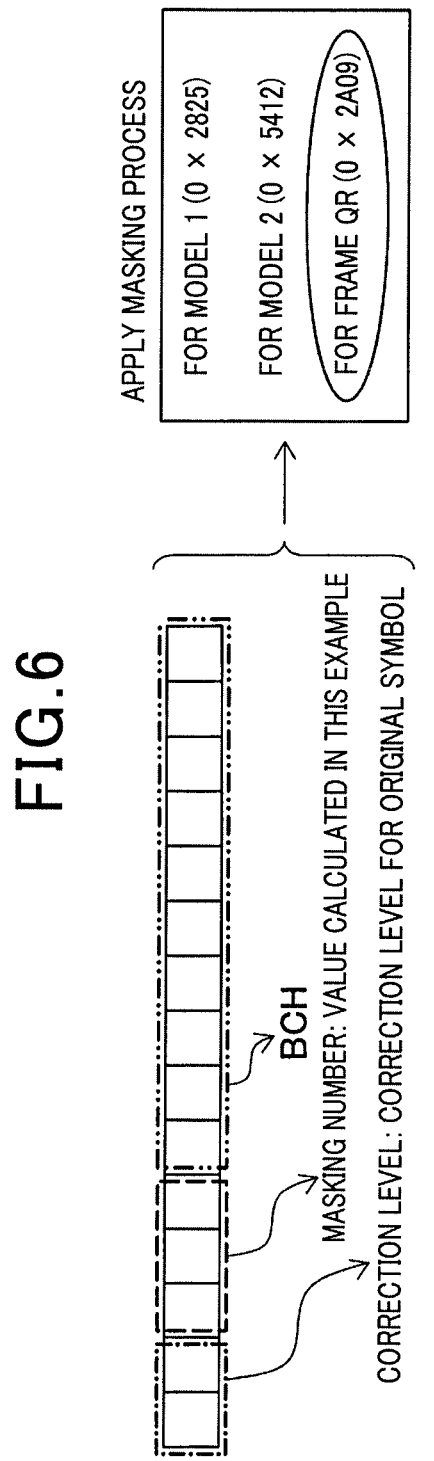
FIG. 6 is an explanatory diagram that conceptually explains format data of the information code used in the system which uses an information code in FIG. 1

The format information (type information) is configured as shown in FIG. 6 for example, and recorded at the predetermined positions 105 (portions with a predetermined type of hatched lines) in the information code 100. This recording is performed on a specified format configuration. This format information includes correction level information for specifying an error correction level and mask number information for specifying a mask number. The correction level information is to specify an error correction level used by the information code 100, and corresponds to an error correction level used by another type of code 120 in cases where the information code is converted to the other type of code 120 for reading. The mask number is used to specify what type of masking has been applied to the code word region of the information code 100, where data code words and error correction code words are recorded in the code word region.

The format information shown in FIG. 6 is recorded so that a predetermined type of mask pattern (a specified mask) is reflected in the format information. The type of mask indicated by the format information is identified by a method similar to a known QR code, thus making it possible to detect a specified code type as shown on the right side in FIG. 5 (i.e., a code type with the free space 110). In the QR code according to a known standard, when the QR code is configured on a model 1 for example, a mask for the model 1 is applied to the format information shown in FIG. 6, so that data (i.e., a cell arrangement) are produced by the masking and the produced data are recorded at predetermined positions. Similarly, in configuring the QR code on a model 2, a mask for the model 2 is applied to the format information shown in FIG. 6, so that data (i.e., a cell arrangement) are produced by the masking and the produced data are recorded at predetermined positions.

Meanwhile, in the information code 100 shown in FIG. 5 of the present embodiment (that is, in the special type of code with the free space 110), a specified mask which is different in type from the models 1 and 2 is applied to the format information shown in FIG. 6. This application produces an expression of data (i.e., an arrangement of cells), and the data are recorded in predetermined positions 105. In this example, the specified mask is exemplified as being for a casing trim QR (quick response) (or frame QR) in FIG. 6 and the frame QR is one kind of the two-dimensional code.

For any type selected from the models 1 and 2 on a known standard and the information code 100, the formal information is configured such that check digits for a correction level (correction level information) for recording and a mask number are included in the format information, and making for the selected type is then applied to the format information. Practically, the mask pattern for each type is used to be subjected to the format information using a known masking process, resulting in that an arrangement of light cells and dark cells, corresponding to a masked bit pattern, is recorded at the predetermined positions 105.

Accordingly, when the format information is masked by a specified mask (in FIG. 6, this specified mask is exemplified as being for the fame QR) and recorded at the predetermined positions 105, the cell information recorded at the predetermined positions 105 is released from being masked by using the specified mask and then interpreted for revealing the same check digits. Thus it can be determined that the type is for the information code 100.

In contrast, if the cell data at the predetermined positions in the information code 100 are un-masked based on the masks for the model 1 or 2, the check digits are produced differently from the originally added check digits. It can thus be determined that an information code is not according to the known models 1 and 2.

In this information code 100, the specification patterns (such as the position detecting patterns 104) are detected, and the same method as that for known QR codes is used to specify the direction of the code and the positions of the respective cells, before the format information recorded at the predestined positions are interpreted using the same method as that for the known QR codes. The type of a mask which has been disclosed through the interpretation provides the type of the information code 100, i.e., the type of this code is a special type with the free space 110. The interpreted format information results in determining both an error correction level used in the information code 100 and the type of a mask applied to the code word region (i.e., a region in which data code words and error correction code words are recorded by cells).

Moreover, inside the free space 110, identification indications (markings 121a) are written or arranged to show the extent of the image region 121, whereby users can write information into the image region after producing the code or during use of the code. The inside area of the markings 121a is painted or drawn in one or more colors (for example, white), while the marking 121a is delineated in a predetermined color (for example, black) which is different from the inside area of the image region 121. Hence, the marking 121a serves as an identification indication. Hence, it is possible for users to write information into the image region 121 with use of a different color from the inside background of the image region 121. When writing is done in such a way, the reader 10 can recognize the written information based a difference between the hues or the luminance levels.

In the example shown in FIG. 5, the right-side figure, and FIG. 10, (A), etc., the marking 121a is exemplified as a square identification indication whose inside area becomes the image region 121. As long as the boundary (edge) of the image region 121 can be set, any kind of shapes and configurations is acceptable to the identification indication. For example, the image region is expressed by a predetermined color (for example, white), the outside background adjacent to the edge of the image region 121 can be sectioned in a color different from the predetermined color. In such a case with no marking, the outside background of the image region functions as an identification indication.

Figure 3:
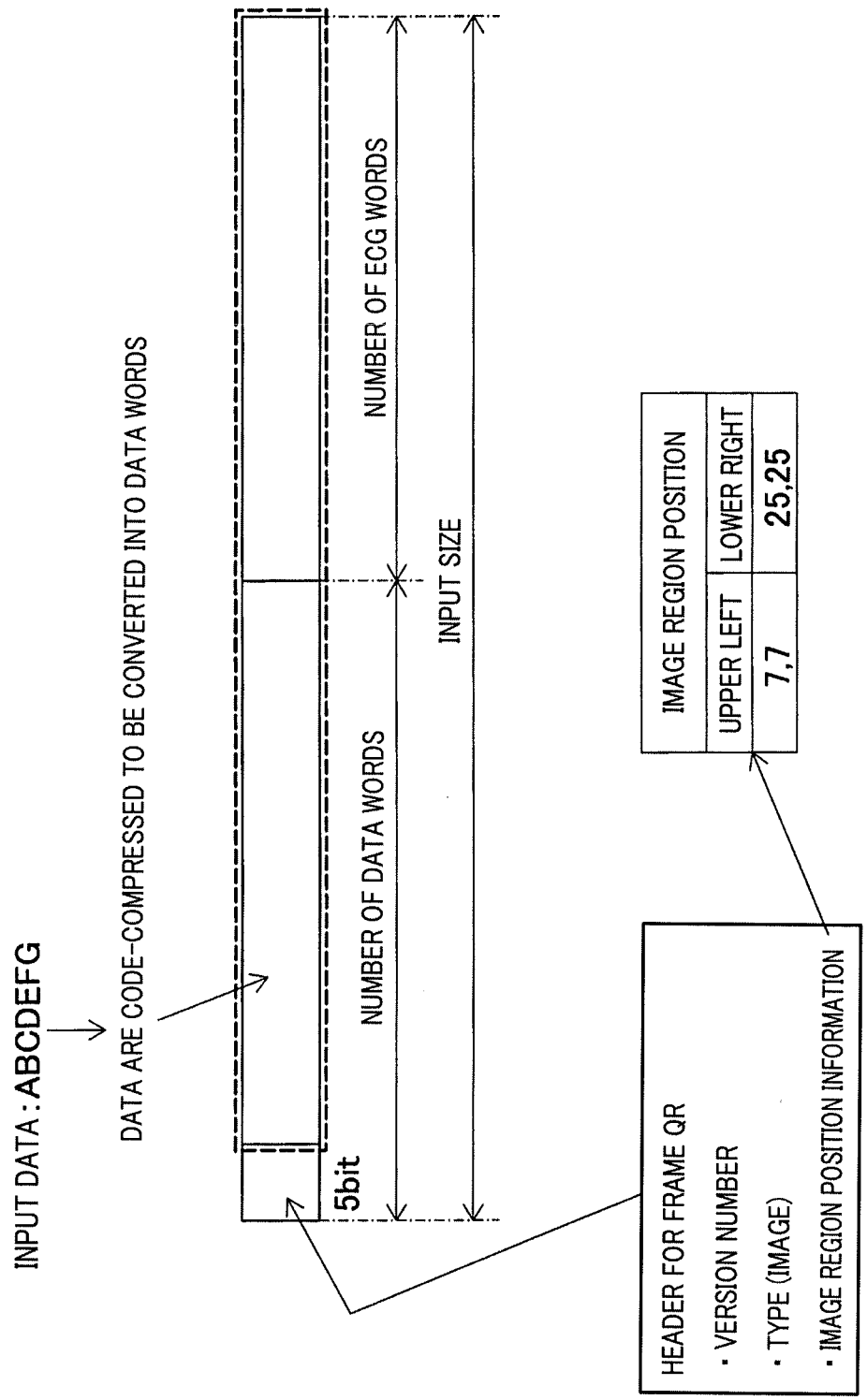
FIG. 3 is an explanatory diagram that conceptually explains a data configuration of an information code used in the system which uses an information code in FIG. 1.

Contents recorded in the information code 100 are formatted into a data arrangement as shown in FIG. 3, for example. Header data (i.e., a header for the frame QR) are put at the head of the data arrangement, which are followed by input data (i.e., data to be interpreted). In the example shown in FIG. 3, the input data (data to be interpreted) are compressed using a known compressing technique so that the input data are converted into data words (or data code words). This compression may be omitted, if it is unnecessary. The header data used in this information code 100 are also called "header for frame QR" in the following explanation. Further, in the present disclosure, the data recording region is composed of regions in which the data words (data code words) of the header data and the input data as well as regions in which the forgoing format information is recorded. In the example shown in FIG. 3, there are recorded, as the header data (the header for the fame QR), not only specifying information but also identifying information are recorded. The specifying information, which is exemplified as being the version number in FIG. 3, is able to specify the type (version) of the other type of code 120 later described. This other type of code 120 is a code type for interpreting the information code 100 and made to correspond to the information code 100 via the arrangement conversion table (shown in FIG. 5). The identifying information is used to identify a format in the free space.

In the data format shown in FIG. 3, there are mapped, as the header data, data showing the type (version number) of the other type of code and other information. The other information includes information (first information) for specifying that the format of the free space 110 is an image format shown in FIGS. 5, 10 etc., and another type of information (second information) which is able to specify a position (image region position) of an image in the free space 110. Of these, the first information exemplifies the identification information showing that the image region is present.

In the example shown in FIGS. 3 and 5, there are recorded the image region position information (position data), which is information capable of specifying the positions of the rows and columns of the image region 121 provided as an information input region.

Practically, when the rectangular information code 100 shown in FIG. 5 is divided into a grid of plural rows and plural columns, combinations of the row and column positions of the image region 121 are recorded as the image region position information (position data). Instead of such row and column positions at the two upper-left and lower-right corners, the combinations of row and column positions at the four corners may be used as the image region position information (position data). The widths of each row and each column of the grid of the information code 100 are made to equal to the widths of the row and column of a single cell. All the cells have the same row and column sizes. As a result, the positions of the image region 121 can be specified.

Furthermore, the input data (i.e., data words being interpreted) are followed by error correction code words (ECC words) which are error correction codes. In the information code 100, a region in which the error correction codes are recorded functions as an error correction code recording region. As a method of producing error correction codes (i.e., error correction code words) based on the data words (i.e., the header data and the input data (which are data to be interpreted) in the example shown in FIG. 3), methods based on known two-dimensional codes (such as QR codes) can be employed. By way of example, as a method of producing the error correction code words based on the data words (i.e., data code words), a production method for error correction code words regulated by JISX0510:2004 (, which is JISX0510:2004, 8.5 error correction) can be used as one of known methods. This production method for the error correction code words is not limited to the foregoing, and this production may be performed using various other methods.

Moreover, in the information code 100, the respective data words (data code words) expressing data being interpreted (object data to be outputted) and the error correction code words are arranged or mapped within the code area on the basis of predetermined arrangement position information. In this configuration, as shown in FIG. 5, arrangement candidate positions for respective code words are defined previously in the code area of the information code 100, and the numbers (addresses) are assigned to the respective arrangement candidate positions. The arrangement position information specifies arrangement of the code words such that the respective code words composing the recording contents shown in FIG. 3 should be arranged at which of the arrangement candidate positions. In the example shown on the right figure in FIG. 5, the arrangement candidate positions Nos. 1-25 are outlined by way of example, in which the head and last bit portions are numbered for explicit showing in each of the arrangement candidate positions and arrangement candidate positions of Nos. 26 or higher are omitted from being drawn.

Specifically, in the case of the version of the other type of code 120 (in this case, a known QR code) where the version is specified by the header data shown in FIG. 3, known regulations or rules are applied to determine that each of the code words having an arrangement order should be arranged or mapped at which position in the other type of code 120. In interpreting the other type of code 120, the arrangements defined in this way are used to interpret the code words in the arrangement order. For instance, in the other type of code 120 shown on the left side in FIG. 5, the zero-th code word is arranged at the lower right, the first code word is arranged next to the upper edge of the zero-th code word, and the second code word is arranged next to the upper edge of the first code word. In this way, the arrangement positions of the respective code words are decided previously. The other type of code 120 is thus interpreted in sequence based on the predetermined arrangements, like the order starting from the zero-th code word, the first code word, the second code word, the third code word, . . . , and to the last one.

The arrangement position information (the arrangement conversion table) shown in FIG. 5 is provided to make the numbers of the respective arrangement positions (i.e., arrangement positions of the code words according to the arrangement order) previously decided in the other type of code 120 correspond to the numbers of the candidate positions (i.e., the arrangement candidate positions of the code words) previously decided in the information code 100, respectively. To be more precise, in the arrangement position information, correspondence information showing "the arrangement position of the first code word in the other type of code 120 corresponds to the first arrangement candidate position in the information code 100", "the arrangement position of the second code word in the other type of code 120 corresponds to the second arrangement candidate position in the information code 100", "the arrangement position of the third code word in the other type of code 120 corresponds to the third arrangement candidate position in the information code 100", and so on, is recorded as, for example, table data. As a result, the arrangement positions of the code words numbered in the other type of code 120 are made to respectively correspond to the arrangement candidate positions of the information code 100.

Thus, in interpreting the information code 100, the code words at the arrangement candidate positions in the code area, i.e., the addressed code words in the code area, are re-arranged to arrangement positions in the other type of code 120 which arrangement positions are specified by the arrangement position information (i.e., the arrangement conversion table). The other type of code 120 thus re-arranged is then subjected to interpretation based on a known interpretation method.

For example, by using the arrangement conversion table shown FIG. 5 to interpret the information code 100, the code word at the first arrangement candidate position in the information code 100 is arranged at an arrangement position assigned to the first code word in the other type of code 120; the code word at the second arrangement candidate position in the information code 100 is arranged at an arrangement position assigned to the second code word in the other type of code 120; and the code word at the N-th arrangement candidate position in the information code 100 is arranged at an arrangement position assigned to the M-th code word made to correspond to the N-th arrangement candidate position in the other type of code 120. As exemplified above, the re-arrangement is performed for every code word, and the other type of code (e.g., QR code) whose code words are re-arranged is subject to a known interpretation method.

It is preferable that the arrangement position information (the arrangement conversion table) is owned, as common data (a common arrangement conversion table), by both the information code producing apparatus 2 producing the information code 100 and the information code reader 10 reading the information code 100.

(Information Code Production Process)

Next, an information code production process and an information code production method will be described with reference to FIG. 8 and other drawings. Hereafter, in the description, an example is given in which the other type of code 120 is a QR code (registered trademark) such as that in FIG. 5, and the information code 100 has a specification patterns similar to those in the QR code. In this example, the information code 100 having the free space 110 is also referred to as a "frame QR". The frame QR is one kind of the two-dimensional code. The steps in the process related to production are indicated by "S". This method of description is similarly used in subsequent embodiments.

Figure 8:
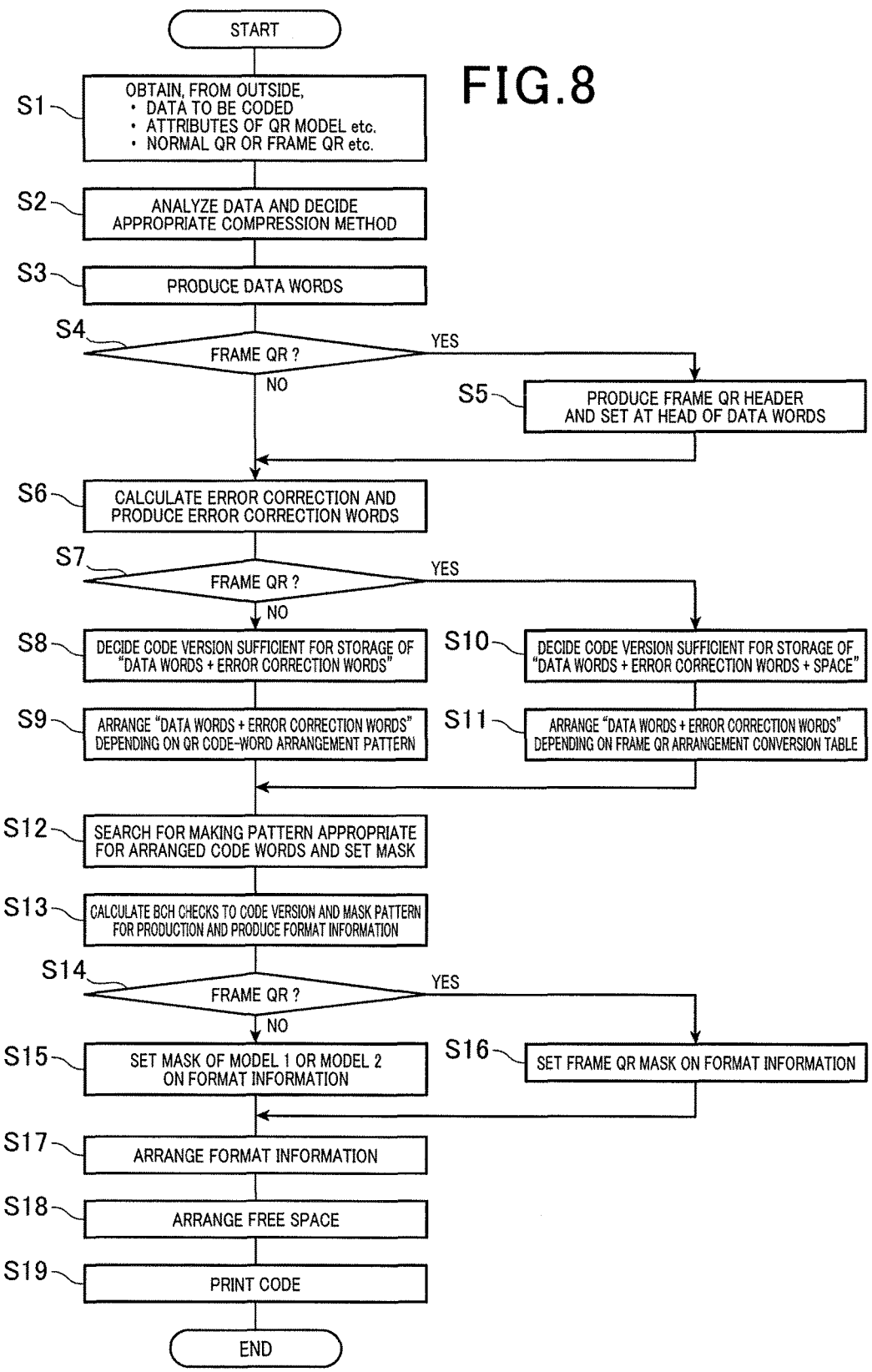
FIG. 8 is a flowchart of an example of the process for producing the information code by the information code producing apparatus configuring the system which uses an information code in FIG. 1.

The information code production process in FIG. 8 is a process performed by the information code production apparatus 2. For example, execution of the process is started by a predetermined operation in the operation unit 4. In this process, first, the information code production apparatus 2 obtains data to be coded (data to be interpreted), attribute data, and code type data (data specifying whether to generate the information code 100 according to the present invention or a typical two-dimensional code (such as a typical QR code)) from outside (S1). In the present configuration, the control unit 3 and the operation unit 4 correspond to an example of a "data obtaining unit", and function to obtain the data to be interpreted (input data from outside). In addition, this is not limited to such an example. For example, the control unit 3 and the communication unit 7 may be configured as the "data obtaining unit", and may function to obtain data inputted by communication from outside as the data to be interpreted.

After obtaining the data at S1, the information code production apparatus 2 determines the method for compressing the obtained data, using a publically known method (S2). The information code production apparatus 2 then expresses the data in which the input data is compressed (data to be interpreted) by a plurality of data words (data code words) (S3). After S3, the information code production apparatus 2 determines whether or not the code type data obtained at S1 indicates the type (frame QR) of the information code 100 having the free space 110. When determined that the code type data obtained at S1 indicates the type (frame QR) of the information code 100 having the free space 110, the information code production apparatus 2 proceeds to Yes at S4. The information code production apparatus 2 produces unique header data (described above) used in the type (frame QR) of the information code 100 having the free space 110, and sets the produced header data at the head of the data arrangement including the plurality of data words, as in FIG. 3 (S5). As described above, information (such as version number information) enabling identification of the type (version) of the other type of code 120, shown in the right-hand drawing in FIG. 5, information specifying the format of the free space 110 to be an image format (first information), and information enabling identification of an image region (writable position) within the free space 110 ("image region position information" corresponding to second information) are recorded in the header data in FIG. 3. Meanwhile, when determined that the code type data obtained at S1 does not indicate the type (frame QR) of the information code 100 having the free space 110 (when the data selects a typical two-dimensional code (for example, the data selects model 1 or model 2)), the information code producing apparatus 2 proceeds to No at S4.

When proceeding to No at S4, the information code producing apparatus 2 produces an error correction code using a publically known method, based on the configuration of the data words (data code words) produced at S3. The information code producing apparatus 2 produces a plurality of error correction words (error correction code words) expressing the error correction code (S6). Meanwhile, when proceeding from S4 to S5, the information code producing apparatus 2 produces the error correction code using a publically known method, based on the configuration of the final data words (a plurality of data code words expressing the header data and the input data) produced at S3 and S5, and produces a plurality of error correction words (error correction code words) expressing the error correction code (S6).

After S6, the information code producing apparatus 2 determines whether or not the code type data obtained at S1 indicates the type (frame QR) of the information code 100 having the free space 110 (S7). When determined that the code type data obtained at S1 does not indicate the type (frame QR) of the information code 100 having the free space 110, the information code producing apparatus 2 proceeds to No at S7. The information code producing apparatus 2 produces a two-dimensional code (such as a QR code) using a publically known method. When proceeding to No at S7, the information code producing apparatus 2 determines the version of the two-dimensional code having a size capable of storing the data words (data code words) produced at S3 and the error correction words (error correction code words) produced at S6 (in this example, the version having a size capable of storing the data words produced at S3 and the error correction words produced at S6, among the plurality of versions of the standardized, publically known QR code). Based on an arrangement pattern determined in advance by the version, the information code producing apparatus 2 arranges the data words produced at S3 and the error correction words produced at S6 (S9).

Meanwhile, when the code type data obtained at S1 indicates the type (frame QR) of the information code 100 having the free space 110, the information code producing apparatus 2 proceeds to Yes at S7. The information code producing apparatus 2 determines the version of the information code 100 that is capable of storing the data words (data code words) produced at S3 and S5, the error correction words (error correction code words) produced at S6, and the free space (S10). The size of the free space may be a fixed size determined in advance. Alternatively, the size of the free space may be designated by user input or the like at a stage preceding S10. In addition, the size of the free space may be specified in terms of the numbers of rows and columns. Alternatively, the size of the free space may be specified by information such as the number of words to which the free space amounts, or the number of cells to which the free space amounts. In the examples in FIG. 5 and FIG. 8, for example, the version having a size capable of storing the data words (data code words) produced at S3 and S5, the error correction words (error correction code words) produced at S6, and the free space is determined, from among the plurality of versions (sizes) determined in advance for the type of the information code 100. When a plurality of versions can be used in the type of the information code 100, the numbers of rows and columns, the shape and arrangement of the specification patterns, the arrangement of the format data, and the arrangement candidate position of each code word may be determined for each version. In addition, in all of the versions, the arrangement candidate position of each code word may be determined in sequence from the outer peripheral side as in the right-hand diagram in FIG. 5 (for example, the arrangement candidate positions are set in sequence from the outer peripheral side inward in a spiraling manner). The arrangement candidate position of each code word may be determined such as to be positioned further outward as the sequence number of the arrangement candidate position becomes lower. A portion in which a code word is not arranged (that is, a portion that is not in use), among the prepared arrangement candidate positions, may then be used as the free space. As a result, a wider free space is more easily secured in the center portion. Furthermore, when a plurality of versions having a size capable of storing the data words (data code words) produced at S3 and S5, the error correction words (error correction code words) produced at S6, and the free space are present, the smallest version (size) may be selected from the plurality of versions. Alternatively, the user may designate any version (size) among the plurality of versions. When the information code 100 is produced, the size (number of rows and number of columns), the arrangement of the specification patterns, and respective candidate positions of the code words that are determined in advance in the version that has been determined as described above are used. In addition, the specific code word arrangement sequence is determined based on the above-described arrangement conversion table. An example in which a version such as that in the right-hand drawing in FIG. 5 is determined at S10 will be described in detail below.

After S10, the information code producing apparatus 2 arranges the data words (data code words) produced at S3 and S5 and the error correction words (error correction code words) produced at S6 based on the above-described arrangement position information (arrangement conversion table). In the information code producing apparatus 2, the above-described arrangement position information (arrangement conversion table) is stored in the storage 5. In the arrangement conversion table, as described above, each arrangement position (the arrangement position of each of the code words aligned in the sequence) determined in the other type of code 120 is associated with a candidate position (arrangement candidate position of each code word) determined in advance in the information code 100. In the process at S11, the information code producing apparatus 2 identifies the arrangement position of each code word (each of the code words aligned in the sequence) when the code words to be recorded (the data words (data code words) produced at S3 and S5 and the error correction words (error correction code words) produced at S6) are expressed by the other type of code 120 (the two-dimensional code having a size that is smaller than the information code 100, and is capable of storing the data words produced at S3 and S5 and the error correction words (error correction code words) produced at S6) shown in FIG. 4 and in the left-hand diagram in FIG. 5. The information code producing apparatus 2 then arranges code words in the sequence in the arrangement candidate position within the information code 100 associated with the arrangement position of each of code words aligned in the sequence, based on the arrangement position information (arrangement conversion table). For example, in the arrangement position information (arrangement conversion table) in FIG. 5, the arrangement position of the first code word in the other type of code 120 is associated with the first arrangement candidate position in the information code 100. Therefore, the first code word among the code words to be recorded (the data words produced at S3 and S5 and the error correction words produced at S6) is arranged in the first arrangement candidate position within the information code 100. In addition, the arrangement position of the second code word in the other type of code 120 is associated with the second arrangement candidate position in the information code 100. Therefore, the second code word among the code words to be recorded is arranged in the second arrangement candidate position within the information code 100. In this way, when the arrangement position in the other type of code 120 in which the N-th code word, among the code words to be recorded, is to be arranged (the arrangement position of the N-th code word) is associated with the M-th arrangement candidate position in the information code 100, the N-th code word, among the code words to be recorded, is arranged in the M-th arrangement candidate position within the information code 100.

In other words, if considering only the data words produced at S3 and S5 and the error correction words produced at S6, the data words and the error correction words can be expressed by the other type of code 120 (configured as a publically known QR code) having a smaller size than the information code 100. However, when the data words produced at S3 and S5, the error correction words produced at S6, and the free space 110 are to be stored, the data words, the error correction words, and the free space 110 are required to be expressed by the information code 100 having a larger size. Therefore, according to the present embodiment, the data words produced at S3 and S5, the error correction words produced at S6, and the free space 110 are expressed by the information code 100 having a larger size than the other type of code 120. The correspondence between the arrangement of the code words when the data words produced at S3 and S5 and the error correction words produced at S6 are expressed by the other type of code 120 (the publically known QR code) and the arrangement of the code words when storing in the information code 100 that has a larger size is able to be identified by the arrangement conversion table determined in advance.

In the present configuration, the "arrangement conversion table" such as that in FIG. 5 corresponds to an example of "arrangement position information that specifies each arrangement position when a plurality of data words expressing data to be interpreted are arranged in a code region". The arrangement conversion table (arrangement position information) is configured as information that prescribes the association of each data word in a sequence when the data to be interpreted is expressed by a plurality of data words and each arrangement position within the code region of each data word in the sequence. In addition, the storage 5 corresponds to an example of an "arrangement position information recording unit", and functions to record the data of such an arrangement conversion table (arrangement position information).

After S9 or S11, the information code producing apparatus 2 determines the mask pattern to be applied to the code words of which the arrangement locations have been determined at S9 or S11, using a predetermined publically known method (such as a publically known method used for QR codes). The information code producing apparatus 2 then applies the mask using a publically known masking process method, such as to reflect the determined mask pattern in the code words for which the arrangement locations have been determined at S9 or S11 (S12). Then, the information code producing apparatus 2 calculates a check digit based on the information on the mask pattern (masking number) set at S12 and the information on error correction level, and generates format information including the error correction level, the mask number, and the check digit, as shown in FIG. 6 (S13). The data, such as the masking number and the error correction level, recorded as the format information may be inputted at S1.

When the code type data acquired at S1 indicates the type (frame QR) of the information code 100 having the free space 110, the information code producing apparatus 2 proceeds to Yes at S14. The information code producing apparatus 2 performs a masking process to reflect the above-described specified mask (frame QR mask) in the format information produced at S13 (see FIG. 6). Meanwhile, when the code type data acquired at S1 does not indicate the type (frame QR) of the information code 100 having the free space 110, the information code producing apparatus 2 proceeds to No at S14. The information code producing apparatus 2 sets a mask (mask of model 1 or mask of model 2) of a different mask pattern than the mask pattern set at S16. After applying the mask to the format information at S15 or S16, the information code producing apparatus 2 arranges the format information that has undergone the masking process in a predetermined position within the code region (S17).

After configuring the specification pattern regions, the data recording region, and the error correction region as described above, the information code producing apparatus 2 arranges the constituent elements of the free space 110 (S18). In the example in FIG. 3, the position of the image region is designated by a row position and a column position. Therefore, at S18, the information code producing apparatus 2 arranges graphical form data of an image region 121 in the position designated in this way. The image code producing apparatus 2 also arranges a graphical form (mark 121*a* in the example in FIG. 10 and the like) that enables identification of the outer edge of the image region 121. In the examples shown in FIG. 3, FIG. 5, and the like, for example, the graphical form of the image region 121 is determined in advance to be a rectangular graphical form (such as a quadrangular graphical form configured by a background of which the overall region is a single or a plurality of light colors). At S18, the information code producing apparatus 2 arranges each graphical form such that the upper left position and the lower right position of the graphical form, determined as described above, is at each position designated in the header data. In addition, a frame indicating the outer edge portion of the image region 121 is determined in advance to be a rectangular frame (such as a quadrangular, dark-colored frame). At S18, each graphical form is arranged such that the frame, determined as described above, is arranged along the outer edge portion of the image region 121.

In the example described above, the position (position of the image region), shape, and color of the image region, and the shape, color, and the like of the differentiated display, included in the header data in FIG. 3, are determined in advance. However, the position of the image region may be designated by user input. Furthermore, the shape and color of the image region, or the shape, color, and the like of the differentiated display may be designated by user input. In this case, an image region of a shape and color designated by the user is configured in the position designated by the user. The region is indicated by a differentiated display of a shape and color indicated by the user. In addition, symbols, such as characters and numbers, graphical forms, and the like may be arranged within the image region 121 or outside the image region. In this case, for example, the user may be allowed to input the symbols and graphical forms to be displayed and the positions of the symbols and graphical forms. At S18, the designated symbols and graphical forms may be arranged in the designated positions (such as in an upper position in the image region).

After producing the information code 100 or another two-dimensional code in this way, the information code producing apparatus 2 prints the code by the printing unit 8 (S19). At S19, rather than printing, the information code producing apparatus 2 may display the information code 100 or the like in the display unit 6. Alternatively, the information code producing apparatus 2 may transmit data of the information code 100 produced by the processes up to S17 to an external apparatus (for example, an information apparatus such as a mobile terminal or a computer).

Figure 4:
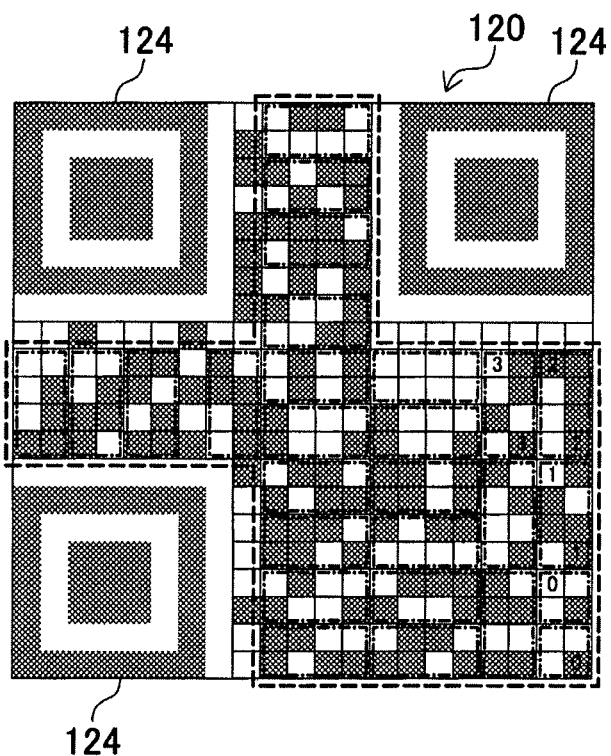
FIG. 4 is an explanatory diagram that conceptually explains an other type of code corresponding to the information code used in the system which uses an information code in FIG. 1.

In FIG. 4 and FIG. 5, the other type of code corresponds to the position detecting pattern 104 of the information code 100 and includes the position detecting patterns 124 that are automatically produced in three corners.

In the present configuration, the control unit 3 of the information code producing apparatus 2 corresponds to an example of a "data recording region generating unit". When the free space 110 is to be provided within the code region of the information code 100, the data recording region is generated such that the format information is recorded in a predetermined position within the code region in a specific format configuration, and each data word expressing the data to be interpreted (input data) obtained by the data obtaining unit is arranged based on the arrangement position information recorded in the arrangement position information recording unit. In addition, in the "data recording region generating unit" configured by the control unit 3, when the free space 110 is to be provided within the code region, the cell arrangement in the predetermined position 105 is configured in a state in which the mask pattern of a predetermined type (specific mask) is reflected.

(Information Code Reading Process)

Next, a process that is performed when the information code reader 10 in FIG. 2 reads the information code 100 shown in FIG. 1, the right-hand drawing in FIG. 5, and the like will be described.

Figure 9:
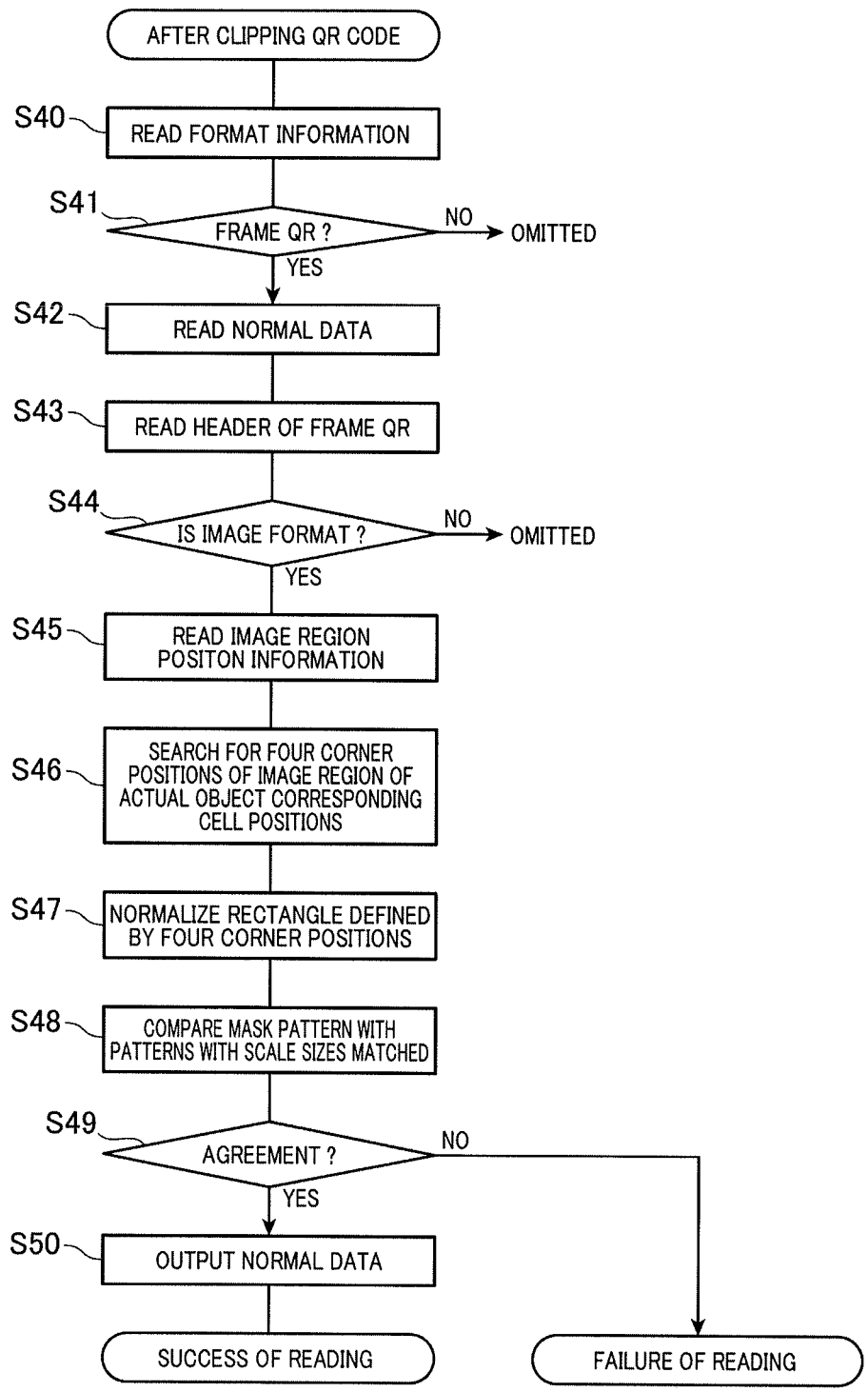
FIG. 9 is a flowchart of an example of the process for reading the information code by the information code reader configuring the system which uses an information code in FIG. 1.

The reading process in FIG. 9 is performed, for example, when the user performs a predetermined operation (such as operating the operation switch 42). First, the reader 10 captures an image of a two-dimensional code that is in an imaging area of the light receiving sensor 23, thereby obtaining a captured image of the two-dimensional code. The reader 10 also detects the shape of the two-dimensional code. Specifically, the reader 10 attempts to recognize the position detecting patterns 104 and detect the contour shape of the two-dimensional code using a publically known method. For example, the reader 10 detects the position detecting patterns 104 using a publically known method used for QR codes (registered trademark) in which a 1:1:3:1:1 waveform is detected, or the like. The reader 10 detects the contour shape of the captured two-dimensional code using a publically known method used for QR codes (registered trademark).

When a contour shape detection process such as this is performed, in a case in which an image of the information code 100 is captured, the contour shape of the information code 100 is detected. The contour shape detection method may be other methods, as long as the method is capable of detecting the shapes of the specification patterns and the contour shape of a two-dimensional code.

In the present configuration, the light receiving sensor 23 corresponds to an example of an "imaging unit" and functions to capture an image of the information code 100 produced by the information code producing apparatus 2.

When the contour shape of the information code 100 is detected and the code region of the information code 100 is extracted, the reader 10 interprets the information (format information) in the predetermined position 105 in the information code 100, and obtains the type of the captured information code and the mask correction level (S40).

Specifically, for example, the reader 10 attempts to interpret the information recorded in the predetermined position 105, as described above, by releasing the masking process based on the above-described specific mask (mask for frame QR). When the check digits match when the masking process is released using a method that enables release the mask of the above-described specific mask (in other words, when the check digit calculated based on the correction level data and the masking number data when the predetermined position 105 is interpreted, and the check digit recorded in the predetermined position 105 match), identification can be made that the type is the type of the information code 100 (the type having the free space 110). The error correction level and the masking number included in the format information can also be obtained.

When the masking process is able to be released based on the specific mask in this way (in other words, when recognition of the type (frame QR) of the information code 100 is made), the reader 10 proceeds to Yes at S41. Meanwhile, when the masking process is able to be released by a mask other than the specific mask (mask for frame QR), such as the mask for model 1 or the mask for model 2 shown in FIG. 6, the reader 10 proceeds to No at S41. When the masking process is able to be released by another mask, this indicates a case in which the two-dimensional code captured at S40 is a publically known QR code (registered trademark). Therefore, when proceeding to No at S41, the reader 10 interprets the QR code using a publically known method, and outputs the interpretation results. In FIG. 9, the processes when a No determination is made at S41 are omitted.

When proceeding to Yes at S41, first, the reader 10 interprets the data recorded in the data recording region (S42). Specifically, the reader 10 releases the mask on the overall code (specifically, the code word region) based on the masking number included in the format information acquired at S40. Then, the reader 10 identifies the original code size (version and format of the other type of code 120) based on the header data (frame QR header) provided at the head of the data words. The reader 10 restores the arrangement from that of the information code 100, such as that shown in the right-hand drawing in FIG. 5, to that of the original code (other type of code 120), such as that shown in the left-hand drawing in FIG. 5, based on an arrangement conversion table similar to that in FIG. 5. Specifically, the reader 10 rearranges the code word (data code words and error correction code words) in each arrangement candidate position in the information code 100 to the arrangement position within the other type of code 120 associated with the arrangement candidate position in the arrangement conversion table. As a result of the arrangement conversion, the other type of code 120 formed by recording the data code words and the error correction code words arranged in the information code 100 is obtained. The other type of code 120 is a publically known QR code, and therefore is interpreted using a method similar to that for publically known QR codes (in other words, error correction calculation and interpretation of data code words are performed using a publically known method, based on the error correction code words).

In the present configuration, the control circuit 40 corresponds to an example of a "determining unit". When the image of the information code 100 is captured by the imaging unit, the control circuit 40 functions to determine whether or not the predetermined position 105 of the code region has a specific format configuration. Specifically, the control circuit 40 functions to determine whether or not a mask pattern of a predetermined type (specific mask) is reflected in the predetermined position 105.

In addition, the control circuit 40 corresponds to an example of a "data recording region reading unit" and an "interpreting unit". When an image of the information code 100 is captured by the imaging unit, the control unit 40 functions to read the data recorded in the data recording region based on the contents of the data recording region and the error correction code recording region in the code image of the captured information code 100. Specifically, when the determining unit determines that the predetermined position 105 has the specific format configuration (more specifically, when the mask pattern of the predetermined type is reflected in the predetermined position 105), the control circuit 40 functions to identify the position of each data word within the code region based on the correspondence information (arrangement conversion table) recorded in the correspondence information recording unit, and interpret the data to be interpreted.

The arrangement conversion table corresponds to an example of "correspondence information". The arrangement conversion table is configured as information that determines each correspondence position within the other type of code 120 when each data word in a sequence expressed in each arrangement position in the code region is expressed by a format (a format determined by a publically known standard or the like) that is prescribed in advance in the other type of code 120 that differs from the information code 100. When the determining unit determines that the predetermined position 105 has the specific format configuration, the control circuit 40 corresponding to the interpreting unit then functions to interpret the other type of code 120 in a configuration in which the data word in the sequence expressed in each arrangement position in the code region is converted to each correspondence position within the other type of code 120 determined by the correspondence information.

After interpreting the data in the data recording region at S42, the reader 10 reads the format information included in the header data (frame QR header). When determined that the format information is format information indicating "image format", the reader 10 proceeds to Yes at S44. When determined that the format information indicates another format, the reader 10 proceeds to No at S44. In FIG. 9, the processes performed when the reader 10 proceeds to No at S44 are omitted.

When proceeding to Yes at S44 (in other words, when determined that the format information included in the header data (frame QR header) is the format information indicating "image format"), the reader 10 reads the image region position information (position data) included in the header data (S45). The reader 10 then identifies the position of the image region within the information code 100 (S46). Specifically, in the present configuration, a rectangular image region is assumed to be formed. At S46, the reader 10 identifies the positions of the four corners of the image region in the code image by analyzing the code image. For example, the position information of the four corners of the image region (such as a combination of the row position and the column position at each position of the four corners) is recorded as the image region position information (position data). In this case, the reader 10 can identify the positions of the four corners of the image region from the position data. In this case, the position data corresponds to position identification data that indicates the position of a region to be recognized by an image processing unit.

After identifying the positions of the four corners of the image region at S46, the reader 10 performs a process to normalize the image region (S47). In the normalization process, an image that is tilted as in FIG. 12(B) is converted to an image having a prescribed shape (a square in FIG. 12(A)) as in FIG. 12(A) by, for example, a known projective transformation process. In the normalization method, a distortion correction technique or a shape correction technique that is well known in the image processing field can be used. For example, various publically known techniques can be applied as long as the technique enables a quadrangular image that is not a square as in FIG. 12(B) to be converted to a square image as in FIG. 12(A).

In an example of the projective transformation process, for example, the coordinates of each pixel are converted by publically known expressions below.

$$u = x \times a + y \times b + c - x \times g \times u - y \times h \times u$$

$$v = x \times d + y \times e + f - x \times g \times v - y \times h \times v$$

wherein, x and y denote the X coordinate and the Y coordinate before conversion,
a, b, c, d, e, f, g, and h denote conversion coefficients, and
u and v denote the X coordinate and the Y coordinate after conversion.

For example, the coordinates before conversion are T1 to T4 (the coordinates of the four corners identified at S46 and are known values) as in FIG. 12(B). When this region is converted to the square image as in FIG. 12(A), if the coordinates of S1 to S4 can be identified, the coordinates after conversion of each pixel can be easily identified by the above-described calculation formula. Regarding the coordinates of S1 to S4, for example, S1 is set to the same coordinates as T1. The coordinates of S2 to S4 can then be determined such as to form a square of which each side is of a "predetermined length" with S1 as the upper left position. The length of each side (predetermined length) after conversion may be set to match the length of the longest side among the sides of the image before conversion in FIG. 12(B). Alternatively, the length of the sides may be set to a value determined in advance. For example, when the length of each side (predetermined length) after conversion is set to a fixed value, information on the fixed value may be recorded in advance in the data recording region as normalization size information (information specifying the size for normalization for image processing or image output). In addition, when the length of each side (predetermined length) after conversion is set to the length of the longest side among the sides of the image before conversion, information designating this setting may be recorded in advance in the data recording region as the normalization size information. As a result, when the positions of the four corners are identified at S46, the image in the image region can be converted to a normalized image having a square shape of which one side has the "predetermined length". An example of normalization is described herein. However, various methods can be used as long as the method is a publically known method that enables an obtained actual image to be converted to an image having a prescribed shape.

The processes at S47 and S48 can, for example, be performed in bit map format by extracting the image region identified at S46 as a bit map image. Various publically known formats can be used in addition to the bit map format. GIF format, JPEG format, and the like may be used. Alternatively, an image file format other than the foregoing may be used.

After producing the normalized image at S47, the reader 10 performs a pattern matching process (match determination process) at S48.

Figure 11:
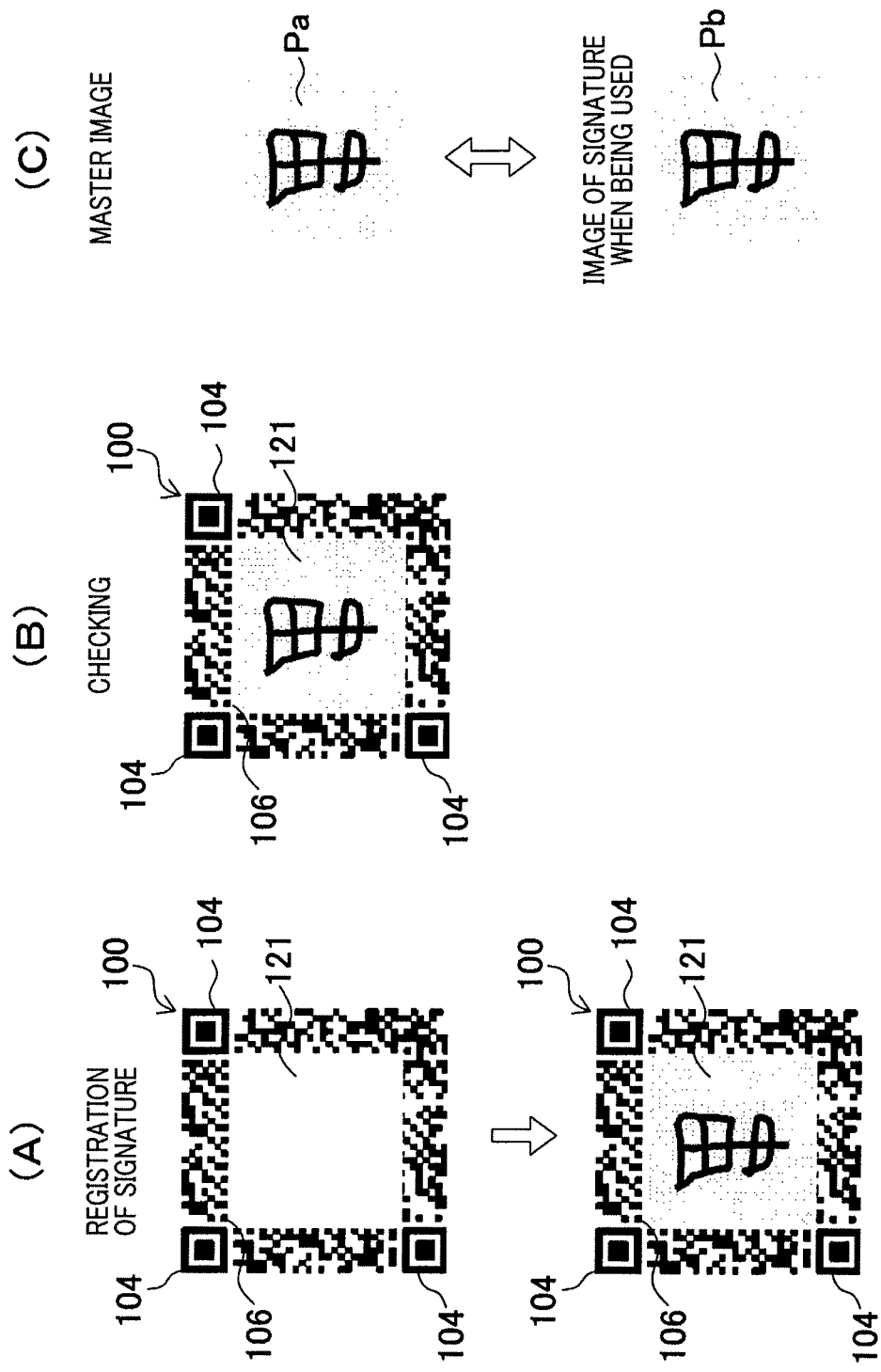
FIG. 11(A) is an explanatory diagram that explains registration of a signature image in the system which uses an information code in FIG. 1.
FIG. 11(B) is an explanatory diagram that explains the information code to be authenticated.
FIG. 11(C) is explanatory diagram that explains verification between a registered signature image and the image to be authenticated.

In the present configuration, a master image such as that in the upper portion of FIG. 11(C) is registered in advance in the memory 35. The registration method for the master image is merely required to be a method enabling registration of a signature image as in the upper portion of FIG. 11(C). An image of a signature that has been hand-drawn by the user may be captured by a publically known camera, and registered as in FIG. 11 (C). Alternatively, the process in FIG. 9 may be performed in advance on the information code 100 in which a signature has been drawn by a user as in FIG. 11A. The image normalized at S47 may be registered as the master image as in FIG. 11(C). In this case, the graphical form to be normalized at S47 may be set to a prescribed square shape, rectangular shape, or the like.

At S48, the reader 10 compares the signature image registered as described above with an image in the image region 121 normalized at S47 using a publically known pattern matching method. The reader 10 then determines whether or not the matching results match at S49. When determined that the matching results match, the reader 10 proceeds to Yes at S49. The reader 10 outputs the information in the data recording region interpreted at S42 and the determination result (information indicating a "match" when the matching results match) at S49. When determined that the matching results do not match at S49, the reader 10 performs a predetermined failure process. In this case, the reader 10 may display error information or the like. Alternatively, the reader 10 may output the data interpreted at S42 and the determination result (information indicating no match) at S49. In either case, the output may be performed such as to be displayed in, for example, a liquid crystal display unit 46, or transmitted to an external apparatus as data. Here, an example is given of a method in which the image normalized at S47 and the registered image (master image) are compared by pattern matching. However, whether or not the images match may be determined by other publically known methods, such as a method in which characteristic points of both images are compared to each other.

In the present configuration, the memory 35 corresponds to an example of a registering unit. The memory 35 functions to register a pattern image for comparison with the image in the image region 121. Specifically, a signature image in which handwritten characters are expressed as image data is registered as the pattern image.

In the present configuration, the control circuit 40 corresponds to an example of an "image processing unit". The control circuit 40 functions to identify the position of the image region within the code image based on the position data obtained from the reading result of the data recording region by the data recording region reading unit. The control circuit 40 also functions to perform an image recognition process on the image in the image region by a method differing from that of the interpretation process of the data by the data recording region reading unit. Specifically, the control circuit 40 functions to determine whether or not the image in the image region 121 corresponds to the signature image registered in the memory 35 (registering unit) by pattern matching based on the image in the image region 121 included in the code image and the signature image registered in the memory 35 (registering unit). In addition, the control circuit 40 that corresponds to the "image recognizing unit" functions to perform image processing by extracting the image in the image region 121 as a bit map image under a condition that differentiation information is registered in the data recording region, based on the reading result of the data recording region by the data recording region reading unit. Furthermore, the control circuit 40 also functions to generate a normalized image in the image region by correcting the image in the image region 121 included in the code image, based on a specification pattern image in the specification pattern region and a cell image in at least either of the data recording region and the error correction code recording region in the code image of the information code 100 captured by the light receiving sensor 23 (imaging unit).

In the present configuration, the control circuit 40 and the communication interface 48 correspond to an example of an "output unit". The control circuit 40 and the communication interface 48 function to output information read by the data recording region reading unit and the recognition result of the image region by the image processing unit. When output is performed by display, the control circuit 40 and the liquid crystal display unit 46 correspond to the output unit.

In the present configuration, the information code reader 10 can obtain an image formed in the image region 121, in addition to the information recorded in each cell in the data recording region, as objects to be recognized. An image other than the cells attached in the information code can be analyzed and used on the reader side.

In addition, in the present configuration, a region other than the data recording region, the error correction code recording region, and the specification pattern regions can be secured within the code region as a free space. The region can be used as the image region 121. Therefore, the present configuration is more advantageous when error correction is performed in the data recording region.

In addition, the information code producing apparatus produces the information code in which predetermined differentiation information is recorded in the data recording region. The image processing unit of the information code reader 10 performs an image recognition process on the image in the image region 121 under a condition that the differentiation information is recorded in the data recording region, based on the reading result of the data recording region by the data recording region reading unit.

In this configuration, the recognition process is not performed on the image region if the differentiation information is not recorded in the data recording region. In other words, when recognition of the image region is unnecessary, an unnecessary recognition process can be omitted by the differentiation information not being recorded in the data recording region. Conversely, when the image region is to be recognized, recognition of the image region can be carried out by the differentiation information being recorded in the data recording region.

In addition, the image processing unit of the information code reader 10 performs image processing by extracting the image in the image region 121 as a bit map image under a condition that the differentiation information is recorded in the data recording region, based on the reading result of the data recording region by the data recording region reading unit.

In this configuration, the image in the image region 121 can be selectively processed as a bit map image under a condition that differentiation information is detected. Therefore, the data recording region and the like can be analyzed using an image format suitable for decoding. Recognition in the image region 121 can be performed based on more detailed pixel data under a condition that the differentiation information is detected.

In addition, the information code reading apparatus 10 includes the registering unit that registers a pattern image used for comparison with the image in the image region 121. The image processing unit performs pattern matching based on the image in the image region 121 included in the code image and the pattern image registered in the registering unit, and determines whether or not the image in the image region 121 is the image registered in the registering unit.

In this configuration, whether or not the image formed within the information code corresponds to a pattern image that has been registered in advance can be determined. Therefore, a response that could not have been actualized by the existing information code scheme can be made, i.e., "whether or not an image within a code corresponds to a prescribed image is determined and a response is made based on the determination result".

In addition, in the registering unit, a signature image is registered as a pattern image. The image processing unit determines whether or not the image in the image region 121 is the signature image registered in the registering unit by pattern matching based on the image in the image region 121 included in the code image and the signature image registered in the registering unit.

In this configuration, whether or not an image drawn in the information code corresponds to a signature image registered in advance can be determined. Therefore, for example, signature authentication and the like can be performed using the information code and the information code reader 10.

In addition, the image processing unit generates a normalized image in the image region 121 by correcting the image within the image region 121 included in the code image, based on a specification pattern image in the specification pattern regions and a cell image in at least either of the data recording region and the error correction recording region in the code image of the information code captured by the imaging unit.

In this configuration, using another image (such as a specification pattern image or a cell image in a recording region) configuring the code region, the image in the image region 121 can be corrected based on the other image. A recognition process can thereafter be performed on the normalized image. Therefore, even when distortion, deformation, or the like has occurred in the overall code, resulting in distortion, deformation, or the like in the image region 121, the recognition process can be performed on the image region 121 after converting the image region 121 to an appropriate image. The accuracy of the recognition process can be further improved.

In addition, the information code producing apparatus produces the information code such as to record position data in the data recording region. The position data indicates the position of the region to be recognized by the image processing unit, within the code region. The image processing unit of the information code reader 10 identifies the position of the region to be recognized within the code image based on the position data obtained from the reading result of the data recording region by the data recording region reading unit, and performs an image recognition process on the image in the region to be recognized.

In this configuration, even when data specifying the position of the image region 121 is not present within the information code reader 10 in advance, the image processing unit of the information code reader 10 can more accurately identify the position of the image region 121 within the code image.

In addition, the information code reader 10 has an output unit that outputs the information read by the data recording region reading unit and the recognition result of the image region 121 by the image processing unit.

In this configuration, the reader can output the recognition result of the image region in addition to the information recorded in advance in the data recording region. A response (output of image recognition results) that could not have been actualized by the existing information code scheme can be made.

Second Embodiment

Next, a second embodiment will be described with reference to the drawings.

Figure 13:
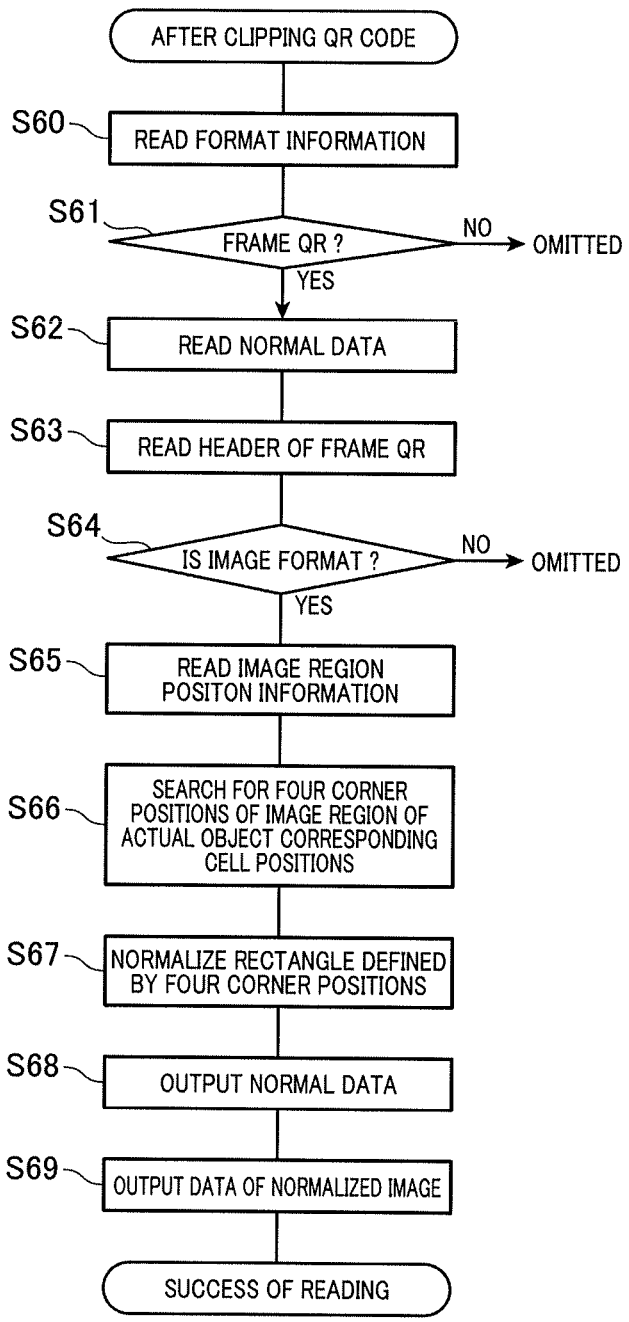
FIG. 13 is a flowchart of an example of the process for reading an information code by an information code reader configuring a system which uses an information code according to a second embodiment.

The second embodiment differs from the first embodiment only in that the process in FIG. 9 is changed to that in FIG. 13. The second embodiment is identical to the first embodiment in other aspects. Therefore, descriptions of sections that are the same as those according to the first embodiment will be omitted. FIG. 1 to FIG. 12 will be referenced as appropriate.

In this example, the processes at S68 and S69 in FIG. 13 are performed instead of the processes at S48 to S50 in FIG. 9. The processes at S60 to S67 are identical to those at S40 to S47 in FIG. 9.

In the process in FIG. 13, after S67, first, the reader 10 outputs the data interpreted at S62. The output method can be similar to that according to the first embodiment. Thereafter, the reader 10 outputs the image in the image region 121 normalized at S67 (the image in the image region recognized by the image recognizing unit) in a predetermined image file format. Various publically known formats may be used as the predetermined image file format. For example, the predetermined image file format may be the bit map file format, GIF format, or JPEG format. Alternatively, an image file format other than the foregoing may be used.

As a result, the recognition result of the image region 121 can be outputted in an image file format, in addition to the interpretation result of the data recording region. A response (output of both interpreted data and image file) that could not have been actualized by the existing information code scheme can be made.

Third Embodiment

Next, a third embodiment will be described with reference to the drawings.

The third embodiment differs from the first embodiment only regarding the specific content of the image region 121 in the information code 100 and the specific method of comparison at S49. The third embodiment is identical to the first embodiment in other aspects. Therefore, descriptions of sections that are the same as those according to the first embodiment will be omitted. FIG. 1 to FIG. 12 will be referenced as appropriate.

Figure 14:
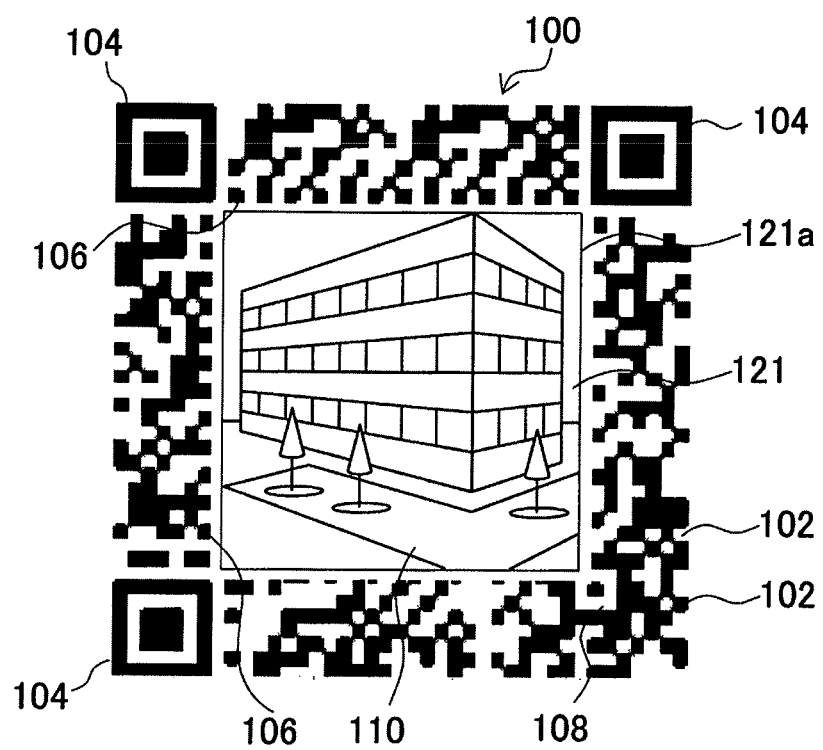
FIG. 14 is an explanatory diagram that explains an information code in which a hologram image is formed.

In this configuration, the information code 100 is configured as a code such as that as in FIG. 14. A publically known hologram is attached in the image region 121, thereby forming a hologram image. The reading process (specifically, the processes at S40 to S47) in FIG. 9 is performed in advance with the information code 100 such as this as the master code. The normalized image in the image region 121 (the hologram image in the master code) and data in the data recording region (recorded data in the master code (such as a reference number)) are registered in the memory 35. In other words, a hologram image such as that in the image region 121 in FIG. 14 is registered as the pattern image registered in the memory 35 (registering unit), instead of the signature image such as that in the upper portion of FIG. 11(C). Recorded data (such as a reference number) is registered in association with the hologram image.

In the process in FIG. 9 performed after registration such as this, authentication of whether or not the information code is the same as the master code such as this can be performed. For example, when the information code 100 as in FIG. 14 is captured as an object to be authenticated and the process as in FIG. 9 is performed, the processes at S40 to S47 are performed in a manner similar to that according to the first embodiment. Then, at S48, the reader 10 determines whether or not the hologram image registered in the memory 35 matches the image in the image region 121 normalized at S47. When determined that the images match, the reader 10 proceeds to Yes at S49 and performs the process at S50 in a manner similar to that according to the first embodiment. When determined that the images do not match, the reader 10 proceeds to No at S49 and performs a process for reading failure in a manner similar to that according to the first embodiment.

In this way, according to the present embodiment, the image processing unit determines whether or not the image in the image region is the hologram image registered in the registering unit by pattern matching based on the image in the image area included in the code image and the hologram image registered in the registering unit.

In this configuration, whether or not the image drawn in the information code corresponds to the hologram image registered in advance can be determined. Therefore, for example, hologram authentication and the like can be performed using the information code and the information code reader.

In this example, the hologram image of when the information code 100 is captured from a single predetermined direction (such as a direction perpendicular to the code formation surface) during registration may be registered in the memory 35. Whether or not the images match may be performed by comparison through pattern matching or the like of a hologram image of when the information code 100 is captured from the single predetermined direction during authentication and the registered image registered in the memory 35. Alternatively, two hologram images of when the information code 100 is captured from two predetermined directions during registration may be registered in the memory 35. Whether or not the images match may be performed by comparison through pattern matching or the like of each of two hologram images of when the information code 100 is captured from the two predetermined direction during authentication, and the registered image registered in the memory 35.

Fourth Embodiment

Next, a fourth embodiment will be described with reference to the drawings.

The fourth embodiment differs from the first embodiment only regarding the specific content of the image region 121 in the information code 100 and the specific method of comparison at S49. The third embodiment is identical to the first embodiment in all other ways. Therefore, descriptions of sections that are the same as those according to the first embodiment will be omitted. FIG. 1 to FIG. 12 will be referenced as appropriate.

Figure 15:
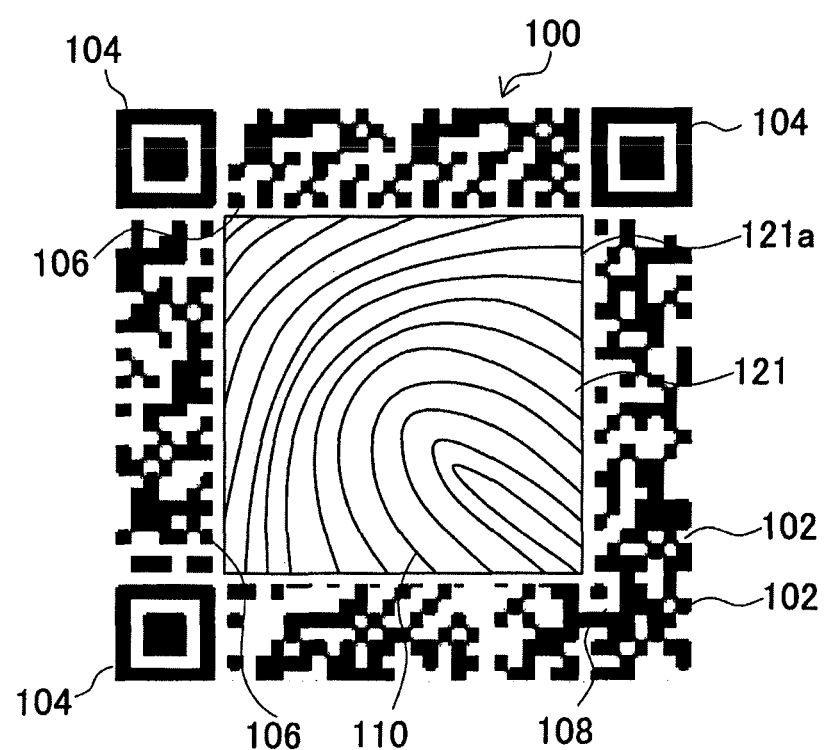
FIG. 15 is an explanatory diagram that explains an information code in which a fingerprint image is formed.

In this configuration, the information code 100 is configured as a code such as that in FIG. 15. A fingerprint image is formed in the image region 121. The reading process (specifically, the processes at S40 to S47) in FIG. 9 is performed in advance with the information code 100 such as this as the master code. The normalized image in the image region 121 (the fingerprint image in the master code) and data in the data recording region (recorded data in the master code (such as an authentication number)) are registered in the memory 35. In other words, a fingerprint image such as that in the image region 121 in FIG. 15 is registered as the pattern image registered in the memory 35 (registering unit), instead of the signature image such as that in the upper portion of FIG. 11(C). Recorded data (such as a reference number) is registered in association with the fingerprint image. As a result, the fingerprint image of a registrant is stored in the memory 35 in advance.

In the process in FIG. 9 performed after registration such as this, authentication of whether or not the fingerprint is the same as the fingerprint in the fingerprint image registered in this way can be performed. For example, when the information code 100 as in FIG. 15 is captured as an object to be authenticated and the process as in FIG. 9 is performed, the processes at S40 to S47 are performed in a manner similar to that according to the first embodiment. Then, at S48, the reader 10 determines whether or not the fingerprint image registered in the memory 35 matches the image in the image region 121 normalized at S47 (match determination process). To determine matching of the fingerprint images, any method can be used as long as the method is a publically known fingerprint comparison method. For example, matching can be determined using a pattern matching method, characteristic point extraction method (minutia method), or frequency analysis method. When determined that the fingerprint images match at S49, the reader proceeds to Yes at S49 and performs the process at S50 in a manner similar to that according to the first embodiment. When determined that the fingerprint images do not match, the reader 10 determines No at S49 and performs a process for reading failure in a manner similar to that according to the first embodiment.

In this way, according to the present embodiment, the fingerprint image is registered in the memory 35 (registering unit) as a pattern image. The image processing unit determines whether or not the image in the image region is the fingerprint image registered in the registering unit, based on the image in the image region 121 included in the code image and the fingerprint image registered in the registering unit. In this configuration, whether or not the image drawn in the information code corresponds to the fingerprint image registered in advance can be determined. Therefore, for example, fingerprint authentication or the like can be performed using the information code and the information code reader.

Fifth Embodiment

Next, a fifth embodiment will be described with reference to the drawings.

A system which uses an information code according to the fifth embodiment is identical to that according to the first embodiment in terms of hardware. A configuration such as that in FIG. 1 and FIG. 2, described above, is used.

In the system which uses an information code according to the fifth embodiment, the information code producing apparatus 1 (see FIG. 1 and the like) produces the information code 200 such as that in FIG. 16(B). In this configuration as well, the specification pattern regions in which specification patterns (position detecting patterns 104) having a shape determined in advance are arranged, the data recording region in which data is recorded by cells of a plurality of types, and the image region 121 that is subjected to a predetermined image recognition process by the information code reader 10 are provided within the code region.

In this configuration, the information code 200 is configured as a publically known QR code (registered trademark), other than the configuration within the free space 210. First, as in FIG. 16(A), the specification pattern regions, the data recording region, and the error correction code recording region in which the error correction codes are recorded by cells of a plurality of types are provided within the code region. The method for recording the data code words in the data recording region and the method for recording the error correction code words in the error correction code recording region are similar to those used for the publically known QR code (registered trademark). For example, the arrangement of the position detecting patterns 204, the arrangement of the data code words in the data recording region, and the arrangement of the error correction code words in the error correction code recording region within the code region are determined by the a format standardized by JISX0510.

However, as in FIG. 16(A), an information code 200' is produced in which the code words in some regions are configured as code words expressed only by white cells. The region AR expressed only by white cells in this way is set as the free space 210. The image region 121 is provided within the free space 210 as in FIG. 16(B). In the example in FIG. 16(B), a signature image recording region similar to that according to the first embodiment is provided within the free space 210. A state is shown in which a signature has been entered in the signature image recording region. In a configuration such as this, the configuration differs from that of the original data display as in FIG. 16(A). However, data error in this free space 210 can be corrected by publically known error correction using the error correction codes recorded in the error correction code recording region.

In addition, in the information code 200 shown in FIG. 16(B), the position of the free space 210 is identified in advance. Therefore, when a design or information is added and displayed within the free space 210, an error position due to display is known in advance. Thus, the error correction codes in the error correction code recording region can also be configured such that erasure correction 消失訂正 is performed with the position of the free space 210 as the error position. In this case, information indicating the position of the free space 210 may be recorded in advance in the data recording region, or in the reader 10 (FIG. 1). As a result, the reader 10 can identify the position of the free space 210 (in other words, the position of the data code word in which an error has occurred) during reading. The reader 10 can perform erasure correction using the error correction codes recorded in the error correction code recording region such as to correct the error in the data code words present in the free space 210 of which the position has been identified in this way.

In addition, when a portion of an existing QR code (registered trademark) is configured as the free space 210 as in FIG. 16, the data recorded in the data recording region is merely required to include differentiation information such as that in FIG. 18(A). FIG. 18(A) conceptually shows a configuration of the data to be interpreted that is recorded in the data recording region. In this example, data having a predetermined configuration (%%IMAGE%%) is added to the head portion of the data to be interpreted. As a result of such configuration, when the reader 10 detects this differentiation information (%%IMAGE%%) in the data to be interpreted recorded in the data recording region, the image recognition process can be performed on the image region 121. Conversely, when the differentiation information (%%IMAGE%%) cannot be detected, a normal decoding process is performed. In this example, as the data in the data recording region, in addition to typical data, the position data that specifies the position of the image region and other associated information are preferably included. In addition, the data shown in FIG. 18(A) indicates the data to be interpreted that is arranged before the terminator within the data recorded in the data recording region. A filler code arranged after the terminator is omitted. In the present configuration, for example, the region of the filler code may be displayed entirely by only white cells. The region may be processed as the free space 210.

In addition, the example of the differentiation information is not limited to this example. For example, a dedicated mode number may be used as the mode number. For example, in the standards regarding the QR code, the following is prescribed: 1: numeric character mode, 2: alphanumeric character mode, 3: bound mode, and the like. As a mode number such as this, 14: image recognition mode may be provided. In such an example, when the mode number 14 is set, image recognition process on the image region 121 may be performed.

In FIG. 16, an example is given in which a signature image is displayed in the image region. The image recognition process using the signature image can be performed by a method similar to that according to the first embodiment and the second embodiment. In addition, the image in the image region 121 may be a hologram image such as that in FIG. 14. In this case, the image recognition process using the hologram image can be performed by a method similar to that according to the third embodiment. Furthermore, the image in the image region 121 may be a fingerprint image such as that in FIG. 15. In this case, the image recognition process using the fingerprint image can be performed by a method similar to that according to the fourth embodiment. Moreover, the basic configuration of the information code 200 can be applied to the above-described embodiments and other embodiments described hereafter.

Sixth Embodiment

Next, a sixth embodiment will be described.

A system which uses an information code according to the sixth embodiment is also identical to that according to the first embodiment in terms of hardware configuration. A configuration such as that shown in FIG. 1 and FIG. 2, described above, is used.

In the system which uses an information code according to the sixth embodiment, the information code producing apparatus 2 (see FIG. 1) produces an information code 300 such as that in FIG. 17(B). In this configuration as well, the specification pattern regions in which specification patterns each having a shape determined advance (an L-shaped alignment pattern 304a, and a timing pattern (timing cells) 304b in which light colored cells and dark colored cells are arranged such as to alternate one by one and that configures an L-shaped region along the boundary of the code region) are arranged, and the data recording region in which data is recorded by cells of a plurality of types are provided within the code region. A free space 310 is provided in a position other than the specification pattern regions within the code region, such as to have a predetermined size that is larger than the size of a single cell. In the free space 310, at least either data recording or design display is possible by a method differing from the method for recording data in the data recording region.

Other than the configuration of the free space 310, this configuration is that of a publically known data matrix code. First, as shown in FIG. 17(A), the specification pattern regions, the data recording region, and the error correction code recording region in which error correction codes are recorded by cells of a plurality of types are provided within the code region. The method for recording data code words in the data recording region and the method for recording error correction code words in the error correction code recording region are similar to those for a publically known data matrix code. The arrangement of the alignment pattern 304a and the timing pattern 304b within the code region, the arrangement of the data code words within the data recording region, and the arrangement of the error correction code words within the error correction code recording region are prescribed, for example, based on ECC200 version.

However, as shown in FIG. 17(A), an information code 300' is produced in which the code words in some regions are configured as code words expressed only by white cells. The region AR expressed only by white cells in this way is set as the free space 310. As shown in FIG. 17(B), the image region 121 is provided within the free region 310. When the image region 121 is provided within the free space 310 as in FIG. 17(B), the configuration differs from that of the original data display as in FIG. 17(A). However, data error in this free space 310 can be corrected by publically known error correction using the error correction codes recorded in the error correction code recording region.

In addition, in the information code 300 shown in FIG. 17(B), the position of the free space 310 is specified in advance. Therefore, when a design or information is added and displayed within the free space 310, an error position due to display is known in advance. Thus, the error correction codes in the error correction code recording region can also be configured such that erasure correction is performed with the position of the free space 310 as the error position. In this case, information indicating the position of the free space 310 may be recorded in advance in the data recording region, or in the reader 10 (FIG. 1). As a result, the reader 10 can identify the position of the free space 310 (in other words, the position of the data code word in which an error has occurred) during reading. The reader 10 can perform erasure correction using the error correction codes recorded in the error correction code recording region such as to correct the error in the data code words present in the free space 310 of which the position has been identified in this way.

In addition, when a portion of an existing data matrix code is configured as the free space 310 as in FIG. 17, the data recorded in the data recording region is merely required to include differentiation information such as that in FIG. 18(B). FIG. 18(B) conceptually shows a configuration of the data to be interpreted that is recorded in the data recording region. In this example, data having a predetermined configuration (%%IMAGE%%) is added to the head portion of the data to be interpreted. As a result of such configuration, when the reader 10 detects this differentiation information (%%IMAGE%%) in the data to be interpreted recorded in the data recording region, the image recognition process can be performed on the image region 121. Conversely, when the differentiation information (%%IMAGE%%) cannot be detected, a normal decoding process is performed. In this example, as the data in the data recording region, in addition to typical data, the position data that specifies the position of the image region and other associated information are preferably included.

In addition, the example of the differentiation information is not limited to this example. For example, a dedicated code word may be used. As specification for data matrix codes, for example, when 0 to 128 are prescribed as ASCII characters, 233 is prescribed as bound mode, and the like, "234" may be newly prescribed as a special code word for image recognition. In such an example, when the "234" code word is included in the data in the data recording region, the image recognition process on the information region 121 may be performed. In addition, when an unused code word is present, the unused code word may be included as the differentiation information. When the unused code word is included in the data in the data recording region, the image recognition process on the information region 121 may be performed.

In FIG. 17, an example is given in which a signature image is displayed in the image region. The image recognition process using the signature image can be performed by a method similar to that according to the first embodiment and the second embodiment. In addition, the image in the image region 121 may be a hologram image such as that in FIG. 14. In this case, the image recognition process using the hologram image can be performed by a method similar to that according to the third embodiment. Furthermore, the image in the image region 121 may be a fingerprint image such as that in FIG. 15. In this case, the image recognition process using the fingerprint image can be performed by a method similar to that according to the fourth embodiment. Moreover, the basic configuration of the information code 300 can be applied to the above-described embodiments and other embodiments described hereafter.

Seventh Embodiment

Next, a seventh embodiment of the present invention will be described.

A system which uses an information code according to the seventh embodiment is identical to that according to the first embodiment in terms of hardware. A configuration such as that in FIG. 1 and FIG. 2, described above, is used. In particular, the hardware configurations of the producing apparatus 2 and the reader 10 are identical to those according to the first embodiment. Therefore, the description will be given with reference to FIG. 1, FIG. 2, and the like, as appropriate.

An information code 400 used according to the seventh embodiment differs from the information code 100 according to the first embodiment only in terms of the content of the free space 410. The configurations of the specification pattern regions and the data recording region, other than the free space 410, are identical to those of the information code according to the first embodiment. The configurations of the specification pattern regions and the data recording region may be exactly the same as that according to the first embodiment. Alternatively, the arrangements thereof may slightly differ. In addition, the position of the free space 410 is not particularly limited. The free space 410 may be provided in exactly the same position as the free space 110 in the information code 100 according to the first embodiment, or in a position differing therefrom.

As shown in FIG. 19(A) and FIG. 19(B), the information code 400 produced by the producing apparatus 2 is provided with the specification pattern regions in which specification patterns each having a shape determined in advance are arranged, the data recording region in which data is recorded by cells 102 of a plurality of types, and the error correction code recording region in which error correction codes are recorded by cells 102 of a plurality of types, within a code region having a rectangular shape (such as a square or an oblong shape). In this configuration as well, the specification patterns are similar to those according to the first embodiment. For example, the shapes and positions of the specification patterns are the same as those of the specification patterns of a publically known, predetermined version of the QR code (registered trademark). In the example in FIG. 19(A) and the like, the position detecting patterns (clipping symbols) 104 are arranged as the specification patterns in three corner portions of the code region, respectively.

In the present system, for example, the information code 400 is formed by the producing apparatus 2 in a configuration in which the position detecting patterns 104 and the graphic forms of other cells are printed on a predetermined formation subject medium 401. The formation subject medium 401 is composed of a paper material, a resin material, a metal material, or other publically known materials. For example, the formation subject medium 401 is configured in a sheet shape or a plate shape having a predetermined thickness. The formation subject medium 401 is merely required to be configured such that the information code 400 is able to be formed on one surface side, and a window portion is able to be formed. The specific shape thereof is not particularly limited. For example, a configuration in which a plurality of materials are laminated is also possible.

In the information code 400 formed by the producing apparatus 2, for example, the specification pattern regions, the data recording region, and the correction code recording region are presented in a predetermined area on the front surface 401a of the formation subject medium 401 by a publically known formation method, such as printing or direct marking. The specification pattern regions, the data recording region, and the correction code recording region formed on the formation subject medium 401 are merely required to be formed such as to be visible from the front surface 401a side. The formation positions are not limited to the front surface 401a. For example, the specification pattern regions, the data recording region, and the correction code recording region may be formed on the surface of a member composed of a paper material, a resin material, a metal material, or the like, and may then be covered by a transparent sheet-shaped or plate-shaped member being arranged thereon. In this configuration, the surface of the transparent member serves as the front surface 401a. The specification pattern regions, the data recording region, the correction code recording region, and the like are formed in a position further towards the back side (back surface side) than the surface 401a. In either case, the specific pattern regions, the data recording region, and the correction code recording region are merely required to be formed on the formation subject medium 401 in a configuration in which the specific pattern regions, the data recording region, and the correction code recording region are visible from the front surface 401a side of the formation subject medium 401.

In the formation subject medium 401, a window 403 that allows a back surface 401b side to be visible from the front surface 401a side is provided on the inner side from the outer edge portion of the code region. In the example shown in FIG. 19 and the like, the window portion 403 is formed as a quadrangular through-hole. The through-hole is configured in a continuous manner between the front surface 401a and the back surface 401b. When an information code medium to which the information code 400 such as that in FIG. 19 is attached is formed, the specific pattern regions, the data recording region, and the correction code recording region may be formed on the formation subject medium (the sheet-shaped or plate-shaped member composed of a paper material, a resin material, a metal material, or other material) prior to formation of the window portion 403 by the producing apparatus 2. Then, the portion within the window portion 403 may be cut out from the formation subject medium, thereby obtaining the information code 400 such as that in FIG. 19. Alternatively, the window portion 403 may be formed in the sheet-shaped or plate-shaped member composed of a paper material, a resin material, a metal material, or other material, and the formation subject medium 401 may be prepared in advance. Then, the specific pattern regions, the data recording region, and the correction code recording region may be formed on the formation subject medium 401 by the producing apparatus 2, thereby obtaining the information code 400 such as that in FIG. 19.

Figure 20:
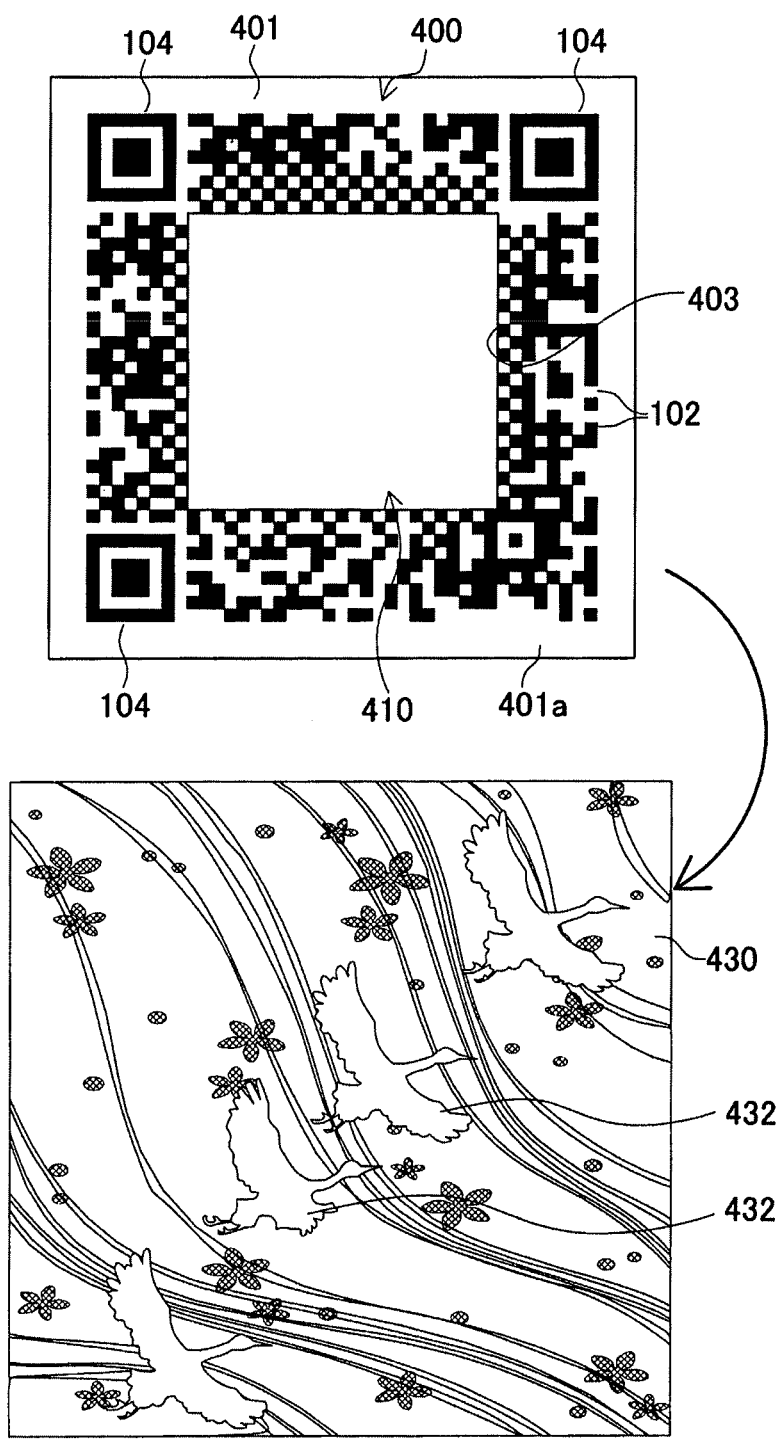
FIG. 20 is an explanatory diagram that explains the formation subject medium on which the information code is formed and a subject covered thereby.

In the information code 400 configured in this way, the image region subjected to a predetermined image recognition process by the information code reader 10 is presented within the code region. For example, as shown in FIG. 20, when an image of a predetermined area of a subject 430 in which an illustration of a character 432 is drawn is captured and used as an image, the formation subject medium 401 is arranged on the subject such that the area to be used as an image fits within the window portion 403. As a result, as shown in FIG. 21(A), the image region to be subjected to the image recognition process (the area of the subject 430 that is arranged within the window portion 403, or in other words, the area visible from the front surface 401a side through the window portion 403) is presented within the code region of the information code 400. In this example, the inside of the window portion 403 in the information code 400 serves as the free space. For example, the region is that in which data is not recorded in the data recording region and is not subjected to error correction by the error correction region. In addition, in FIG. 20, the subject 430 is given as an example of the subject. However, the example of the subject is not limited thereto. Various images, such as the images in the image region described according to the above-described embodiments, can also be used as the subject.

Then, an image of the information code 400 and the subject 430 that are presented as in FIG. 21(A) is captured by the reader 10 as in FIG. 21(B), thereby obtaining a captured image such as that in FIG. 22(A). The image in FIG. 22(A) is that in which only the image within the code region has been cut out from the image captured by the reader 10 and presented. As a result of the image within the code region obtained in this way, the information code 400 can be read by a method similar to that according to the first embodiment. An image 410' in the free space 410 can be extracted by a method similar to that according to the first embodiment.

In the present configuration as well, the light receiving sensor 23 shown in FIG. 2 corresponds to an example of the imaging unit. The light receiving sensor 23 functions to capture an image of the specification pattern regions, the data recording region, and the region within the window portion 403, from the front surface 401a side of the formation subject medium 401. In addition, the control circuit 40 corresponds to an example of the image processing unit. The control circuit 40 functions to perform an image recognition process on the image in the region within the window portion 403 captured by the imaging unit as the image in the image region, by a method differing from that in the interpretation process for data by the data recording region reading unit.

In the present configuration, the information code producing apparatus can form a characteristic information code in which the specification pattern regions, the data recording region, and the window portion are formed, on a formation subject medium. When the information code reader captures an image of the formation subject medium and reads the information code, the content ascertained through the window portion from the front surface side of the formation subject medium can be recognized as an image. In particular, a novel image usage method becomes possible in which, in accompaniment with reading of the information, the image of a subject (the subject ascertained through the window portion) that is not displayed in advance in the formation subject medium can be used, in addition to use of the data recorded in the data recording region. Usability by the user can be improved. In addition, when the information code is read, the position can be adjusted such that only the required area of the subject positioned to the rear of the formation subject medium appears through the window portion. The image of the required area can be selectively used. Usability is further improved regarding use of image.

As the image processing method for the image after extraction of the image in the image region (the image 410' in the free space 410), any of the processing methods according to the above-described embodiments may be used.

Alternatively, when the producing apparatus 2 produces the information code 400, the information code 400 may be produced such that address information (such as an e-mail address specifying a destination for transmission by email, or a URL specifying an address on the Internet) specifying a transmission destination of the image in the image region is recorded in the data recording region. When a code image such as that in FIG. 22(A) is obtained, the control circuit 40 that corresponds to the image processing unit may cut out a portion of, or the entirety of, the image in the image region from the code image. The control circuit 40 may then process the cut-out image such as to be transmitted to the transmission destination specified by the address information recorded in the data recording region. As a result, at the transmission destination, various processes (such a display process as in FIG. 22(B), an analysis process, an image collection process, or other image processing) using the extracted image becomes possible. For example, when the extracted image is displayed in an external apparatus 90 at the transmission destination, the image can be displayed on a blog, a home page, other websites, and the like.

As a result, when the information code reader 10 reads the information code 400, a process becomes possible in which the recognized image in the image region is automatically transmitted to the transmission destination specified by the address information recorded in the data recording region. As a result, input operation for the address information specifying the transmission destination to which the image in the image region is to be transmitted and the like are no longer required to be performed each time an information code is read. Work load, input error, and the like accompanying the input operation can be reduced with certainty.

In the above-described example, an example of the window portion 403 configured as a through-hole is given. However, the window portion is merely required to be configured such that the back side is visible. For example, the window portion 403 may be configured such that a transparent member (such as a transparent resin sheet) is arranged such as to cover the above-described quadrangular through-hole. The back side is made visible through the transparent material. In addition, the shape of the window portion 403 is not limited to a quadrangle, and may be a circle, an ellipse, a triangle, or other polygonal shapes.

First Variation Example According to the Seventh Embodiment

Next, a first variation example according to the seventh embodiment will be described. The first variation example differs from the above-described representative example (the example in FIG. 19 to FIG. 22) only in terms of the target (subject) to be captured through the window portion 403. Other aspects are identical to those of the representative example.

Figure 23:
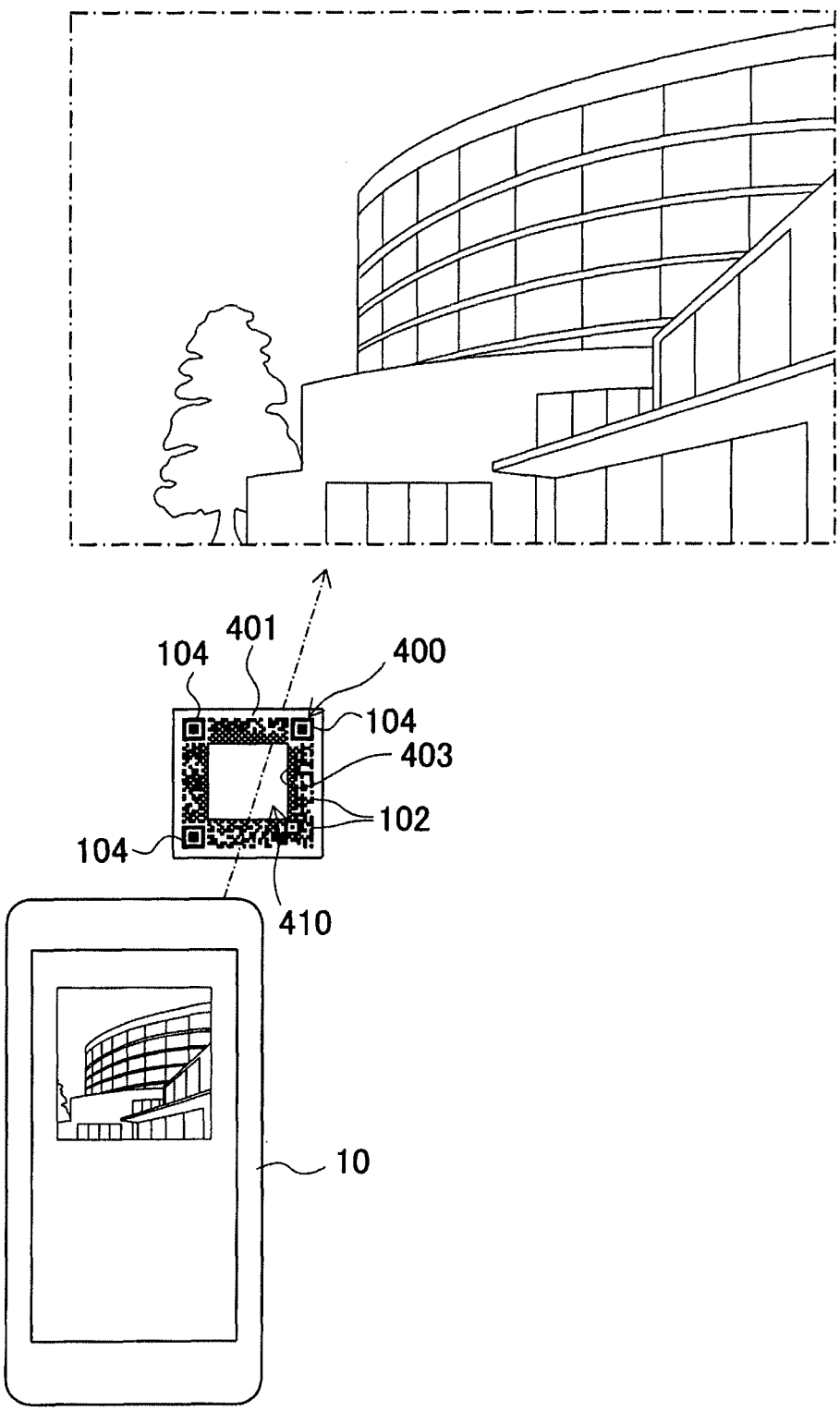
FIG. 23 is an explanatory diagram that relates to a first variation example according to the seventh embodiment and explains capturing an image of a subject (background) visible through a window portion together with the formation subject medium.

In the first variation example, the information code 400 configured as in FIG. 19 is arranged in front of a scenery or landscape to be captured, as in FIG. 23. A portion of the scenery or landscape is presented within the information code 400. In the example in FIG. 23, the image region (the region presenting the image of the scenery or landscape) that is subjected to the predetermined image recognition process by the information code reader 10 is presented within the code region. For example, when an image of the scenery or landscape is captured and a portion of the image is used as the image, as shown in FIG. 23, the positional relationship between the formation subject medium 401 and the scenery or landscape may be adjusted such that the area of the scenery or landscape to be captured that is to be used as the image fits within the window portion 403. As a result, the image region (the area of the scenery or landscape to be captured that is visible through the window portion 403) to be subjected to the image recognition process is presented within the code region of the information code. In this example as well, the inside of the window portion 403 (the open area within the window portion) in the information code 400 serves as the free space 410. For example, the region is that in which data is not recorded in the data recording region and is not subjected to error correction by the error correction region.

As a result of the reader 10 capturing an image of the information code 400 of which the position has been adjusted and the subject (the scenery or landscape) as in FIG. 23, a captured image such as that in FIG. 24(A) is obtained. The image in FIG. 24(A) is that in which only the image within the code region has been cut out from the image captured by the reader 10, and presented. As a result of the image within the code region obtained in this way, the information code 400 can be read by a method similar to that according to the first embodiment. The image 410' in the free space 410 can be extracted by a method similar to that according to the first embodiment. The extracted image 410' is an image of the scenery or landscape behind the formation subject medium 401 that appears in the light receiving sensor 23 through the window portion 403. The extracted image 410' is an image of a portion of the scenery or landscape. The image 410' that has been extracted in this way can be used by methods similar to those according to the above-described embodiments and representative examples.

In this example as well, when the producing apparatus 2 produces the information code 400, the information code 400 may be produced such that address information (such as an e-mail address specifying a destination for transmission by email, or a URL specifying an address on the Internet) specifying a transmission destination of the image in the image region is recorded in the data recording region. When a code image such as that in FIG. 24(A) is obtained, the control circuit 40 that corresponds to the image processing unit may cut out a portion of, or the entirety of, the image in the image region (the image 410' in the free space 410) from the code image. The control circuit 40 may then process the cut-out image such as to be transmitted to the transmission destination specified by the address information recorded in the data recording region. As a result, at the transmission destination, various processes (such a display process as in FIG. 24(B), an analysis process, an image collection process, or other image processing) using the extracted image becomes possible.

Second Variation Example According to the Seventh Embodiment

Next, a second variation example according to the seventh embodiment will be described. The second variation example differs from the above-described representative example (the example in FIG. 19 to FIG. 22) only in terms of the target (subject) to be captured through the window portion 403. Other aspects are identical to those of the representative example.

In the second variation example, a measurement instrument 92 such as that in the left-hand drawing in FIG. 25(A) is to be captured. The information code 400 configured as in FIG. 19 is used such as to be arranged in a state covering the measurement instrument 92. In the example in FIG. 25 as well, an image region (a measurement value display area 92a that is an area in a part of the measurement instrument 92) that is subjected to the predetermined image recognition process by the information code reader 10 is presented within the code region. For example, in the example in FIG. 25(A), a publically known radioactivity meter is given as an example of the measurement instrument 92. The measurement instrument 92 is configured to measure radioactivity in a space in which the measurement instrument 92 is present and display the measurement value in the measurement value display area 92a. When an image of the measurement instrument 92 such as this is captured and the image of the measurement value display area 92a is used, as shown in FIG. 25(B), the positional relationship between the formation subject medium 401 and the measurement instrument 92 is adjusted such that the measurement value display area 92a that is to be used as the image fits within the window portion 403. As a result, the image region (the measurement value display area 92a) to be subjected to the image recognition process is presented within the code region of the information code 400. In this example as well, the open area inside of the window portion 403 in the information code 400 serves as the free space 410. For example, the region is that in which data is not recorded in the data recording region and is not subjected to error correction by the error correction region.

As a result of the reader 10 capturing an image, as in FIG. 26(A), of the information code 400 and the measurement instrument 92 of which the positions have been adjusted as in FIG. 25(B), a captured image such as that shown in the left-hand diagram in FIG. 26(B) is obtained. The image in FIG. 26(B) is that in which only the image within the code region has been cut out from the image captured by the reader 10 as in FIG. 26(A), and presented. As a result of the image within the code region obtained in this way, the information code 400 can be read by a method similar to that according to the first embodiment. The image 410' in the free space 410 can be extracted by a method similar to that according to the first embodiment. The image 410' that has been extracted in this way can be used by methods similar to those according to the above-described embodiments and representative examples.

In this example as well, when the producing apparatus 2 produces the information code 400, the information code 400 may be produced such that address information (such as an e-mail address specifying a destination for transmission by email, or a URL specifying an address on the Internet) specifying a transmission destination of the image in the image region is recorded in the data recording region. When a code image such as that on the left-hand side in FIG. 26(B) is obtained, the control circuit 40 that corresponds to the image processing unit may cut out a portion of, or the entirety of, the image in the image region from the code image. The control circuit 40 may then process the cut-out image such as to be transmitted to the transmission destination specified by the address information recorded in the data recording region. As a result, at the transmission destination, various processes (such a display process as that on the right-hand side in FIG. 26(B), an analysis process, an image collection process, or other image processing) using the extracted image becomes possible.

Third Variation Example According to the Seventh Embodiment

Next, a third variation example according to the seventh embodiment will be described. The third variation example differs from the above-described representative example (the example in FIG. 19 to FIG. 22) only in terms of the target (subject) to be captured through the window portion 403. Other aspects are identical to those of the representative example.

Figure 27:
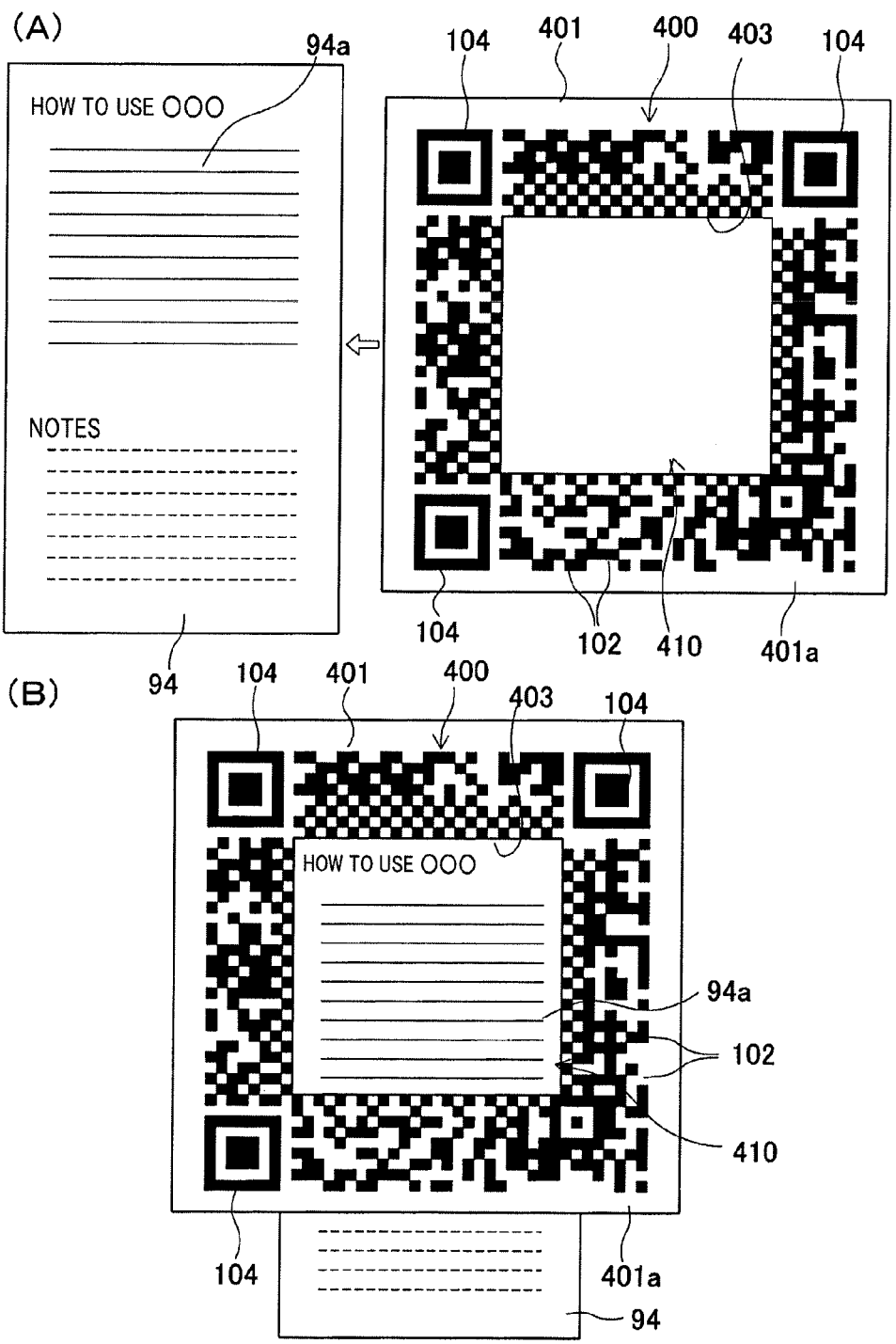
FIG. 27(A) is an explanatory diagram that relates to a third variation example according to the seventh embodiment and explains the formation subject medium on which the information code is formed and a subject (printed matter) covered thereby.
FIG. 27(B) is an explanatory diagram of a state in which the formation subject medium covers the subject.

In the third variation example, printed matter 94 such as that in the left-hand drawing in FIG. 27(A) is to be captured. The information code 400 configured as in FIG. 19 is used such as to be arranged in a state covering the printed matter 94. In this example, as shown in FIG. 27(B), an image region (a description area 94a that is an area in a portion of the printed matter 94) that is subjected to the predetermined image recognition process by the information code reader 10 can be presented within the code region. For example, in the example in FIG. 27(A), the printed matter 94 include magazines, catalogs, newspapers, advertisement media, and other printed matter. Various contents can be described therein. When an image of the printed matter 94 such as this is captured and an image of a portion of the description area 94a is to be used, as shown in FIG. 27(B), the positional relationship between the formation subject medium 401 and the printed matter 94 is adjusted such that the description area 94a that is to be used as the image fits within the window portion 403. As a result, the image region (the description area 94a) to be subjected to the image recognition process is presented within the code region of the information code 400. In this example as well, the open area inside of the window portion 403 in the information code 400 serves as the free space 410. For example, the region is that in which data is not recorded in the data recording region and is not subjected to error correction by the error correction region.

As a result of the reader 10 capturing an image, as in FIG. 28(A), of the information code 400 and the printed matter 94 of which the positions have been adjusted as in FIG. 27(B), a captured image such as that shown in the left-hand diagram in FIG. 28(B) is obtained. The image in FIG. 28(B) is that in which only the image within the code region has been cut out from the image captured by the reader 10 as in FIG. 28(A), and presented. As a result of the image within the code region obtained in this way, the information code 400 can be read by a method similar to that according to the first embodiment. The image 410' in the free space 410 can be extracted by a method similar to that according to the first embodiment. The image 410' that has been extracted in this way can be used by methods similar to those according to the above-described embodiments and representative examples.

In this example as well, when the producing apparatus 2 produces the information code 400, the information code 400 may be produced such that address information (such as an e-mail address specifying a destination for transmission by email, or a URL specifying an address on the Internet) specifying a transmission destination of the image in the image region is recorded in the data recording region. When a code image such as that on the left-hand side in FIG. 28(B) is obtained, the control circuit 40 that corresponds to the image processing unit may cut out a portion of, or the entirety of, the image in the image region from the code image. The control circuit 40 may then process the cut-out image such as to be transmitted to the transmission destination specified by the address information recorded in the data recording region. As a result, at the transmission destination, various processes (such a display process as that on the right-hand side in FIG. 28(B), an analysis process, an image registration process, or other image processing) using the extracted image becomes possible.

Fourth Variation Example According to the Seventh Embodiment

Next, a fourth variation example according to the seventh embodiment will be described. The fourth variation example differs from the above-described representative example (the example in FIG. 19 to FIG. 22) only in terms of the target (subject) to be captured through the window portion 403. Other aspects are identical to those of the representative example.

In the fourth variation example, a lifeform 96a such as that in the left-hand drawing in FIG. 29(A) is to be captured. The information code 400 configured as in FIG. 19 is arranged above the object to be captured (the lifeform 96a to be observed and a storage container 96 thereof). In this example, as in FIG. 29(B), an image region (a region in which the lifeform 96a to be observed is visible) that is subjected to the predetermined image recognition process by the information code reader 10 can be presented within the code region. In FIG. 29(A), the lifeform 96a is given as an example of the object to be observed. However, various animals, plants, and the like can be used as the object to be observed. When an image of the lifeform 96a is captured and the image of the lifeform 96a is used, as shown in FIG. 29(B), the positional relationship between the formation subject medium 401 and the lifeform 96a is adjusted such that the lifeform 96a that is to be used as the image fits within the window portion 403. As a result, the image region (the region in which the lifeform 96a is presented) to be subjected to the image recognition process is presented within the code region of the information code 400. In this example as well, the open area inside of the window portion 403 in the information code 400 serves as the free space. For example, the region is that in which data is not recorded in the data recording region and is not subjected to error correction by the error correction region.

As a result of the reader 10 capturing an image, as in FIG. 30(A), of the information code 400 and the lifeform 96a of which the positions have been adjusted as in FIG. 29(B), a captured image such as that shown in the left-hand diagram in FIG. 30(B) is obtained. The image in FIG. 30(B) is that in which only the image within the code region has been cut out from the image captured by the reader 10 as in FIG. 26(A), and presented. As a result of the image within the code region obtained in this way, the information code 400 can be read by a method similar to that according to the first embodiment. The image 410' in the free space 410 can be extracted by a method similar to that according to the first embodiment. The image 410' that has been extracted in this way can be used by methods similar to those according to the above-described embodiments and representative examples.

In this example as well, when the producing apparatus 2 produces the information code 400, the information code 400 may be produced such that address information (such as an e-mail address specifying a destination for transmission by email, or a URL specifying an address on the Internet) specifying a transmission destination of the image in the image region is recorded in the data recording region. When a code image such as that on the left-hand side in FIG. 30(B) is obtained, the control circuit 40 that corresponds to the image processing unit may cut out a portion of, or the entirety of, the image in the image region from the code image. The control circuit 40 may then process the cut-out image such as to be transmitted to the transmission destination specified by the address information recorded in the data recording region. As a result, at the transmission destination, various processes (such a display process as that on the right-hand side in FIG. 30(B), an analysis process, an image registration process, or other image processing) using the extracted image becomes possible.

Fifth Variation Example According to the Seventh Embodiment

Next, a fifth variation example according to the seventh embodiment will be described. The fifth variation example differs from the above-described representative example (the example in FIG. 19 to FIG. 22) only in terms of the target (subject) to be captured through the window portion 403. Other aspects are identical to those of the representative example.

In the fifth variation example as well, the information code 400 configured as in FIG. 19 is used such that the information code 400 is arranged such as to cover an object to be captured (a color swatch 98b in the example in FIG. 31(B)). An image region (the color swatch 98b in the example in FIG. 31(B)) that is subjected to the predetermined image recognition process by the information code reader 10 can be presented within the code region. In the example in FIG. 31(A), color swatches 98a, 98b, and 98c of a plurality of different colors are prepared. When an image of any of the color swatches is captured and the image is to be used, as shown in FIG. 31(B), the positional relationship between the formation subject medium 401 and the color swatch 98b is adjusted such that the color swatch 98b that is to be used as the image fits within the window portion 403. As a result, the image region (the region in which the color swatch 98b is presented) to be subjected to the image recognition process is presented within the code region of the information code 400. In this example as well, the open area inside of the window portion 403 in the information code 400 serves as the free space 410. For example, the region is that in which data is not recorded in the data recording region and is not subjected to error correction by the error correction region.

As a result of the reader 10 capturing an image, as in FIG. 32(A), of the information code 400 and the color swatch 98b of which the positions have been adjusted as in FIG. 31(B), a captured image such as that shown in the left-hand diagram in FIG. 32(B) is obtained. The image in FIG. 32(B) is that in which only the image within the code region has been cut out from the image captured by the reader 10 as in FIG. 32(A), and presented. As a result of the image within the code region obtained in this way, the information code 400 can be read by a method similar to that according to the first embodiment. The image 410' in the free space 410 can be extracted by a method similar to that according to the first embodiment. The image 410' that has been extracted in this way can be used by methods similar to those according to the above-described embodiments and representative examples.

In this example as well, when the producing apparatus 2 produces the information code 400, the information code 400 may be produced such that address information (such as an e-mail address specifying a destination for transmission by email, or a URL specifying an address on the Internet) specifying a transmission destination of the image in the image region is recorded in the data recording region. When a code image such as that in the left-hand side in FIG. 32(B) is obtained, the control circuit 40 that corresponds to the image processing unit may cut out a portion of, or the entirety of, the image in the image region from the code image. The control circuit 40 may then process the cut-out image such as to be transmitted to the transmission destination specified by the address information recorded in the data recording region. As a result, at the transmission destination, various processes (such a display process as that on the right-hand side in FIG. 32(B), an analysis process, an image collection process, or other image processing) using the extracted image becomes possible. For example, images of various color swatches may be captured. An image of each color swatch may be sequentially obtained as on the left-hand side in FIG. 32(B), and transmitted to an external apparatus 90. Images obtained by actually capturing the various color swatches are collected in the external apparatus 90 and can be put to use for various purposes thereafter.

Eighth Embodiment

Next, an eighth embodiment will be described.

A system which uses an information code according to the eighth embodiment is identical to that according to the first embodiment in terms of hardware. A configuration such as that in FIG. 1 and FIG. 2, described above, is used. In particular, the hardware configurations of the producing apparatus 2 and the reader 10 are identical to those according to the first embodiment. Therefore, the description will be given with reference to FIG. 1, FIG. 2, and the like, as appropriate.

An information code 500 used according to the eighth embodiment differs from the information code 100 according to the first embodiment only in terms of the content of the free space 510. The configurations of the specification pattern regions and the data recording region, other than the free space 410, are identical to those of the information code according to the first embodiment. The configurations of the specification pattern regions and the data recording region may be exactly the same as that according to the first embodiment. Alternatively, the arrangements thereof may slightly differ. In addition, the position of the free space 510 is not particularly limited. The free space 510 may be provided in exactly the same position as the free space 110 in the information code 100 according to the first embodiment, or in a position differing therefrom.

As shown in FIG. 33(A), the information code 500 produced by the producing apparatus 2 is provided with the specification pattern regions in which specification patterns each having a shape determined in advance are arranged, the data recording region in which data is recorded by cells 102 of a plurality of types, and the error correction code recording region in which error correction codes are recorded by cells 102 of a plurality of types, within a code region having a rectangular shape (such as a square or an oblong shape). In this configuration as well, the specification patterns are similar to those according to the first embodiment. For example, the shapes and positions of the specification patterns are the same as those of the specification patterns of a publically known, predetermined version of the QR code (registered trademark). In the example in FIG. 33(A) and the like, the position detecting patterns (clipping symbols) 104 are arranged as the specification patterns in three corner portions of the code region, respectively.

In the present system, for example, the information code 500 is formed by the producing apparatus 2 in a configuration in which the position detecting patterns 104 and the graphic forms of other cells are printed on a predetermined formation subject medium 501. The formation subject medium 401 is composed of a paper material, a resin material, a metal material, or other publically known materials. For example, the formation subject medium 401 is configured in a sheet shape or a plate shape having a predetermined thickness. The formation subject medium 501 is merely required to be configured such that the information code 500 is able to be formed on one surface side. The specific shape thereof is not particularly limited. For example, a configuration in which a plurality of materials are laminated is also possible.

In the information code 500 formed by the producing apparatus 2, for example, the specification pattern regions, the data recording region, and the correction code recording region are presented in a predetermined area on the front surface 501a of the formation subject medium 501 by a publically known formation method, such as printing or direct marking. The specification pattern regions, the data recording region, and the correction code recording region formed on the formation subject medium 501 are merely required to be formed such as to be visible from the front surface 501a side. The formation positions are not limited to the front surface 501a. For example, the specification pattern regions, the data recording region, and the correction code recording region may be formed on the surface of a member composed of a paper material, a resin material, a metal material, or the like, and may then be covered by a transparent sheet-shaped or plate-shaped member being arranged thereon. In this configuration, the surface of the transparent member serves as the front surface 501a. The specification pattern regions, the data recording region, the correction code recording region, and the like are formed in a position further towards the back side (back surface side) than the surface 501a. In either case, the specific pattern regions, the data recording region, and the correction code recording region are merely required to be formed on the formation subject medium 501 in a configuration in which the specific pattern regions, the data recording region, and the correction code recording region are visible from the front surface 501a side of the formation subject medium 501.

In the formation subject medium 501, a handwritten input region for enabling handwritten input to be performed is provided on the inner side from the outer edge portion of the code region. In the present configuration, an inner region in which the cells 102 are not arranged (the region further inward than the inner edge boundary of the arrangement region of the cells 102) in the information code 500 serves as the free space 510. The free space 510 is, for example, a region in which data is not recorded in the data recording region and is not subjected to error correction by the error correction region. The overall free space 510 serves as the handwritten input region. The free space 510 is, for example, a blank region of a predetermined color. Characters, graphical forms, symbols, and the like can be handwritten in the blank region using various writing tools. Graphical forms, such as a frame, and characters may be written in the free space 510 prior to handwritten input.

Then, an image of the information code 500 presented as in FIG. 33(A) is captured by the reader 10 as in FIG. 33(B), thereby obtaining a captured image such as that on the left-hand side in FIG. 34(A). The image in FIG. 34(A) is that in which only the image within the code region has been cut out from the image captured by the reader 10 and presented. As a result of the image within the code region obtained in this way, the information code 500 can be read by a method similar to that according to the first embodiment. An image 510' in the free space 510 can be extracted by a method similar to that according to the first embodiment.

In the present configuration as well, the light receiving sensor 23 shown in FIG. 2 corresponds to an example of the imaging unit. The light receiving sensor 23 functions to capture an image of the specification pattern regions, the data recording region, and the handwritten input region, from the front surface 501a side of the formation subject medium 501. In addition, the control circuit 40 corresponds to an example of the image processing unit. The control circuit 40 functions to perform an image recognition process on the image in the handwritten input region captured by the imaging unit as the image in the image region, by a method differing from that in the interpretation process for data by the data recording region reading unit.

As the image processing method for the image after extraction of the image in the image region (the image 510' in the free space 510), any of the processing methods according to the above-described embodiments may be used. For example, the extracted image 510' may be saved or transmitted in a predetermined file format (a publically known file format such as the bit map format, GIF format, or PEG format). Alternatively, a publically known character recognition process may be performed on the extracted image 510', and data on the handwritten characters and symbols may be obtained.

Figure 34:
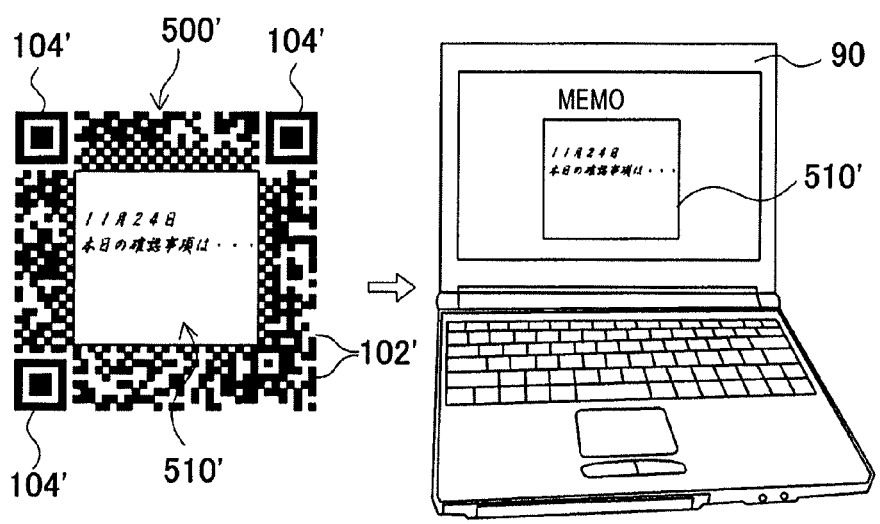
FIG. 34(A) is an explanatory diagram that explains transmission of the image obtained by cutting out the interior of the code region from a captured image obtained by imaging as in FIG. 33(B) to an external apparatus, and display of the image in the external apparatus at the transmission destination.
FIG. 34(B) is an explanatory diagram that conceptually explains a data structure in which data transmitted in this way is collected in the external apparatus.

In addition, when the producing apparatus 2 produces the information code 500, the information code 500 may be produced such that address information (such as an e-mail address specifying a destination for transmission by email, or a URL specifying an address on the Internet) specifying a transmission destination of the image in the image region or data analyzed from the image is recorded in the data recording region. When a code image such as that in FIG. 34(A) is obtained, the control circuit 40 that corresponds to the image processing unit may cut out a portion of, or the entirety of, the image in the image region from the code image. The control circuit 40 may then process the cut-out image or data analyzed from the image such as to be transmitted to the transmission destination specified by the address information recorded in the data recording region. As a result, at the transmission destination, various processes (such a display process as on the right-hand side in FIG. 34(B), an analysis process, or other image processing) using the extracted image or data analyzed from the image becomes possible. For example, when the extracted image is displayed in an external apparatus 90 at the transmission destination, the image can be displayed on a blog, a home page, other websites, and the like. For example, each time the reader 10 obtains an image as in FIG. 34, and transmits the image 510' in the image region or the data analyzed from the image 510' to the external apparatus 90 specified by the address information, the external apparatus 90 can register, in association, the transmission date and time, and the transmission content (memo data identified by the image 510' or the data analyzed from the image 510'). As a result, the external apparatus 90 creates a registration database in which memo data such as that in FIG. 34(B) is registered.

In this configuration as well, when the information code reader 10 reads the information code 500, a process becomes possible in which the recognized image in the image region or data analyzed from the image is automatically transmitted to the transmission destination specified by the address information recorded in the data recording region. As a result, input operation for the address information specifying the transmission destination to which the image in the image region or the analyzed image thereof is to be transmitted and the like are no longer required to be performed each time an information code is read. Work load, input error, and the like accompanying the input operation can be reduced with certainty.

In the present configuration, a characteristic information code 500 in which the specification pattern regions, the data recording region, and the handwritten input region are provided can be formed on the formation subject medium 501 by the information code producing apparatus 2. When the information code reader 10 captures an image of the formation subject medium 501 and reads the information code 500, the content inputted by hand in the handwritten input region (free space 510) can be subsequently used. In particular, a region of which the position is clearly prescribed in advance can be used as the handwritten region. Therefore, compared to a method in which handwritten characters and the like are simply captured in an image, only the handwritten information within a required region can be extracted with accuracy. Complicated operations involved in the extraction can be more easily omitted.

Ninth Embodiment

Next, a ninth embodiment will be described. First, a representative example according to the ninth embodiment will be described.

A system which uses an information code according to the ninth embodiment is also identical to that according to the first embodiment in terms of hardware. A configuration such as that in FIG. 1 and FIG. 2, described above, is used. Therefore, detailed descriptions of the hardware configuration similar to that according to the first embodiment are omitted. FIG. 1, FIG. 2, and the like are referenced as appropriate. In the present configuration, the producing apparatus 2 such as that in FIG. 1 produces the information code 100 (information code in which cells serving as units for displaying information are arranged within a predetermined code area) such as that in FIG. 38(A). The method for producing the information code 100 by the producing apparatus 2 is identical to that according to the first embodiment. In addition, the information code 100 generated by the producing apparatus 2 differs from the information code 100 according to the first embodiment only in terms of the content in the free space 110. The information 100 includes all characteristics of the information code 100 according to the first embodiment, other than the image in the free space 110. In this example as well, the "code region" is a rectangular region that can include all of a plurality of dark colored cells that are arranged. In particular, the code region is the smallest square region or oblong region that includes all of the three position detecting patterns (clipping symbols) 104. In the example in FIG. 38 as well, the plurality of cells 102 are composed of either light colored (white) cells or dark colored (black) cells having a rectangular shape (such as a square outer diameter shape). The cells 102 are arranged in a matrix in the periphery of the free space 110, described hereafter, within the code region. The light colored cells and the dark colored cells are not limited to white cells and black cells, respectively. When the dark colored cells are configured to have a predetermined brightness, the light colored cells are merely required to have a higher brightness compared thereto. In addition, a light colored or dark colored margin region is configured in the periphery of the code region in the information code 100 such as to surround the code region. In the example in FIG. 38 and the like, a light colored (such as white or another color having a higher brightness than the dark colored cells) margin region is arranged adjacent to the periphery of the code region. A fingerprint is subsequently pressed onto the free region 110 in the information code 100 produced as described above, thereby obtaining the information code 100 in which a fingerprint image is attached as in FIG. 38(B).

, Furthermore, the reader 10 such as that in FIG. 1 and FIG. 2 can read the produced information code 100 or the information code 100 to which a fingerprint graphical form F is attached as in FIG. 38(B). The process for interpreting the information code 100 by the reader 10 may be performed by a flow similar to that according to the first embodiment, or by a flow such as that in FIG. 35. Hereafter, the interpretation process indicated as an example in FIG. 35 will be described as a representative example.

Figure 38:
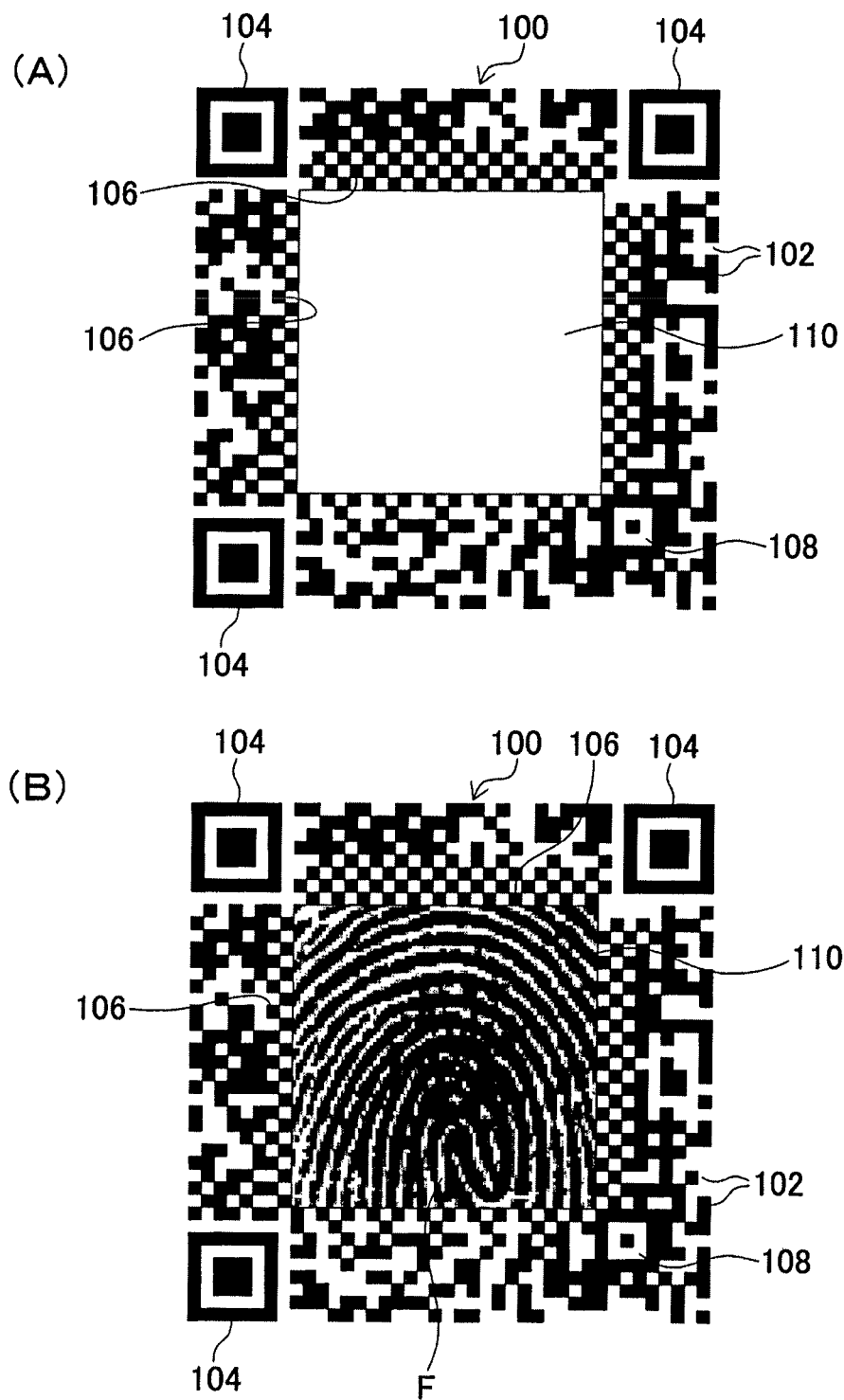
FIG. 38(A) is an explanatory diagram of an example of an information code produced by a producing apparatus in the system which uses an information code according to the ninth embodiment.
FIG. 38(B) is an explanatory diagram of a state in which a fingerprint is attached to the information code.

Here, the information code 100 used in the present configuration will be described. As shown in FIG. 38A, the information code 100 used in the present configuration is also provided with the specification pattern regions in which specification patterns each having a shape determined advance (the regions in which the position detecting patterns 104, the timing pattern (timing cells) 106, and the alignment pattern 108 similar to those according to the first embodiment are arranged) are arranged, the data recording region in which data is recorded by cells 102 of a plurality of types, and the error correction code recording region in which error correction codes are recorded by cells 102 of a plurality of types, within the code region. The specification pattern region is a region in which the light colored cells and the dark colored cells are arranged. A fixed pattern having a size that is larger than the size of a single cell is presented in the specification pattern region. For example, in information codes of the same version, the same specification pattern region is arranged in the same position. An image region that shows an image differing from the cells 102 is configured such as to be presented within the code region as an area wider than the size of a single cell 102. In the example in FIG. 38, the overall free space 110 corresponds to the image region. For example, as in FIG. 38(B), an image differing from the cell 102 is presented within the free space 110. The free space 110 is a region in which at least either data recording or design display is possible by a method differing from the method for recording data in the data recording region. The free space 110 has a size that is larger than the size of a single cell 102. In the example in FIG. 38(B), the overall free space 110 corresponds to the image region (the region in which the image differing from the cell is displayed). However, a portion of the free space 110 may be the image region.

Furthermore, in the present configuration, when the information code producing apparatus 2 in FIG. 1 produces the information code 100 shown in FIG. 38(A), data to be used that is used when the image in the free space 110 (image area) is processed is recorded in the data recording region (the region in which data to be interpreted is recorded by a plurality of cells 102). Specifically, comparison data to be used for comparison with at least a portion of the image in the free space 110 (image region) or analysis data obtained by analyzing the image in the free space 110 (image region) is recorded in the data recording region (the region in which data to be interpreted is recorded).

Here, the comparison data recorded in the data recording region will be described. In the present configuration, during the reading process described hereafter, fingerprint verification is performed by a publically known fingerprint verification method (such as a characteristic point extraction method (minutia method), a pattern matching method, or a frequency analysis method). In advance registration, registered fingerprint data to be used in fingerprint verification is generated as the comparison data. Hereafter, an instance in which the characteristic point extraction method is used as the fingerprint verification method will be described as a representative example.

Figure 36:
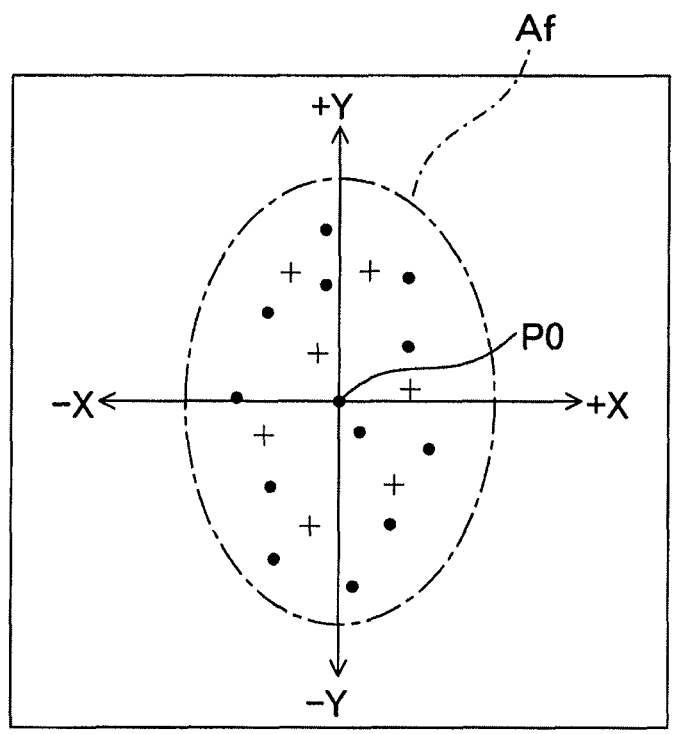
FIG. 36 is an explanatory diagram that conceptually explains a method for generating comparison data according to the ninth embodiment.

In advance registration, for example, a registrant is asked to stamp a fingerprint. The registrant stamps the fingerprint in a predetermined color on a stamping material, such as a paper material, a resin material, or a metal material. An image of the fingerprint (the graphical form of the fingerprint stamped by the registrant pressing a finger onto the surface of the stamping material) is captured by the reader 10 or another camera. Alternatively, an image of the fingertip of the registrant is directly captured by the reader 10 or another camera, and an image of the fingerprint is thereby obtained. Then, when the characteristic point extraction method (minutia method) is used, the shapes of the characteristic points are prescribed in advance. The prescribed characteristic points are extracted from the fingerprint image of the registrant obtained through the above-described operation. In the present configuration, a "branching point" and an "edge point" are prescribed as the shapes of the characteristic points. In FIG. 36, the branching points (position at which a line branches out) and the edge points (position at the end portion of a line) scattered throughout the fingerprint image obtained by capturing an image of the fingerprint of the registrant are conceptually shown as an example. In FIG. 36, the fingerprint region within the image is indicated by a single-dot chain line Af. The position of a branching point is indicated by a dot. The position of an edge point is indicated by a plus sign. In FIG. 36, a specific fingerprint image is omitted. However, in actuality, a specific fingerprint image is presented within the single-dot chain line Af.

Each characteristic point (branching point and edge point) scattered as shown in FIG. 36 is detected. The X coordinate value and the Y coordinate value are calculated for each characteristic point. The method for calculating the coordinate values is merely required to be a method enabling the relative positional relationships of the characteristic points to be ascertained. For example, as shown in FIG. 36, the X coordinate value and the Y coordinate value of each characteristic point is calculated with the position of the characteristic point P0 closest to the center position of the fingerprint region (the region surrounded by the single-dot chain line Af) as a reference position (point of origin), and the lateral direction and the vertical direction of the pixels as the X direction and the Y direction, respectively.

Then, the registered fingerprint data is generated based on the type, X coordinate value, and Y coordinate value of each characteristic point detected and calculated as described above. Specifically, as shown in FIG. 37, for each characteristic point, a value indicating the type, a value corresponding to the X direction position, and a value corresponding to the Y direction position are generated in associated, based on the type, X coordinate value, and Y coordinate value of each characteristic point, and are set as the registered fingerprint data (comparison data). In the example in FIG. 37, data (value indicating type, value corresponding to the X direction position, and value corresponding to the Y direction position) on each of a predetermined number of characteristic points (such as 15 characteristic points) near the reference position (point of origin) is generated and set as the registered fingerprint data (comparison data). When the information code producing apparatus 2 generates the information code 100 such as that in FIG. 38(A), such registered fingerprint data (comparison data) is recorded in the data recording region. As a result of advance preparation such as this, a code configuration can be achieved in which authentication is successful when a fingerprint that corresponds to the registered fingerprint data (comparison data) recorded in the data recording region is attached to the free space 110 (image region) of the information code 100, such as that in FIG. 38(A). Authentication is a failure when a fingerprint that corresponds to the registered fingerprint data (comparison data) is not attached.

Figure 35:
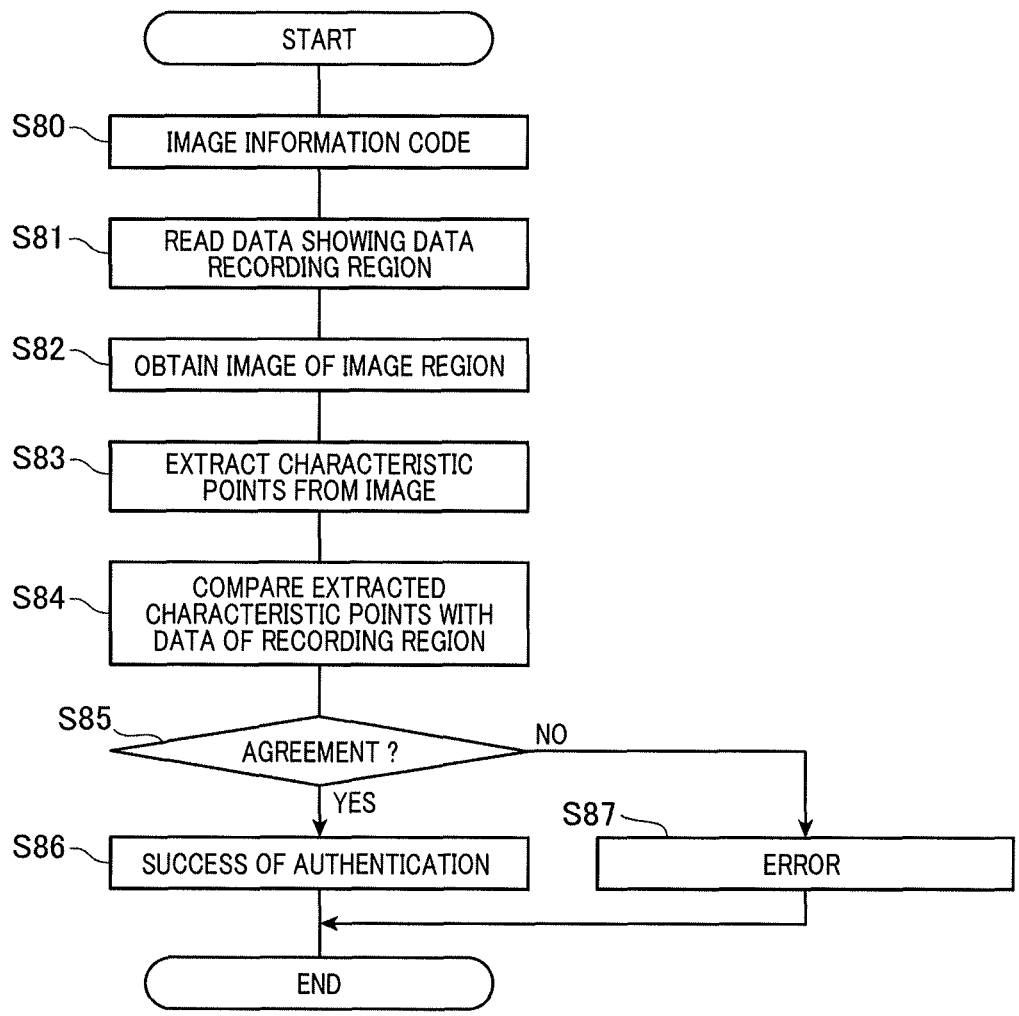
FIG. 35 is a flowchart of an example of the flow of a reading process performed by a system which uses an information code according to a ninth embodiment.

In the present configuration, for example, reading of the information code and authentication are performed by a flow such as that in FIG. 35. The process is performed by the reader 10 when a predetermined start operation is performed. First, the reader 10 performs imaging of the information code (S80). The reader 10 then analyzes the code image in the information code and reads the data in the data recording region (S81). The reader 10 identifies the image region (free space 110) from the code image in the information code and cuts out the image in the image region (free space 110) (S82). The method for interpreting the data recording region in the information code 100 and the method for extracting the image region (free space 110) can, for example, be performed by methods similar to those according to the first embodiment.

The reader 10 then analyzes the image in the image region (free space 110) cut out in this way and extracts the characteristic points (S83). The method for extracting the characteristic points at S83 is similar to that for advance registration. For example, when the fingerprint image such as that in FIG. 38(B) is presented in the free space 110, the edge points (position of the end portion of a line) and the branching points (position at which a line branches out) are extracted from the fingerprint image. Then, after extracting the characteristic points at S83, the reader 10 compares the data on the extracted characteristic points and the data (comparison data) on the characteristic points read from the data recording region at S81, and determines whether or not the data of the characteristic points match (S84). As the method for comparing the registered characteristic points and the read characteristic points, and determining whether or not the characteristic points match, any method that is publically known in the field of fingerprint authentication may be used.

When determined through the comparison process (determination process) at S84 that the data on the characteristic points extracted at S83 and the data (comparison data) on the characteristic points read from the data recording region at S81 match, the reader 10 proceeds to Yes at S85 and determines authentication to be successful (S86). In this case, the reader 10 may give notification that the authentication is successful (such as by an authentication successful message display or output of authentication successful audio information.) Conversely, when determined through the comparison process (determination process) at S84 that the data on the characteristic points extracted at S83 and the data (comparison data) on the characteristic points read from the data recording region at S81 do not match, the reader 10 proceeds to No at S85 and determines that an error has occurred (S87). In this case, the reader 10 may give notification that an error has occurred (such as by an error message display or output of error audio information).

In the present configuration as well, the light receiving sensor 23 corresponds to the imaging unit. In addition, the control unit 40 corresponds to an example of the data recording region reading unit. When an image of the information code 100 is captured by the light receiving sensor 23 (imaging unit), the control circuit 40 functions to read the data recorded in the data recording region.

In addition, the control circuit 40 corresponds to an example of the image processing unit. The control circuit 40 functions to perform predetermined image processing on the image in the image region (image in the free space 110) in the code image of the information code 100 that has been captured by the light receiving sensor 23 (imaging unit). Specifically, the control circuit 40 performs a determination process regarding whether or not the image in the image region (image in the free space 110) corresponds to a predetermined legitimate image using the comparison data (data to be used) read by the data recording region reading unit. Specifically, the control circuit 40 performs a predetermined characteristic point extraction process (S38) on the image in the image region (image in the free space 110). The control circuit 40 compares the characteristic points in the image region (free space 110) extracted by the characteristic point extraction process and the reference characteristic point data (comparison data) recorded in the data recording region, and determines whether or not the characteristic points match. As a result, the control circuit 40 determines whether or not the image in the image region (image in the free space 110) corresponds to the legitimate image (the image of the fingerprint from which the reference characteristic point data recorded in the data recording region is generated).

In addition, in the present configuration, in the information code reader 10, the light receiving sensor 23 (imaging unit) and the control circuit 40 that functions as the data recording region reading unit and the image processing unit are integrally provided such as to be assembled in a case (housing) (not shown). The light receiving sensor 23 (imaging unit) and the control circuit 40 that functions as the data recording region reading unit and the image processing unit can be integrally recognized and operated. Authentication can also be completed within the apparatus.

In the present configuration, the image to be used (image in the free region 110) and the comparison data to be used for comparison can be obtained at the same time by a single imaging operation. Therefore, the image (image in the image region) and the data (comparison data) to be associated with each other can be accurately obtained. Operation time and processing time can also be easily shortened. Furthermore, the size of the medium to be read can be more easily reduced. In addition, authentication can be performed using the comparison data recorded in the data recording region. Therefore, access to a server or the like becomes unnecessary. Authentication can be performed with no difficulty even in an environment in which communication with a server is not possible or an environment in which communication with a server is difficult.

In the example described above, an example is given in which the position data specifying the positions of the characteristic points (a plurality of reference characteristic points) obtained through advance registration is recorded in the data recording region as comparison data. However, a configuration is also possible in which the number of characteristic points (a plurality of reference characteristic points) obtained through advance registration is recorded in the data recording region as comparison data. In this case, in the comparison process at S83, whether or not the number of characteristic points recorded in the data recording region and the number of characteristic points extracted at S83 match may be determined. When the numbers of characteristic points match, the reader 10 may proceed to Yes at S85. When the numbers of characteristic points do not match, the reader 10 may proceed to No at S85.

First Variation Example According to the Ninth Embodiment

Next, a first variation example according to the ninth embodiment will be described.

The first variation example differs from the representative example according to the ninth embodiment only in terms of the specific content in the free space 110 and the specific content of the comparison data recorded in the data recording region. Other aspects are identical to those of the representative example according to the ninth embodiment.

Figure 39:
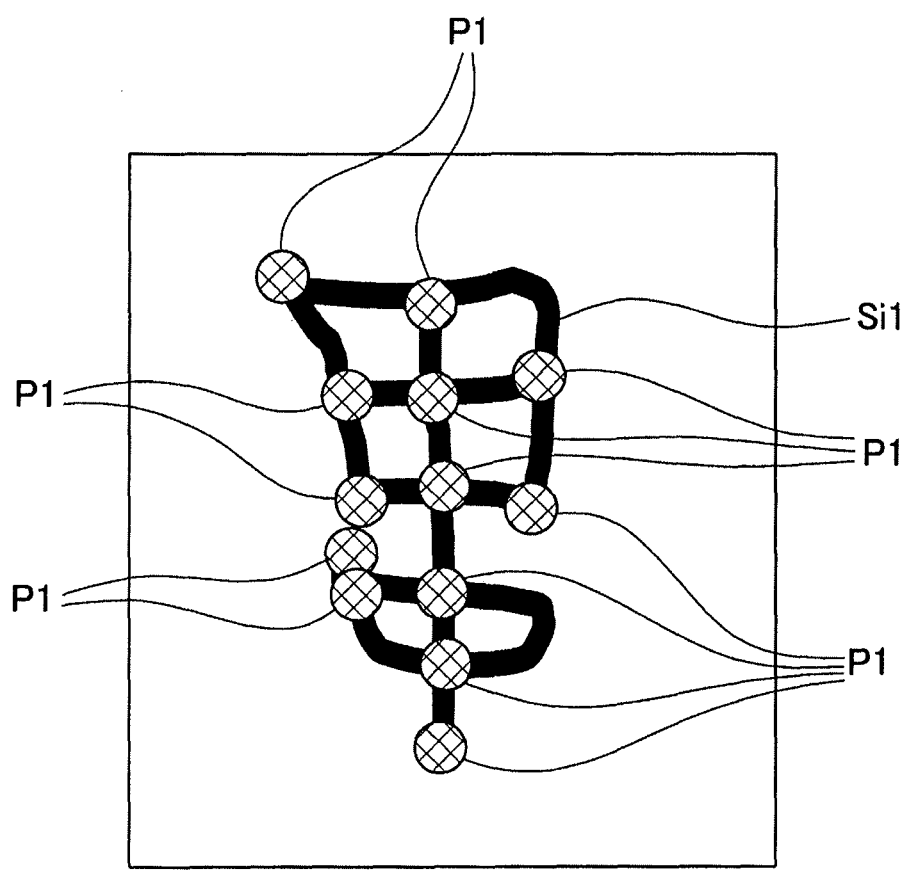
FIG. 39 is an explanatory diagram that conceptually explains a method for generating comparison data in a first variation example according to the ninth embodiment.
Figure 40:
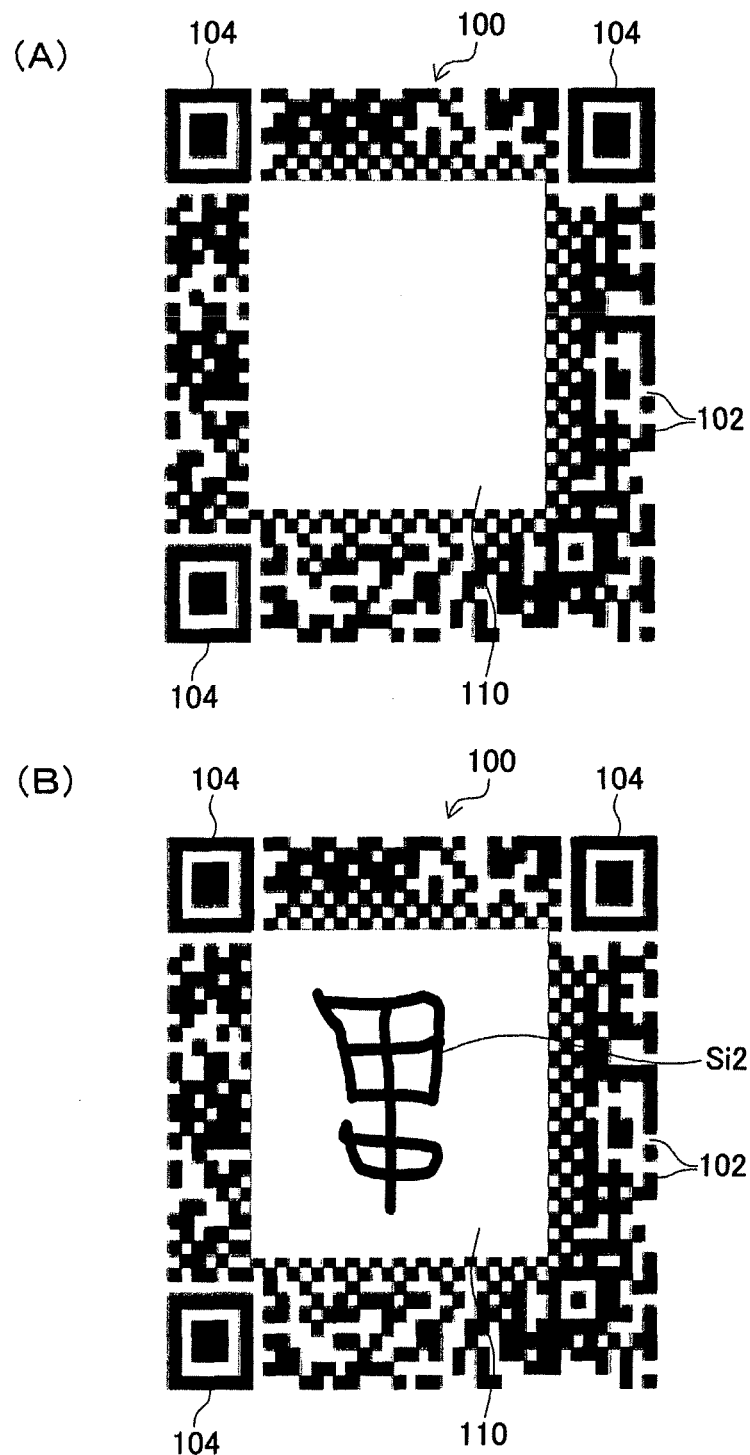
FIG. 40(A) is an explanatory diagram of an example of an information code produced by the producing apparatus in the system which uses an information code related to the first variation example according to the ninth embodiment.
FIG. 40(B) is an explanatory diagram of a state in which a signature is written in the information code.

In this example, the information code producing apparatus 2 produces the information code 100 such as that in FIG. 40(A). When the information code 100 is produced, comparison data to be used for comparison with at least a portion of the image in the image region or analysis data obtained by analyzing the image in the image region is recorded in the data recording region (the region in which data to be interpreted is recorded) as data to be used that is used when the image in the image area (image in the free space 110) is processed. The comparison data used in this example is data indicating the characteristics of signature characters (handwritten characters). Specifically, the comparison data is data on characteristic points extracted from signature characters (handwritten characters) Si1 registered in advance as in FIG. 39.

In this example, in advance registration, a registrant is asked in advance to write, by hand, signature characters (handwritten characters). The registrant writes the signature characters on the surface of a writing material, such as a paper material, a resin material, or a metal material. An image of the signature characters is captured by the reader 10 or another camera. Alternatively, the image of the signature characters may be obtained by pen input using a touch panel or the like. The characteristic point extraction method (minutia method) similar to that for fingerprint verification, described above, is used. The shapes of characteristic points are prescribed in advance. The prescribed characteristic points are extracted from the signature image of the registrant obtained through the above-described operation. In this example as well, the branching points (position at which a line branches out) and the edge points (position at the end portion of a line) similar to those in the representative example can be prescribed as the shapes of the characteristic points. In FIG. 39, the positions of the characteristic points are indicated by reference number P1.

Each characteristic point P1 (branching point and edge point) scattered as shown in FIG. 39 is detected. The X coordinate value and the Y coordinate value are calculated for each characteristic point. The method for calculating the coordinate values is merely required to be a method enabling the relative positional relationships of the characteristic points to be ascertained, in a manner similar to that in the representative example. For example, in a manner similar to that in the representative example, the X coordinate value and the Y coordinate value of each characteristic point may be calculated with the position of the characteristic point closest to the center position of the signature characters Sit as a reference position (point of origin), and the lateral direction and the vertical direction of the pixels as the X direction and the Y direction, respectively.

Then, the registered signature data (comparison data) is generated based on the type, X coordinate value, and Y coordinate value of each characteristic point detected and calculated as described above. Specifically, by a method similar to that in FIG. 37, for each characteristic point, a value indicating the type, a value corresponding to the X direction position, and a value corresponding to the Y direction position are generated in associated, based on the type, X coordinate value, and Y coordinate value of each characteristic point, and are set as the registered signature data (comparison data). When the information code producing apparatus 2 generates the information code 100 such as that in FIG. 40(A), such registered signature data (comparison data) is recorded in the data recording region. As a result of advance preparation such as this, authentication is successful when a signature that corresponds to the registered signature data (comparison data) recorded in the data recording region is attached to the free space 110 (image region) in the information code 100. Authentication is a failure when a signature that corresponds to the registered signature data (comparison data) is not attached. When signature characters Sit are written as in FIG. 40(B) in the information code 100 such as that in FIG. 40(A), as a result of the reading process in FIG. 35 being performed, whether or not the signature written in the image region (free space 110) of the information code 100 matches the registered signature (the signature from which the registered signature data recorded in the data recording region is generated) (specifically, whether or not the characteristic points extracted at S83 when the information code 100 in FIG. 40(B) is read and the characteristic points in the comparison data recorded in the data recording region of the information code 100 match) can be determined.

Second Variation Example According to the Ninth Embodiment

Next, a second variation example according to the ninth embodiment will be described.

The second variation example differs from the representative example according to the ninth embodiment only in terms of the specific content in the free space 110 and the specific content of the comparison data recorded in the data recording region. Other aspects are identical to those of the representative.

In this example as well, the information code producing apparatus 2 produces the information code 100 such as that in FIG. 42(A). When the information code 100 is produced, comparison data to be used for comparison with at least a portion of the image in the image region or analysis data obtained by analyzing the image in the image region is recorded in the data recording region (the region in which data to be interpreted is recorded) as data to be used that is used when the image in the image area (image in the free space 110) is processed. The comparison data used in this example is data indicating the characteristics of a stamp seal. Specifically, the comparison data is data on characteristic points extracted from a stamp seal image D1 registered in advance as in FIG. 41.

Figure 41:
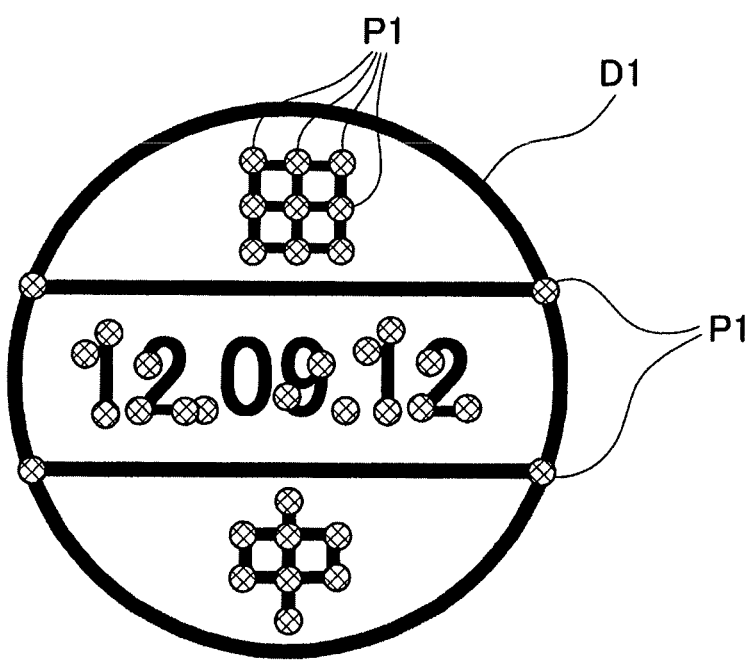
FIG. 41 is an explanatory diagram that conceptually explains a method for generating comparison data in a second variation example according to the ninth embodiment.

In this example, in advance registration, a registrant is asked in advance to stamp a stamp seal. The registrant stamps the stamp seal by pressing the stamp seal onto the surface of a forming material, such as a paper material, a resin material, or a metal material. An image of the stamp seal is captured by the reader 10 or another camera. The characteristic point extraction method (minutia method) similar to that for fingerprint verification, described above, is used. The shapes of characteristic points are prescribed in advance. The prescribed characteristic points are extracted from the stamp seal image of the registrant obtained through the above-described operation. In this example as well, the "branching points" and the "edge points" similar to those in the representative example and the first variation example can be prescribed as the shapes of the characteristic points. In FIG. 41, the positions of the characteristic points are indicated by reference number P1. The reference number is omitted for some of the characteristic points.

In advance registration, each characteristic point (branching point and edge point) scattered as shown in FIG. 41 is detected. The X coordinate value and the Y coordinate value are calculated for each characteristic point. The method for calculating the coordinate values is merely required to be a method enabling the relative positional relationships of the characteristic points to be ascertained, in a manner similar to that in the representative example and the first variation example. In a manner similar to that in the representative example and the first variation example, the X coordinate value and the Y coordinate value of each characteristic point may be calculated with the position of the characteristic point closest to the center position of the stamp seal as a reference position (point of origin), and the lateral direction and the vertical direction of the pixels as the X direction and the Y direction, respectively.

Then, the registered stamp seal data is generated based on the type, X coordinate value, and Y coordinate value of each characteristic point detected and calculated as described above. Specifically, by a method similar to that in FIG. 37, for each characteristic point, a value indicating the type, a value corresponding to the X direction position, and a value corresponding to the Y direction position are generated in associated, based on the type, X coordinate value, and Y coordinate value of each characteristic point, and are set as the registered stamp seal data (comparison data). When the information code producing apparatus 2 generates the information code 100 such as that in FIG. 42(A), such registered stamp seal data (comparison data) is recorded in the data recording region. As a result of advance preparation such as this, authentication is successful when a stamp seal that corresponds to the registered stamp seal data (comparison data) recorded in the data recording region is attached in the information code 100. Authentication is a failure when a stamp seal that corresponds to the registered stamp seal data (comparison data) is not attached. When a stamp seal D2 is attached by stamping as in FIG. 42(B) onto the information code 100 such as that in FIG. 42(A), as a result of the reading process in FIG. 35 being performed, whether or not the stamp seal D2 presented in the image region (free space 110) of the information code 100 matches the registered stamp seal (the stamp seal from which the registered stamp seal data recorded in the data recording region is generated) (specifically, whether or not the characteristic points extracted at S83 when the information code 100 in FIG. 42(B) is read and the characteristic points in the comparison data recorded in the data recording region of the information code 100 match) can be determined.

Third Variation Example According to the Ninth Embodiment

Next, a third variation example according to the ninth embodiment will be described.

The third variation example differs from the representative example according to the ninth embodiment only in terms of the specific content in the free space 110 and the specific content of the comparison data recorded in the data recording region. Other aspects are identical to those of the representative example according to the ninth embodiment.

In this example as well, the information code producing apparatus 2 produces the information code 100 similar to that in FIG. 40(A). When the information code 100 is produced, comparison data to be used for comparison with at least a portion of the image in the image region or analysis data obtained by analyzing the image in the image region is recorded in the data recording region (the region in which data to be interpreted is recorded) as data to be used that is used when the image in the image area (image in the free space 110) is processed. The comparison data used in this example is specific data specifying at least any of a numeric character, character, symbol, or graphical form to be recorded in the free space 110 (image region). For example, when the correct form is when the characters "Tanaka (person's name)" such as that in FIG. 40(B) are recorded, data of the characters "Tanaka" is merely required to be recorded in the data recording region as the comparison data. As a result, the information code 100 can be actualized in which authentication is successful when the characters "Tanaka" are written, and an error occurs when the characters "Tanaka" are not written. The configuration is not limited to this example. For example, when the correct form is when the numeric characters "1234" is written, data of "1234" is merely required to be recorded in the data recording region as the comparison data.

In an example such as this, when the reading process such as that in FIG. 35 is performed, the characteristic point extraction process at S83 is changed to a symbol recognition process. The comparison process at S84 is changed to a comparison process between a registered symbol and an extracted symbol. Specifically, after the processes at S80 to S82 are performed by a method similar to that in the representative example, at S83, the reader 10 performs a publically known symbol recognition process (optical character reader (OCR) process) on the image in the image region, and ascertains the symbol (a handwritten symbol, such as a handwritten character or a handwritten numeric character) recorded in the image region. Then, at S84, the reader 10 determines whether or not the symbol ascertained at S83 and the symbol (comparison data) read at S81 match. When determined that the symbols match, the reader 10 proceeds to Yes at S85. When determined that the symbols do not match, the reader proceeds to No at S85. The processes at S86 and S87 can be performed by a method similar to that in the representative example.

In the present configuration as well, the control circuit 40 corresponds to the image processing unit. The control circuit 40 functions to perform a recorded content recognition process to recognize at least any of a numeric character, character, symbol, or graphic form on the image in the free space 110 (image region). The control circuit 40 then functions to perform a determination process regarding whether or not the image in the free space 110 (image region) corresponds to a legitimate image (that is, an image indicating the numeric character, character, symbol, graphic form, or the like recorded in the data recording region) based on the recorded content in the free space 110 recognized by the recorded content recognition process and the specific data (the correct data on the numeric character, character, symbol, graphical form, or the like) recorded in the data recording region.

Fourth Variation Example According to the Ninth Embodiment

In the representative example and the first to third variation examples according to the fourth embodiment, a fingerprint, a signature, a stamp seal, and the like are given as examples of an object to be authenticated. However, a hologram may be the object to be authenticated. In this case as well, comparison data may be extracted from a hologram to be registered, using a predetermined method. The comparison data may then be recorded in the data recording region of the information code. When a hologram is attached to the free space in the information code, the data extracted from the hologram and the comparison data recorded in the data recording region may be compared, and whether or not the data match may be determined.

[Other Examples According to the Ninth Embodiment]

In the information code used in the representative example and the variation examples according to the ninth embodiment, the configurations according other embodiments described above or hereafter may be used, excluding that of the free space.

In addition, in the information code used in the representative example and the variation examples according to the ninth embodiment, the comparison data to be recorded in the data recording region may be encrypted and recorded. In this case, a shared encryption key may be stored in the producing apparatus 2 and the reader 10. The reader 10 may decode the encryption using a decoding algorithm corresponding to the encryption algorithm used for encryption by the producing apparatus. The reader 10 can thereby interpret the data to be interpreted that is recorded in the data recording region and that has been encrypted by the producing apparatus 2.

In addition, in the information code used in the representative example and the variation examples according to the ninth embodiment. Soiling and the like in the data recording region can be corrected by the error correction codes recorded in the error correction code recording region. Therefore, even should the fingerprint, signature, stamp seal, or other images run outside the free space 110, reading can be performed without difficulty even when a slight run-over occurs.

In the above-described representative example and variation examples according to the ninth embodiment, the reader 10 compares the analysis result obtained from the image in the free space 110 and the data in the data recording region, and performs authentication. However, the reader 10 may transmit the comparison data read at S81 and the analysis result read at S83 to an external apparatus. The external apparatus may then determine whether or not the comparison data and the analysis result match. For example, the processes at S84 and S85 in FIG. 35 may be performed by the external apparatus. The external apparatus may then transmit the result to the reader 10.

In the above-described representative example and variation examples according to the ninth embodiment, the comparison data is recorded in the data recording region. However, in a configuration in which high recording capacity can be secured in the data recording region (such as when the size is large), image data indicating a portion of, or an entirety of, the image to be displayed in the image region may be recorded in the data recording region. For example, in the case of the representative example, the fingerprint image itself that has been used in advance registration may be recorded in the data recording region. In addition, in the case of the first variation example, the signature image itself that has been used in advance registration may be recorded in the data recording region. In the case of the second variation example, the stamp seal image itself that has been used in advance registration may be recorded in the data recording region. In this case, at S81, the reader 10 may read the image data recorded in the data recording region and omit the process at S83. At S84, the reader 10 may compare the image data read at S81 and the image in the free space 110 (image region) obtained at S82 by publically known pattern matching or the like, and determine whether or not the image data and the image match.

Tenth Embodiment

Next, a tenth embodiment will be described. First, a representative example according to the tenth embodiment will be described.

A system which uses an information code 1 according to the tenth embodiment is also identical to that according to the first embodiment in terms of hardware. A configuration such as that in FIG. 1 and FIG. 2, described above, is used. The producing apparatus 2 such as that in FIG. 1 produces the information code 100 (information code in which cells serving as units for displaying information are arranged within a predetermined code area) such as that in FIG. 43. The method for producing the information code 100 by the producing apparatus 2 is identical to that according to the first embodiment. In this example, a configuration in which the free space 110 is made blank is produced from the configuration of the information code 100 shown in FIG. 43. The information code 100 produced by the producing apparatus 2 in this way differs from the information code 100 according to the first embodiment only in terms of the content in the free space 110. The information code includes all characteristics of the information code 100 according to the first embodiment, other than the image in the free space 100. A signature (handwritten characters) or a stamp is subsequently attached to the free space 100 in the information code 100 that has been generated in this way. As a result, the information code 100 to which a stamp image or a signature image is attached as shown in FIG. 43 is obtained.

Here, the information code 100 will be described. The information code 100 processed in the present system 1 is also provided with the specification pattern regions in which specification patterns each having a shape determined advance (the regions in which the position detecting patterns 104, the timing pattern (timing cells) 106, and the alignment pattern 108 are arranged) are arranged, the data recording region in which data is recorded by cells 102 of a plurality of types, and the error correction code recording region in which error correction codes are recorded by cells 102 of a plurality of types, within the code region. An image region that shows an image differing from the cells 102 is configured such as to be presented within the code region as an area wider than the size of a single cell 102. In the example in FIG. 43, the overall free space 110 is configured as the image region. For example, as in FIG. 43, an image differing from the cell 102 is presented within the free space 110. The free space 110 is a region in which at least either data recording or design display is possible by a method differing from the method for recording data in the data recording region. The free space 110 has a size that is larger than the size of a single cell 102.

In the present system 1, the information code 100 such as this is used such as to be attached to a delivery slip (invoice) Pa used for deliveries and postal matter. A delivery slip (invoice) having a publically known configuration can be used as the delivery slip (invoice). The delivery slip (invoice) is provided with fields for entering the recipient address, recipient name, phone number, item name, sender address, sender name, phone number, and the like. In the present system 1, the producing apparatus 2 prints the information code on the delivery slip Pa such as this, and the information code 100 is used as a part of the delivery slip Pa. The free space 110 (image region) provided within the information code 100 is configured as a region for forming at least any of, for example, a fingerprint, a stamp seal, or a signature.

Figure 43:
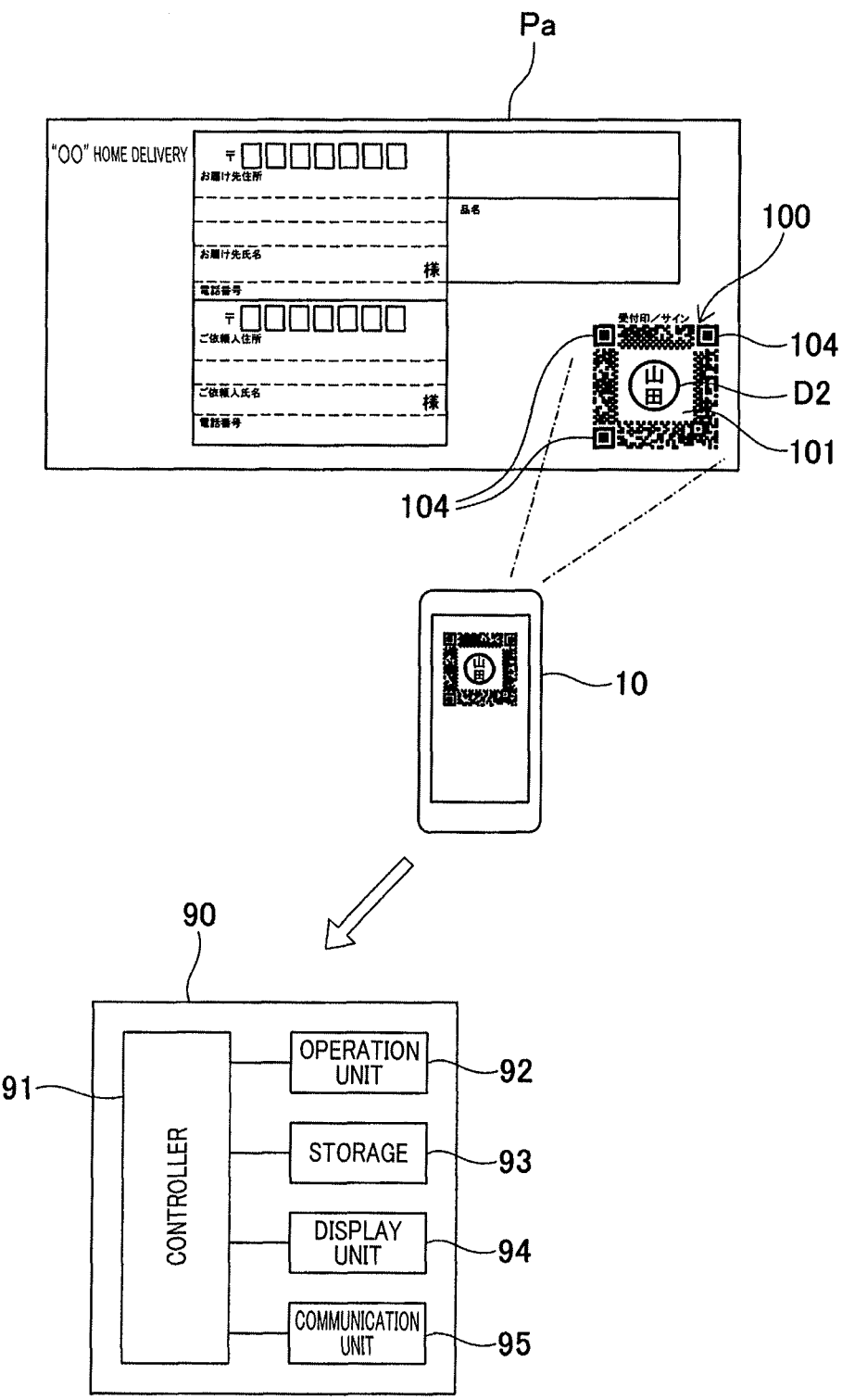
FIG. 43 is an explanatory diagram that conceptually explains reading of a delivery slip processed in a system which uses an information code according to a tenth embodiment.

Furthermore, in the present configuration, when the information code producing apparatus 2 produces the information code 100 (specifically, that in which the free space is blank) shown in FIG. 43, address information specifying a transmission destination or save-to destination of the image in the free space 110 (image region) is recorded in the data recording region as data to be used that is used when the image in the free space 110 (image region) is processed. Specifically, for example, the URL, email address, or the like of a management server of a company operating a delivery service is recorded in the data recording region as address information. Alternatively, information (address information) designated by the reader 10 itself may be recorded in the data recording region as a save-to destination of the image in the free space 110 (image region). Hereafter, an example in which the address information designating a transmission destination outside of the reader 10 is recorded in the data recording region will be described as the representative example.

When a delivery slip (invoice) such as this is used, first, the information code producing apparatus 2 is prepared on the operating entity side, the operating entity being that which operates the delivery or postal service. For example, the information code 100 is produced in which the URL uniquely assigned to the own company, the email address of the company, or the like is recorded in the data recording region as the address information, and the free space 110 is configured as, for example, a blank region. The information code 100 is then attached to the delivery slip Pa, such as that in FIG. 43, by printing or the like. At this stage, the free space 110 is blank. Therefore, the stamp seal D2 shown in FIG. 43 is not attached thereto. In addition, at this stage, the fields related to the recipient and the fields related to the sender are, for example, blank. Advance preparation such as this is performed. When a user desires delivery of a package, the operating entity side gives the user the delivery slip Pa such as this, and prompts the user to fill in the fields related to the recipient and the fields related to the sender. Then, after the user has filled in the fields related to the recipient and the fields related to the sender, the delivery slip Pa is attached to the package (not shown) and managed. The operating entity (such as a delivery service operator) side delivers the package to which the delivery slip Pa is attached to the recipient. The free space 110 in the information code 100 remains blank even during the delivery stage. Then, when delivering the package such as this to the recipient, an employee of the operating entity peels the delivery slip Pa attached to the package upon delivery of the package. The employee prompts the party at the recipient destination (such as a resident at the recipient destination) to attach a signature or a stamp seal within the free space 110 in the information code 100 on the delivery slip Pa, as in FIG. 43. Then, the employee uses the reader 10 to read the information code 100 on the delivery slip Pa in which the signature or stamp seal is attached to the free space 110 in this way, either on-site or after returning to the office. Then, when the information code 100 is read, the reader 10 interprets the data recording region by a method similar to those according to the above-described embodiments. The reader 10 identifies the position of the free space 110 (image region) and cuts out the image in the free space 110 (image region). Then, the image in the free space 110 (image region) that has been cut out is transmitted to the transmission destination specified by the address information recorded in the data recording region. For example, when the URL, email address, or the like of the operating entity is recorded in the data recording region of the information code 100, the image in the free space 110 (image region) is transmitted to the apparatus (such as the external apparatus 90, or another apparatus accessible by the external apparatus 90) specified by the URL or email address). The image in the free space 110 (image region) is stored in a memory unit (such as a memory unit 93 of the external apparatus 90) in the apparatus. Information enabling identification of the delivery slip Pa (such as a delivery number uniquely attached to the delivery slip, personal information on the sender, or personal information on the recipient) is preferably recorded in advance in the data recording region of the information code 100 attached to the delivery slip Pa. When the information code 100 is read, transmission may be performed to the transmission destination in the address information recorded in the data recording region, such that "information enabling identification of the delivery slip Pa" and the image in the free space 110 (image region) that has been cut out are associated. As a result, at the transmission destination, the "information enabling identification of the delivery slip Pa" and the "image in the free space 110 (image region)" can be associated and collected. The presence of information on confirmation (such as the signature or the stamp seal) by the recipient of the delivery slip Pa can be more easily checked.

In the above-described representative example, an example is given in which the overall image in the image region (image in the free space 110) is transmitted to the transmission destination specified by the address information. However, only a portion of the image in the image region (image in the free space 110) may be transmitted. Alternatively, instead of the image in the image region (image in the free space 110), analysis data (such as characteristic point data when characteristic points are extracted from the image in the image region (image in the free space 110) by a method similar to that according to the ninth embodiment, or character data obtained by a character recognition process (OCR process) being performed on the image in the image region (image in the free space 110)) obtained by analysis of the image in the image region (image in the free space 110) may be transmitted.

In the present configuration, the control circuit 40 corresponds to an example of the image processing unit. The control circuit 40 functions to transmit to a transmission destination or save to a save-to destination specified by the address information recorded in the data recording region, at least a portion of the image in the image region (image in the free space 110) or analysis data obtained by analysis of the image in the image region. Specifically, the control circuit 40 functions to transmit to a transmission destination or save to a save-to destination specified by the address information recorded in the data recording region, at least a portion of an image of at least any of a fingerprint, a stamp seal, or a signature formed in the image region, or analysis data obtained by analysis of any of the images.

First Variation Example According to the Tenth Embodiment

Next, a first variation example according to the tenth embodiment will be described.

Figure 44:
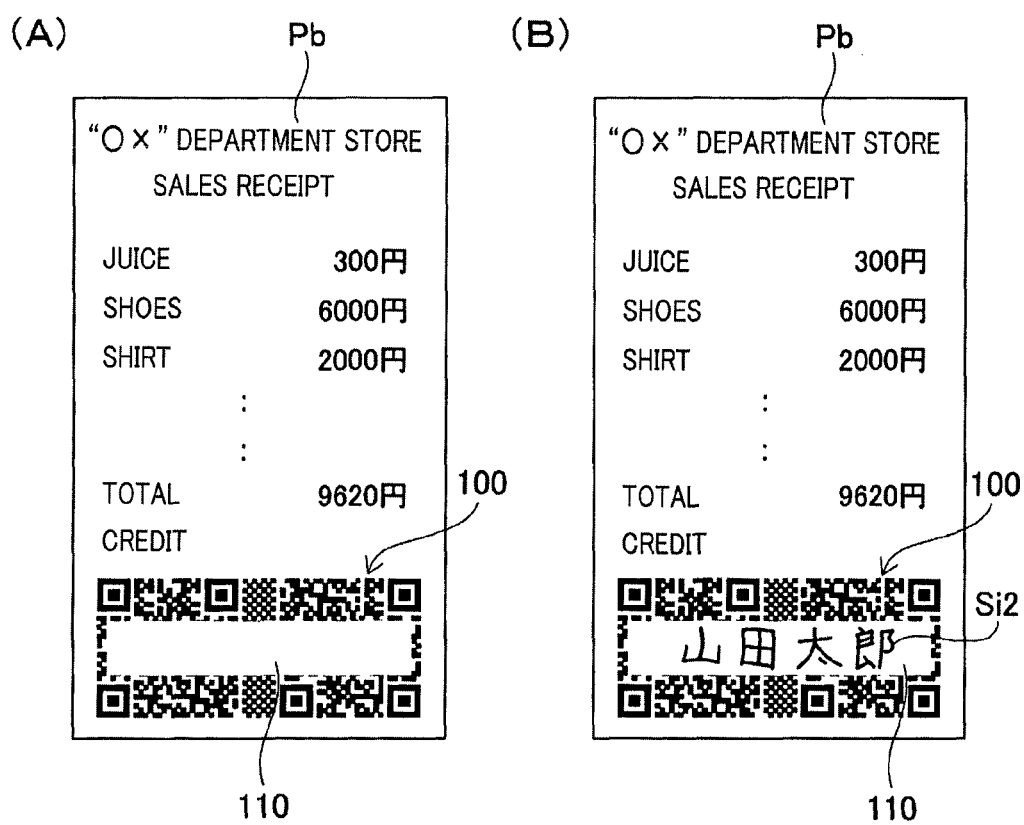
FIG. 44(A) is an explanatory diagram that conceptually explains a receipt processed in the system which uses an information code in a first variation example according to the tenth embodiment.
FIG. 44(B) is an explanatory diagram of a state in which a sign is written on the receipt.

The first variation example according to the tenth embodiment differs from the representative example according to the tenth embodiment only in terms of the specific content in the free space 10, the specific content of the data recorded in the data recording region, and the object to which the information code 100 is attached. In FIG. 44, an information code having a shape differing from the information code 100 used in the representative example according to the tenth embodiment and in other embodiments (such as the first embodiment) is used. However, the information code may be replaced by the information code 100 used in the representative example according to the tenth embodiment and in other embodiments (such as the first embodiment). In addition, the hardware configuration is the same as that according to the first embodiment. A configuration such as that shown in FIG. 1 and FIG. 2, described above, is used.

In the present system 1, for example, the information code producing apparatus 2 is configured as a POS register that is used in a store or the like. The information code 100 is used such as to be attached to a receipt Pb that is issued by the register in a store or the like, upon purchase of an item. Regarding the receipt Pb, those of a variety of fields are applicable. For example, in the example in FIG. 44, the receipt Pb is a credit card receipt that is used when a credit card is used at a store, a gas station, or the like. The information code 100 is attached to a portion of the receipt Pb. The free space 110 (image region) provided within the information code 100 is configured as a region for signing a signature.

In the present configuration as well, when the information code producing apparatus 2 produces the information code 100 shown in FIG. 44 (specifically, that in which the free space is blank), address information specifying the transmission destination or save-to destination of the image in the free space 110 (image region) is recorded in the data recording region as data to be used that is used when the image in the free space 110 (image region) is processed. Specifically, for example, the URL, email address, IP address, or the like assigned to the store, company, or the like that issues the receipt is recorded in the data recording region as the address information. When the information code 100 is read, the image in the free space 110 (image region) can be transmitted to the external apparatus 90 (the transmission destination specified by the above-described address information and an external apparatus similar to that in FIG. 43) that is provided in the store, company, or the like.

The receipt Pb such as this is issued by the information code producing apparatus 2 when, for example, the user purchases using credit card payment. The purchase specification, total amount, date of use (not shown), and the like are displayed in the receipt Pb. When the receipt Pb such as that in FIG. 44(A) is issued, the store clerk prompts the user to sign a signature (such as handwritten input of name) within the free space 110 in the information code 100, as shown in FIG. 44(B). Then, when the receipt Pb on which the signature has been written in the free space 110 in the information code 100 as in FIG. 44(B) is to be stored after settlement, first, the reader 10 reads the information code 100 on the receipt Pb. As the method for reading the information code 100, a method according to any of the embodiments described above may be used. Regardless of the method, the data in the data recording region is merely required to be interpreted. The position of the free space 110 is merely required to be identified, and the image in the free space 110 (image region) is merely required to be cut out. Then, in this case as well, the image in the free space 110 that has been cut out is transmitted to the transmission destination specified by the address information recorded in the data recording region. For example, when the URL, email address, or the like of an operating entity is recorded in the data recording region of the information code 100, the image in the free space 110 (image region) is transmitted to the apparatus (such as the external apparatus 90 or another apparatus accessible by the external apparatus 90) specified by the URL or the email address. The image in the free space 110 (image region) is then stored in a memory unit (such as the memory unit 93 in the external apparatus 90) of the apparatus. Information (such as the receipt number, the number of the credit card used for settlement, or personal information of the user) enabling identification of the receipt Pb is preferably recorded in advance in the data recording region of the information code 100 attached to the receipt Pb. As a result, at the transmission destination, the "information enabling identification of the delivery slip Pa" and the "image in the free space 110 (image region)" can be associated and collected. In addition, when the information code 100 is issued, the date of use and the total amount may be recorded in the data recording region. During reading, the date of use and the total amount may be transmitted to the transmission destination in the address information recorded in the data recording region, in association with the image in the free space 110 (image region) that has been cut out. As a result, the image in the free space 110 (image region) that has been cut out can be stored such as to be tied to the date of use and total amount at the transmission destination.

In the present configuration as well, the control circuit 40 corresponds to an example of the image processing unit. The control circuit 40 functions to transmit to the transmission destination or save to the save-to destination specified by the address information recorded in the data recording region, at least a portion of the image in the image region (image in the free space 110) or analysis data obtained by analysis of the image in the image region. Specifically, the control circuit 40 functions to transmit to a transmission destination or save to a save-to destination specified by the address information recorded in the data recording region, a signature image formed in the image region.

In addition, when the receipt Pb such as that in FIG. 44(B) is read, a person performing the reading operation can input information by operating the operation switch 42 or the like in the reader 10, before, during, or after reading the information code 100 with the reader 10. For example, the operator may operate the operation switch 42 or the like and input the age group, gender, and the like of the credit card user, before reading the information code 100 in FIG. 44(B) with the reader 10. The operator may then read the information code 100 in FIG. 44(B). In this case, a configuration is possible in which the information, such as age group, gender, and the like, inputted by the operation switch 42 is associated with the image in the free space 110 (image region) that has been cut out by reading, and transmitted to the transmission destination or saved to the save-to destination in the address information recorded in the data recording region. As a result, at the transmission destination or save-to destination, the image in the free space 110 (image region) that has been cut out at the time of reading and the information (information such as age group or gender) inputted when reading can be associated and collected. The information can be useful for customer base management and the like.

In this configuration, the operation switch 42 of the reader 10 corresponds to an example of an "information input unit" that enables input of information by operation from outside. The control circuit 40 corresponds to an example of the image processing unit. The control circuit 40 functions to transmit to a transmission destination or save to a save-to destination specified in the address information, the information inputted by the information input unit and the image in the free space 110 (image region) cut out by reading of the information code 100, in association with each other. The information, such as the age group and gender, may be inputted by the operation unit 4 in the producing apparatus 2 during issue of the receipt Pb. In this case, the inputted information, such as age group and gender, may be recorded in the data recording region. Then, when the information code 100 is read, the information can be transmitted to the transmission destination or the save-to destination together with the image in the free space 110 (image region) that has been cut out.

Second Variation Example According to the Tenth Embodiment

A second variation example differs from the representative example according to the tenth embodiment only in terms of the specific content in the free space 10, the specific content of the data recorded in the data recording region, and the object to which the information code 100 is attached. Other basic configurations are similar to those in the representative example. In addition, the hardware configuration is the same as that according to the first embodiment. A configuration such as that shown in FIG. 1 and FIG. 2, described above, is used.

In the example in FIG. 45, the information code 100 is used in registration of personal seal. In this example, the producing apparatus 2 shown in FIG. 1 forms, for example, a personal seal registration form such as to print the information code 100 in which the free space 110 is blank. The information code 100 can be produced by a method similar to that according to the first embodiment or other embodiments. In addition, when the information code 100 is produced, the free space 110 is, for example, a blank region. For example, the stamp seal within is removed from the information code 100 on the upper left in FIG. 45. The free space 110 (image region) provided within the information code 100 is used as a region for attaching the stamp. In the upper left drawing in FIG. 45, only the information code 100 attached to the personal seal registration form is shown as an example. Other configurations of the personal seal registration form (such as the name entry field and the registration number entry field) are omitted.

In the present configuration as well, when the information code producing apparatus 2 produces the information code 100 (specifically, that in which a portion of the information code 100 on the upper left in FIG. 45 is omitted and the free space 110 is blank) shown on the upper left in FIG. 45, address information specifying a transmission destination or save-to destination of the image in the free space 110 (image region) is recorded in the data recording region of the information code 100 as data to be used that is used when the image in the free space 110 (image region) is processed. Specifically, for example, the external apparatus 90 is used as a management server in an entity that manages the stamp of the personal seal (such as a store, a company, or a government office). The IP address, URL, email address (address specifying the authentication apparatus), or the like of the external apparatus 90 is recorded in the data recording region as the address information.

The information code 100 that is configured in this way is used, for example, when a user wishes to register a stamp. The person performing the registration operation (a store clerk, other employees, and the like) presents the person wishing to register with the above-described personal seal registration form (in other words, the form on which the information code 100 having the blank free space 110 is attached). The person performing the registration operation then prompts the person wishing to register to attach the stamp of the personal seal the person wishes to register within the free space 110 in the information code 100, as shown in the upper left drawing in FIG. 45. Then, when the data of the stamp attached to the information code 100 in this way is registered, first, the reader 10 reads the information code 100. The reader 10 interprets the data in the data recording region and cuts out the image in the free space 110 (image region. The reader 10 then transmits to the transmission destination or saves to the save-to destination identified by the address information recorded in the data recording region, the image (image of the stamp) that has been cut out. For example, when the transmission destination or the save-to destination is the external apparatus 90 (an apparatus similar to that in FIG. 43), the reader 10 transmits the image of the stamp to the external apparatus 90. The image of the stamp is then stored in the storage unit 93 of the external apparatus 90. When the image that has been cut out is stored in this way, the image is preferably stored in association with information (such as a registration number or personal information) enabling identification of the stamp (personal seal). When the producing apparatus 2 produces the information code 100, such information is recorded in advance in the data recording region of the information code 100. When the reader 10 reads the information code 100, the reader 10 may tie the information (such as a registration number or personal information) to the image in the free space 110 (image region) that has been cut out, and transmit the information and the image to the transmission destination or save-to destination specified by the address information. As a result of registration such as this being performed, at the external apparatus 90, each stamp seal image is registered in association with the corresponding registration number and personal information (name) as in the bottom drawing in FIG. 45. If the registration number is specified, the corresponding stamp seal image is identified.

In the present configuration as well, the control circuit 40 corresponds to an example of the image processing unit. The control circuit 40 functions to transmit to the transmission destination or save to the save-to destination (specifically, the external apparatus 90 corresponding to an authentication apparatus or another apparatus accessible by the authentication apparatus) specified by the address information recorded in the data recording region, the image in the image region (the image in the free space 110). Specifically, the control circuit 40 functions to transmit to the transmission destination or save to the save-to destination specified by the address information recorded in the data recording region, the stamp seal image formed in the free space 110 (image region).

Next, verification of the personal seal will be described. Image data on various personal seals are stored in the storage unit 93 of the external apparatus 90 in association with the respective registration numbers and personal information, as in the bottom drawing in FIG. 45, by the above-described procedure.

Figure 46:
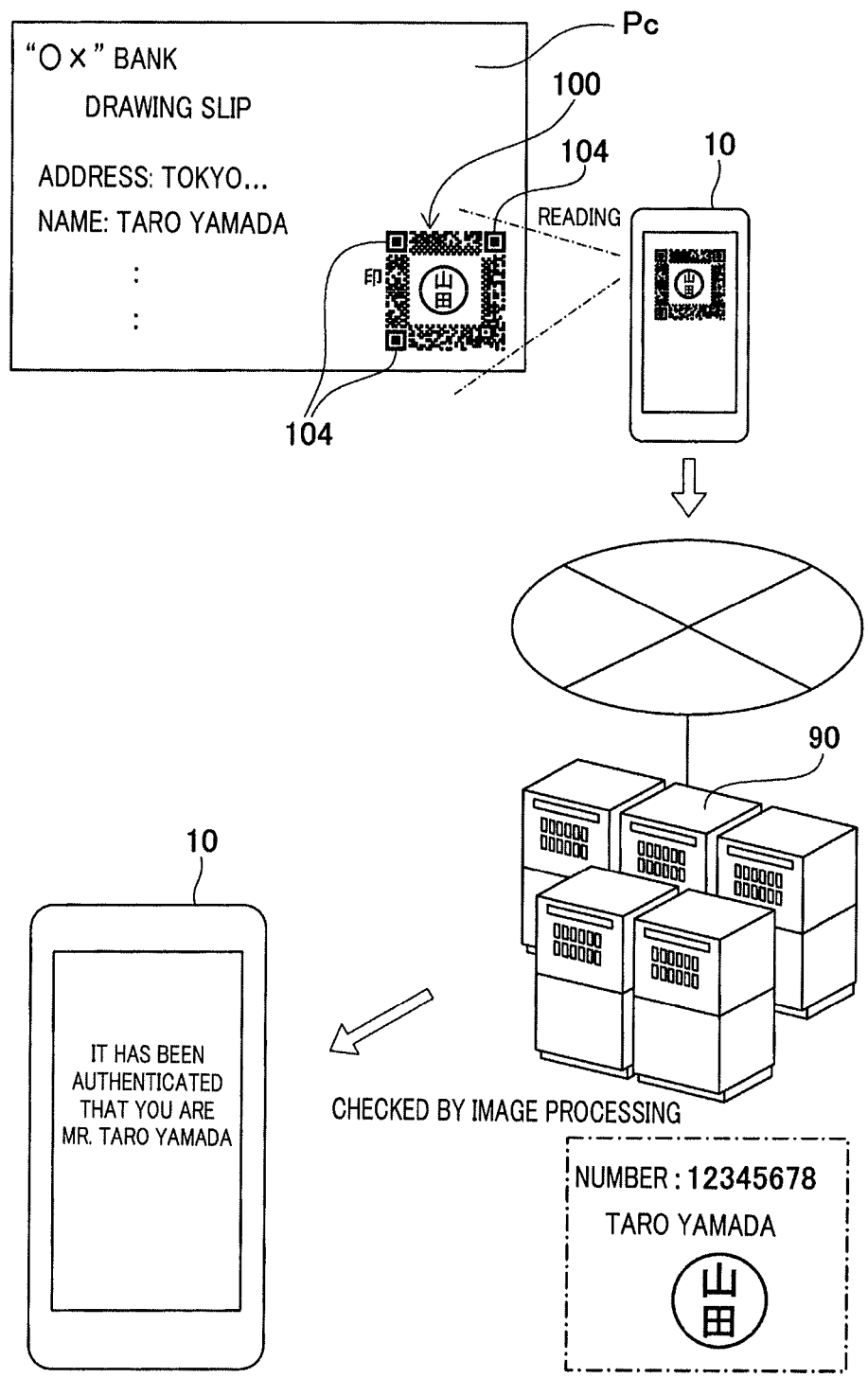
FIG. 46 is an explanatory diagram that conceptually explains authentication of a personal seal in the system which uses an information code in the second variation example according to the tenth embodiment.

Meanwhile, when verification of the personal seal is performed, a person wishing for verification or the like stamps the personal seal to be verified in the free space 110 in the information code 100 printed on a procedure form Pc, such as that in FIG. 46. In the data recording region of the information code 100 attached to the procedure form Pc, for example, the address information specifying the external apparatus 90 (authentication apparatus) is recorded. When the reader 10 reads the information code 100, the reader 10 reads the address information from the data recording region and cuts out the image (stamp image) in the free space 110 (image region). The reader 10 then transmits the stamp image to the external apparatus 90 based on the address information. Then, when the stamp image (stamp seal image) to be verified is transmitted in this way, the external apparatus 90 determines whether or not the stamp seal image recorded in advance as in FIG. 45 and the transmitted stamp seal image match, by a publically known image comparison method. The verification can be performed by, for example, the above-described stamp seal image to be verified that has been transmitted and all stamp seal images registered in the external apparatus 90 being compared by, for example, pattern matching or characteristic point comparison similar to that according to the ninth embodiment. Whether or not an image matching the above-described stamp seal image to be verified that has been transmitted is present among the stamp seal images registered in the external apparatus 90 can be determined. Then, when the transmitted stamp seal image to be verified matches any of the stamp seal images registered in the external apparatus 90, the external apparatus 90 transmits data indicating that the authentication is successful to the transmission-source reader 10. In this case, the registration number, personal information, and the like tied to the successfully authenticated registered stamp seal image are also preferably transmitted. Conversely, when there is no match, the external apparatus 90 transmits data indicating authentication has failed.

In the present configuration, the storage unit 93 of the external apparatus 90 corresponds to an example of a comparison data registering unit. The storage unit 93 is configured such as to register comparison data for comparison with at least a portion of the image in the image region or analysis data obtained by analysis of the image in the image region. In the above-described example, an example is given in which, in registration such as that in FIG. 45, the image in the free space 110 (image region) that has been cut out is registered in the external apparatus 90 as image data. However, rather than registering the image in the free space 110 (image region) itself that has been cut out in this way, data (analysis data) on characteristic points extracted from the image in the free space 110 (image region) may be registered in the external apparatus 90. In this case, the method for extracting the characteristic points from the stamp seal image and the like may be performed in a manner similar to that according to the ninth embodiment. In this case, during verification, the reader 10 extracts data on characteristic points from the stamp seal image to be verified, and transmits the characteristic point data (analysis data) to the external apparatus 90 (authentication apparatus) as transmission data. The external apparatus 90 may then compare the transmitted characteristic point data with the characteristic point data of each stamp seal image registered in the external apparatus 90, and find the stamp seal image of which the characteristic points match.

In the present configuration, the external apparatus 90 corresponds to an example of the authentication apparatus. The external apparatus 90 functions to perform a determination process regarding whether or not the stamp seal image in the free space 110 (image region) to be verified corresponds to a predetermined legitimate image (specifically, the stamp seal image registered in advance to the external apparatus 90), based on the transmission data (such as the data of the stamp seal image transmitted as an object to be verified as in FIG. 46) transmitted by the image processing unit and the comparison data registered in the comparison data registering unit (such as data of a plurality of stamp seal images registered in advance in the external apparatus 90 as in FIG. 45). The external apparatus 90 that functions as the authentication apparatus may be configured by a single apparatus or by a plurality of apparatuses that are capable of performing data communication among one another.

Here, an example is given of personal seal verification performed at banks and the like. However, the invention can also be used for registered seal verification related to real estate transactions and the like.

Third Variation Example According to the Tenth Embodiment

A third variation example according to the tenth embodiment differs from the representative example according to the tenth embodiment only in terms of the specific content in the free space 10, the specific content of the data recorded in the data recording region, and the object to which the information code 100 is attached. Other basic configurations are similar to those of the representative example. In addition, the hardware configuration is the same as that according to the first embodiment. A configuration such as that shown in FIG. 1 and FIG. 2, described above, is used.

In the example in FIG. 47, the information code 100 is used for fingerprint registration. In this example, the free space 110 (image region) provided within the information code 100 is a region for attaching a fingerprint. In this example, the producing apparatus 2 in FIG. 1 forms, for example, a fingerprint registration form such as to print the information code 100 in which the free space 110 is blank. The information code 100 can be produced by a method similar to that according to the first embodiment or other embodiments. In addition, when the information code 100 is produced, the free space 110 is, for example, a blank region. For example, the fingerprint image F within is removed from the information code 100 on the upper left in FIG. 47. The free space 110 (image region) provided within the information code 100 is used as a region for attaching the fingerprint. In the upper left drawing in FIG. 47, only the information code 100 attached to the fingerprint registration form is shown as an example. Other configurations of the fingerprint registration form (such as the name entry field and the registration number entry field) are omitted.

In the present configuration as well, when the information code producing apparatus 2 produces the information code 100 (specifically, that in which a portion of the information code 100 on the upper left in FIG. 47 is omitted and the free space 110 is blank) shown on the upper left in FIG. 47, address information specifying a transmission destination or save-to destination of the image in the free space 110 (image region) is recorded in the data recording region of the information code 100 as data to be used that is used when the image in the free space 110 (image region) is processed. Specifically, for example, the external apparatus 90 is used as a management server in an entity that manages the fingerprint (such as a store, a company, or a government office). The IP address, URL, email address (address specifying the authentication apparatus), or the like of the external apparatus 90 is recorded in the data recording region as the address information.

The information code 100 that is configured in this way is used, for example, when a user wishes to register a fingerprint. The person performing the registration operation (a store clerk, other employees, and the like) presents the person wishing to register with the above-described fingerprint registration form (in other words, the form on which the information code 100 having the blank free space 110 is attached). The person performing the registration operation then prompts the person wishing to register to attach the fingerprint the person wishes to register within the free space 110 in the information code 100, as shown in the upper left drawing in FIG. 47. Then, when the data of the fingerprint attached to the information code 100 in this way is registered, first, the reader 10 reads the information code 100. The reader 10 interprets the data in the data recording region and cuts out the image in the free space 110 (image region). The reader 10 then transmits to the transmission destination or saves to the save-to destination identified by the address information recorded in the data recording region, the image (image of the fingerprint) that has been cut out. For example, when the transmission destination or the save-to destination is the external apparatus 90 (an apparatus similar to that in FIG. 43), the reader 10 transmits the image of the fingerprint cut out from the information code 100 to the external apparatus 90. The image of the fingerprint is then stored in the storage unit 93 of the external apparatus 90. When the image that has been cut out is stored in this way, the image is preferably stored in association with information (such as a registration number or personal information) enabling identification of the fingerprint. When the producing apparatus 2 produces the information code 100, such information is recorded in advance in the data recording region of the information code 100. When the reader 10 reads the information code 100, the reader 10 may tie the information (such as a registration number or personal information) to the image (image of the fingerprint) in the free space 110 (image region) that has been cut out, and transmit the information and the image to the transmission destination or save-to destination specified by the address information. As a result of registration such as this being performed, at the external apparatus 90, each fingerprint image is registered in association with the corresponding registration number and personal information (name) as in the bottom drawing in FIG. 47. If the registration number is specified, the corresponding fingerprint image is identified.

In the present configuration as well, the control circuit 40 corresponds to an example of the image processing unit. The control circuit 40 functions to transmit to the transmission destination or save to the save-to destination specified by the address information recorded in the data recording region, at least a portion of the image in the image region (the image in the free space 110) or analysis data obtained by analysis of the image in the image region. Specifically, the control circuit 40 functions to transmit to the transmission destination or save to the save-to destination specified by the address information recorded in the data recording region, the fingerprint image formed in the free space 110 (image region).

Next, verification of the fingerprint will be described. Image data on various fingerprints are stored in the storage unit 93 of the external apparatus 90 in association with the respective registration numbers and personal information, as in the bottom drawing in FIG. 47, by the above-described procedure.

Figure 48:
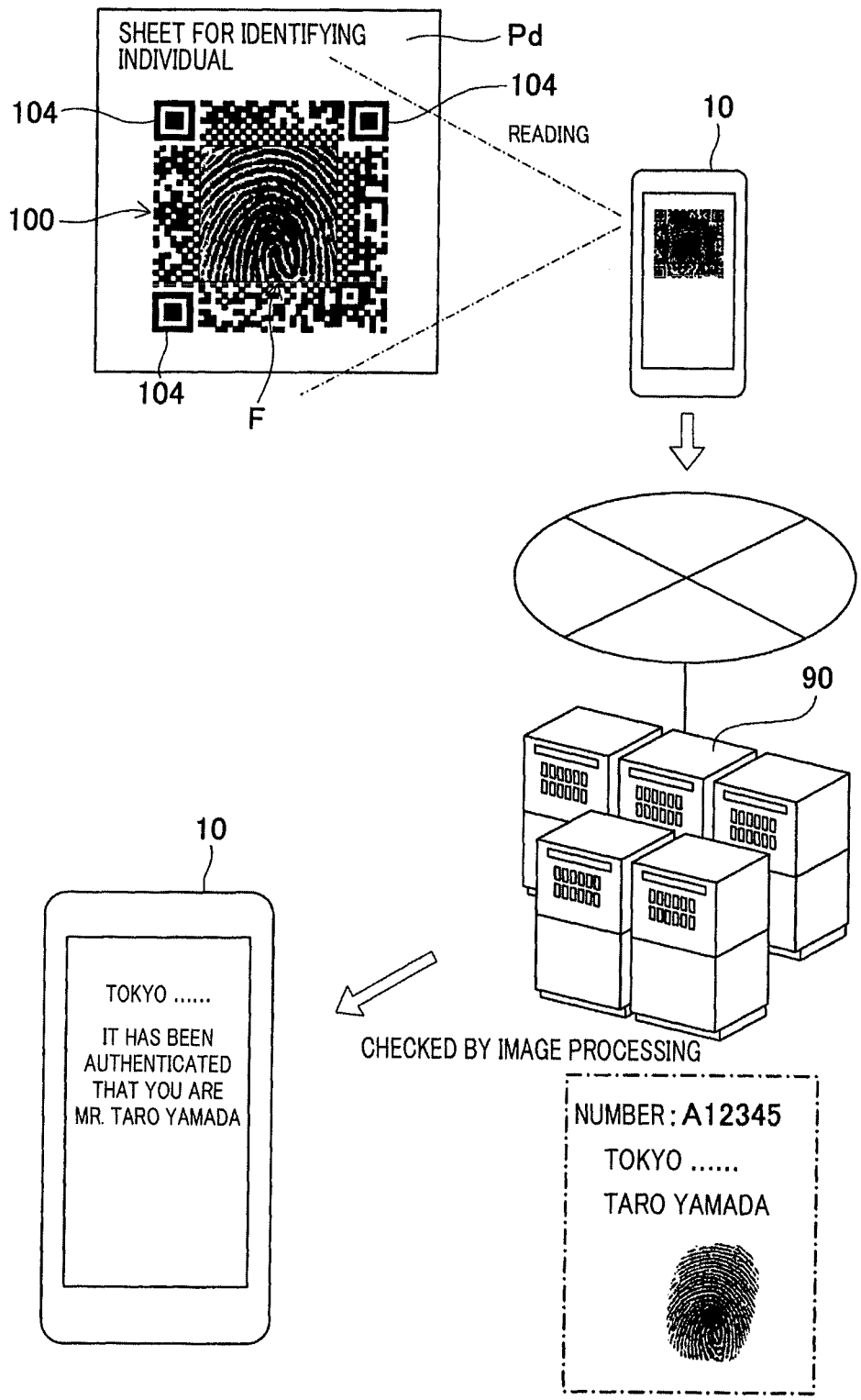
FIG. 48 is an explanatory diagram that conceptually explains verification of a fingerprint in the system which uses an information code in the third variation example according to the tenth embodiment.

Meanwhile, when verification of the fingerprint is performed, a person wishing for verification or the like attaches his or her own fingerprint to be verified in the free space 110 in the information code 100 printed on a procedure form Pd, such as that in FIG. 48. In the data recording region of the information code 100 attached to the procedure form Pd, for example, the address information specifying the external apparatus 90 (authentication apparatus) is recorded. When the reader 10 reads the information code 100, the reader 10 reads the address information from the data recording region and cuts out the image (fingerprint image) in the free space 110 (image region). The reader 10 then transmits the fingerprint image to the external apparatus 90 based on the address information. Then, when the fingerprint image to be verified is transmitted in this way, the external apparatus 90 determines whether or not the fingerprint image recorded in advance as in FIG. 47 and the transmitted fingerprint image match, by a publically known image comparison method. The verification can be performed by, for example, the above-described fingerprint image to be verified that has been transmitted and all fingerprint images registered in the external apparatus 90 being compared by, for example, pattern matching or characteristic point comparison (minutia method) similar to that according to the ninth embodiment. Whether or not an image matching the above-described fingerprint image to be verified that has been transmitted is present among the fingerprint images registered in the external apparatus 90 can be determined. Then, when the transmitted fingerprint image to be verified matches any of the fingerprint images registered in the external apparatus 90, the external apparatus 90 transmits data indicating that the authentication is successful to the transmission-source reader 10. In this case, the registration number, personal information, and the like tied to the successfully authenticated registered fingerprint image are also preferably transmitted. Conversely, when there is no match, the external apparatus 90 transmits data indicating authentication has failed.

In the present configuration, the storage unit 93 of the external apparatus 90 corresponds to an example of a verification data registering unit. The storage unit 93 is configured such as to register a plurality of pieces of verification data in association with respective personal information, for comparison with at least a portion of the image in the free space 110 (image region) or analysis data obtained by analysis of the image in the image region.

In addition, the external apparatus 90 corresponds to an example of a verification apparatus. The external apparatus 90 functions to extract personal information corresponding to transmission data based on the transmission data (the fingerprint image to be verified) transmitted by the image processing unit and the plurality of pieces of verification data (such as a plurality of registered fingerprint images) registered in the verification data registering unit. In the above-described example, an example is given in which, in registration such as that in FIG. 47, the image in the free space 110 (image region) that has been cut out is registered in the external apparatus 90 as image data. However, rather than registering the image in the free space 110 (image region) itself that has been cut out in this way, data (analysis data) on characteristic points extracted from the image in the free space 110 (image region) may be registered in the external apparatus 90. In this case, the method for extracting the characteristic points from the fingerprint image and the like may be performed in a manner similar to that according to the ninth embodiment. In this case, during verification, the reader 10 extracts data on characteristic points from the fingerprint image to be verified, and transmits the characteristic point data (analysis data) to the external apparatus 90 (authentication apparatus) as transmission data. The external apparatus 90 may then compare the transmitted characteristic point data with the characteristic point data of each fingerprint image registered in the external apparatus 90, and find the fingerprint image of which the characteristic points match.

In the information code used in the representative example and variation examples according to the tenth embodiment, configurations according to the other embodiments described above and hereafter may be used in sections other than the free space. In a configuration such as this as well, if address information similar to that in the representative example or a variation example according to the tenth embodiment, described above, is recorded within the data recording region, the image in the free space can be used in a manner similar to that the representative example and variation examples according to the tenth embodiment.

In addition, in the information code used in the representative example and variation examples according to the tenth embodiment, the configuration of the free space (image region) may be that according to the other embodiments described above and hereafter. In a configuration such as this as well, if the address information is recorded within the data recording region, at least a portion of the image in the free space (image region) or analysis data (such as characteristic point data in which characteristic points are extracted from the image in the free space (image region) by a method similar to that according to the ninth embodiment, or character data in which a character is extracted from the image in the free space (image region)) obtained by analysis of the image in the free space (image region) can be transmitted to the transmission destination or saved in the save-to destination specified by the address information recorded in the data recording region. Alternatively, an authentication result of authentication performed on the image in the free space using the data recorded in the data recording region, an authentication result of authentication performed on the image in the free space using data recorded in the reader, and the like may be transmitted to the transmission destination or saved in the save-to destination specified by the address information.

Eleventh Embodiment

Figure 49:
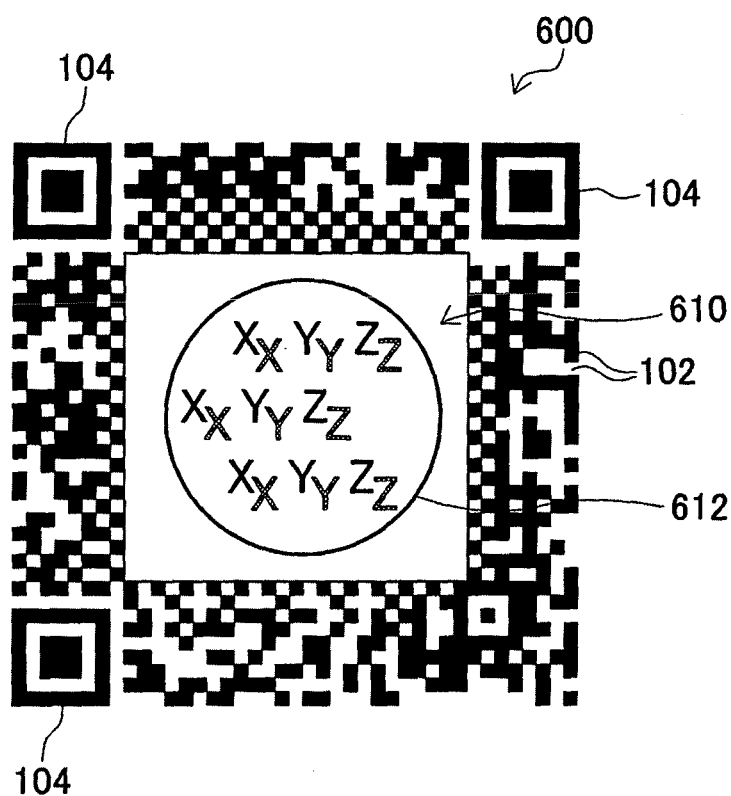
FIG. 49(A) is an explanatory diagram that explains an information code used in a system which uses an information code according to an eleventh embodiment.
FIG. 49(B) is an explanatory diagram that explains an example of data recorded in the data recording region of the information code.

Next, an eleventh embodiment will be described. First, a representative example according to the eleventh embodiment will be described with reference to FIG. 49 to FIG. 51.

A system which uses an information code 1 according to the eleventh embodiment is also identical to that according to the first embodiment in terms of hardware. A configuration such as that in FIG. 1 and FIG. 2, described above, is used. The producing apparatus 2 such as that in FIG. 1 produces an information code 600 (information code in which cells serving as units for displaying information are arranged within a predetermined code area) such as that in FIG. 49(A). The method for producing the information code 600 by the producing apparatus 2 is identical to that according to the first embodiment, other than the specific content in the free space.

The information code 600 produced by the producing apparatus 2 in this way differs from the information code 100 according to the first embodiment only in terms of the content in a free space 610. The information code 600 includes all characteristics of the information code 100 according to the first embodiment, other than the image in the free space 610.

Here, the information code 600 will be described. The information code 600 processed in the present system 1 is also provided with the specification pattern regions in which specification patterns each having a shape determined advance (the regions in which the position detecting patterns 104, the timing pattern (timing cells) 106, and the alignment pattern 108 are arranged, similar to that in FIG. 1) are arranged, the data recording region in which data is recorded by cells 102 of a plurality of types, and the error correction code recording region in which error correction codes are recorded by cells 102 of a plurality of types, within the code region. An image region that shows an image differing from the cells 102 is configured such as to be presented within the code region as an area wider than the size of a single cell 102. In the example in FIG. 49(A), the overall free space 610 is configured as the image region. For example, as in FIG. 49(A), an image differing from the cell 102 is presented within the free space 610. The free space 610 is a region in which at least either data recording or design display is possible by a method differing from the method for recording data in the data recording region. The free space 610 has a size that is larger than the size of a single cell 102.

Figure 51:
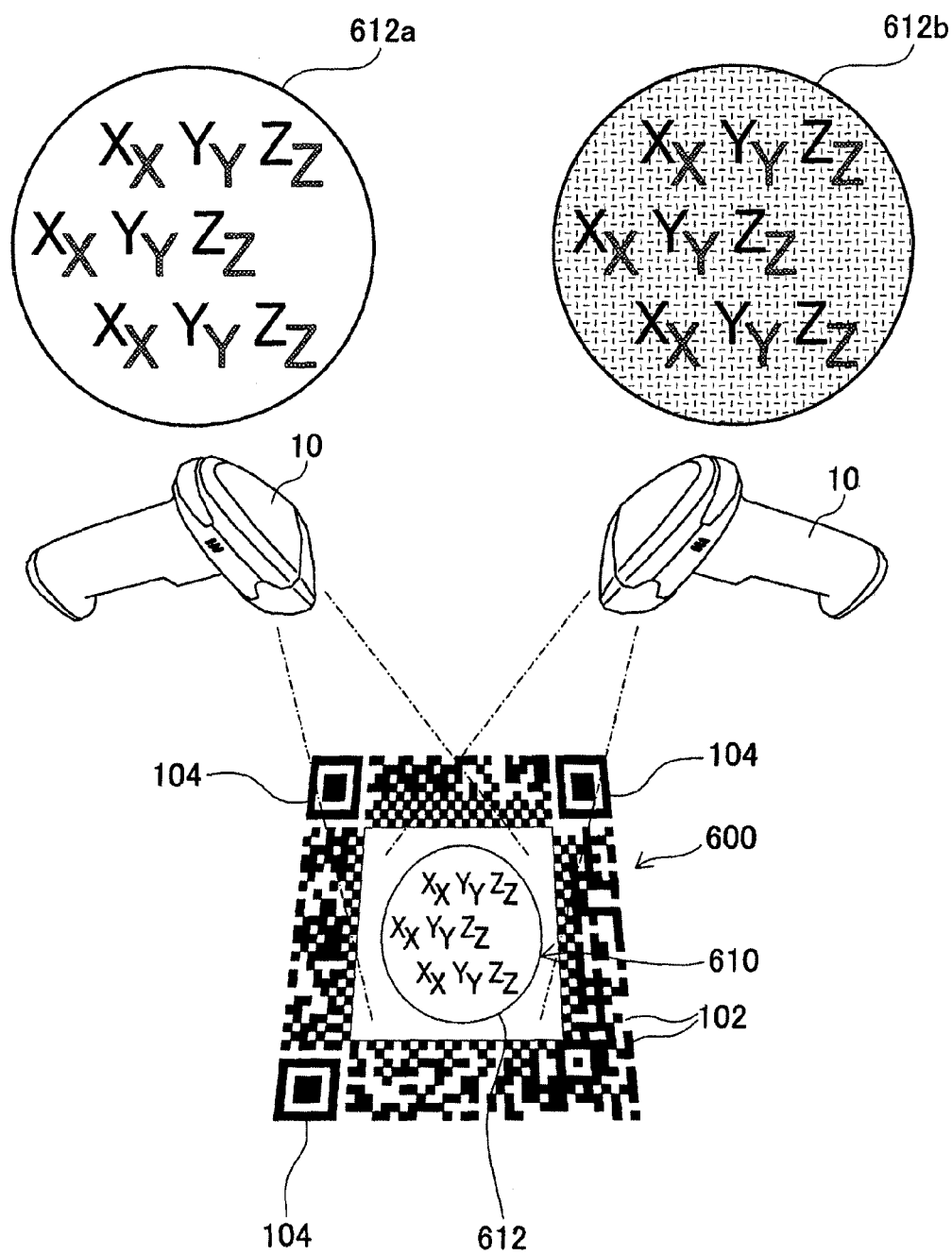
FIG. 51 is an explanatory diagram that explains reading in the system which uses an information code according to the eleventh embodiment.

In the information code 600, a hologram portion 612 is arranged in the free space 610 (image region). As shown in FIG. 51, the holograph portion 612 is configured such that a first captured image 612a that is obtained by the imaging unit when the reader 10 captures an image from a predetermined first direction and a second captured image 612b that is obtained by the imaging unit when the reader 10 captures an image from a predetermined second direction differ.

Information such as that in FIG. 49(B) is recorded in the data recording region of the information code 600. Here, as unencrypted disclosed data, information such as item name, item number, price, and packing lot is recorded. In addition, as encrypted undisclosed data, specific ID (such as a serial number), shop information, and the like are recorded.

Figure 50:
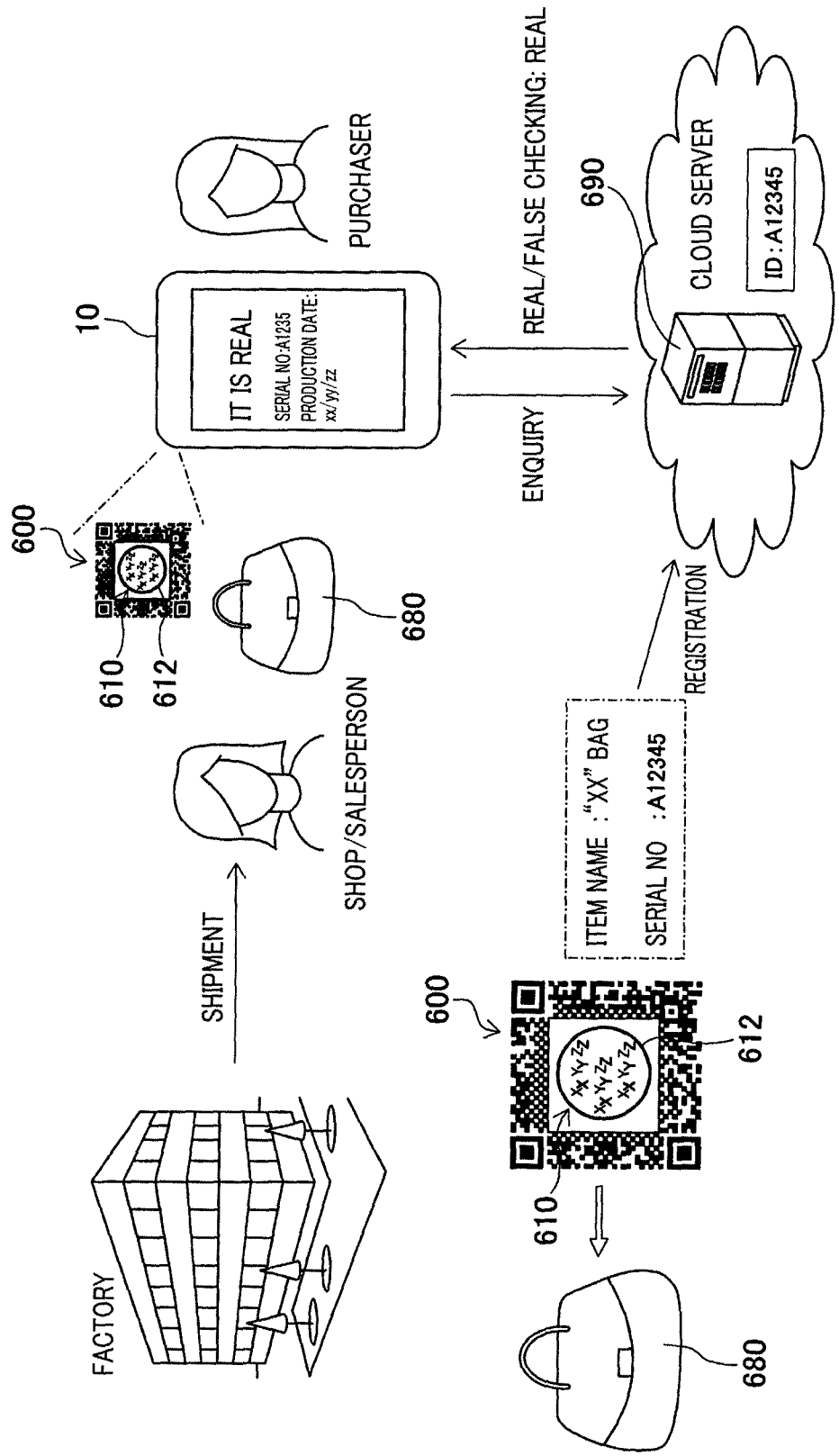
FIG. 50 is an explanatory diagram that conceptually explains an application example of the system which uses an information code according to the eleventh embodiment.

The information code 600 such as this can be used, for example, in an example such as that in FIG. 50. In the example in FIG. 50, the above-described information code 600 is adhered, directly or by an item tag or the like, to a legitimate item 680 that is manufactured in a factory. The item name, serial number, and the like are recorded in the data recording region of the information code 600. The hologram portion 612 corresponding to the serial number is attached to the free space 610 (image region) within the code region. Before the item is shipped, the content of the information code 600 is registered in a server 690. Specifically, the item name and serial number recorded in the information code 600, and an image of the hologram portion 612 are associated and stored in a storage unit of the server 690 (see bottom drawing in FIG. 50).

Meanwhile, when the item 680 is sold in a shop or the like after shipping, or when a checking operation, inventory check, or the like is performed, the reader 10 (FIG. 1, FIG. 2, and the like) reads the information code 600 attached to the item 680. At this time, the item name and the like recorded in the data recording region of the information code 600 are displayed. Therefore, the worker can ascertain whether or not the recorded content (item name) in the information code 600 matches the item 600. Furthermore, as a result of authentication of the information code 600 being performed by the reader 10, whether a legitimate information code is attached can be ascertained.

Next, reading and authentication of the information code 600 will be described in further detail. First, when the reader 10 reads and authenticates the information code 600, the light receiving sensor 23 (imaging unit) of the reader 10 obtains the first captured image of when the information code 600 is captured from a predetermined first direction and the second captured image of when the information code 600 is captured from a predetermined second direction. In the present configuration, for example, as in the reader 10 on the left side in FIG. 51, a first captured image 612*a* of the hologram portion 612 from the first direction is obtained. The first direction is set to a direction enabling a captured image to be obtained in which, of the three position detecting patterns 104, one position detecting pattern 104 is at the upper left of the code region, and two position detecting patterns 104 are at the lower left and lower right of the code region, and a direction in which imaging is performed from an obliquely bottom side, with the side of the two position detecting patterns 104 as the bottom side (an imaging direction in which the three position detecting patterns 104 are in a predetermined first arrangement in the captured image). In addition, a second captured image 612*b* of the hologram portion 612 from the second direction is obtained. The second direction is set to a direction enabling a captured image to be obtained in which, of the three position detecting patterns 104, two position detecting patterns 104 are at the upper left and upper right of the code region and one position detecting pattern 104 is at the lower right, and a direction in which imaging is performed from an obliquely bottom side, with the side of the one position detecting pattern 104 as the bottom side (an imaging direction in which the three position detecting patterns 104 are in a predetermined second arrangement in the captured image). The reader 10 obtains the item name, serial number, and the like recorded in the data recording region, and transmits the first captured image 612*a* and the second captured image 612*b*, together with the obtained information, to the server 690.

A legitimate image of the hologram portion 612 from the first direction and a legitimate image thereof from the second direction are registered in advance in the server 690, in association with the item name and serial number. Therefore, the legitimate images can be compared with the transmitted first captured image 612*a* and second captured image 612*b* by publically known pattern matching or the like. As a result, whether or not the transmitted first captured image 612*a* and second captured image 612*b* are images that have been registered in the server 690 in advance can be determined. When the images of the hologram portion transmitted from the reader 10 are the legitimate images from the first direction and the second direction corresponding to the serial number, information indicating that the authentication is successful is transmitted to the reader 10.

In the present configuration, the control circuit 40 of the reader 10 shown in FIG. 2 corresponds to an example of the image processing unit. The control circuit 40 functions to perform authentication of the hologram portion 612 based on the predetermined first captured image and second captured image.

In this configuration, the information code 600 including the hologram portion 612 that is capable of generating at least two types of images can be used as a medium for authentication. The reader 10 attempts to obtain the two types of images from the hologram portion and can perform authentication based on the obtained results. Therefore, whether or not the hologram is legitimate can be more easily determined with accuracy.

In particular, conventional mechanical authentication of holograms require an elaborate, dedicated apparatus. However, in the present configuration, reading positions and angles can be easily determined based on the specification patterns and the like configuring the information code, as a result of the hologram being adhered to the code. Mechanical authentication of holograms can be performed using general purpose equipment such as a hand-held scanner or a mobile phone.

In addition, adhering operation and management of information codes and holograms, which where separately managed in the past, can be integrated, and work efficiency can be improved. In addition, association between the information code and hologram can be more easily and accurately performed.

In addition, in the present configuration, a person can easily visually confirm the hologram portion 612, and visual confirmation can be used in combination with the above-described mechanical confirmation.

A unique ID may be recorded in the data recording region. A unique hologram corresponding to the unique ID may be arranged in the hologram portion 612. In this way, if a hologram/light reflective material that differs for each information code is adhered, the content thereof is registered in a server, and individual authentication of the hologram is performed during reading, higher anti-counterfeiting effect can be achieved.

First Variation Example According to the Eleventh Embodiment

Next, a first variation example according to the eleventh embodiment will be described with reference to FIG. 52.

The first variation example differs from the representative example according to the eleventh embodiment only in terms of the specific content of the hologram portion 612. Other aspects are similar to those of the representative example according to the eleventh embodiment.

The information code 600 in the first variation example is identical to that in the representative example, other than the hologram portion 612. The information code 600 includes all characteristics of that in the representative example. Additional characteristics are added to the hologram portion 612. In addition, the reading method and authentication method of the information code 600 is identical to that in the representative example. The use of an optical filter 620 during reading is the only addition.

Figure 52:
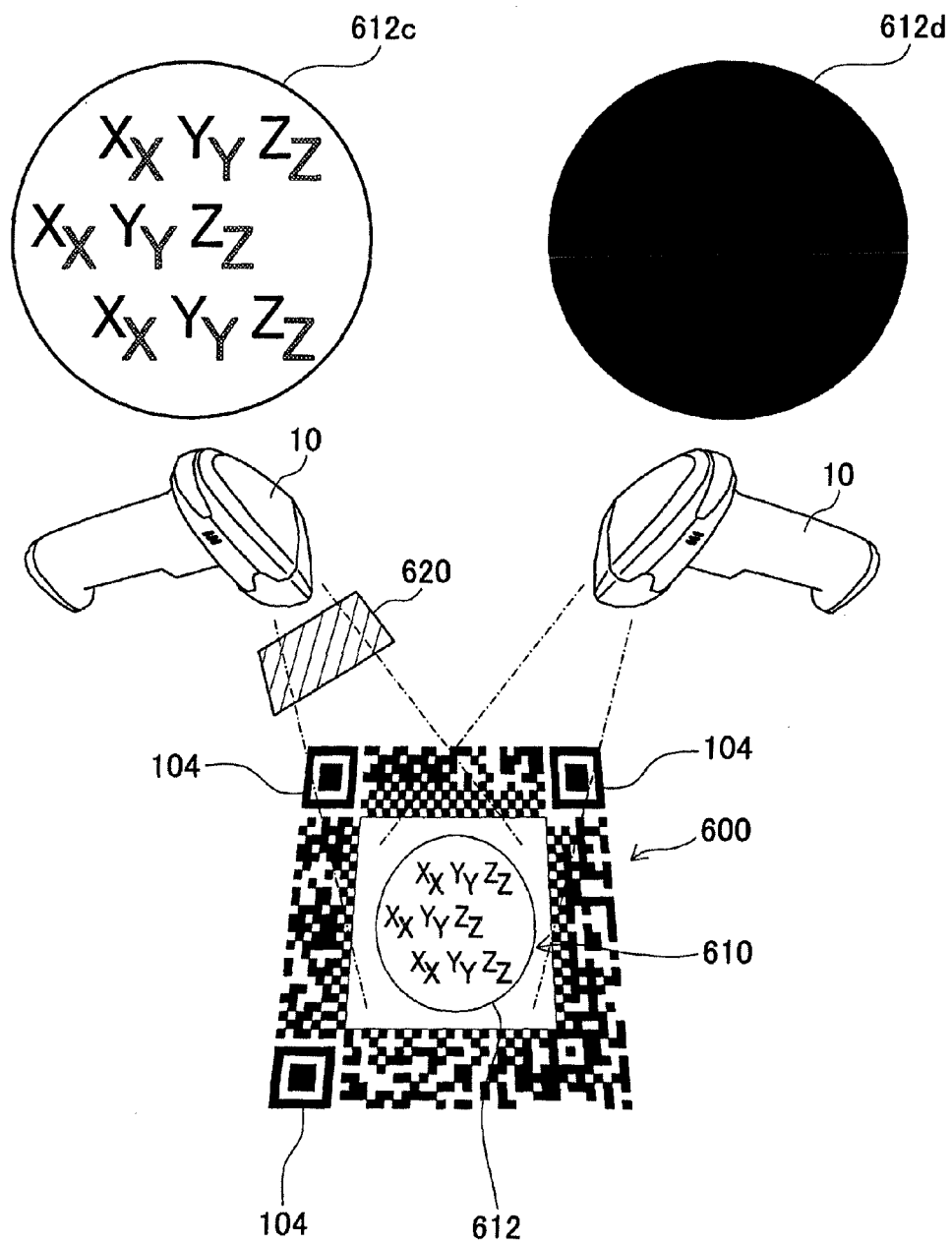
FIG. 52 is an explanatory diagram that explains reading in a system which uses an information code related to a first variation example according to the eleventh embodiment.

In the information code 600 in FIG. 52, the hologram portion 612 in which an image captured through an optical filter 620 that transmits light having a predetermined wavelength band and an image captured without the optical filter 620 differ is arranged in the free space 610 (image region). The optical filter 620 may be, for example, a filter that transmits only infrared light or a filter that transmits only ultraviolet light. Alternatively, the optical filter 620 may be that which transmits a predetermined wavelength band in the visible light range, and significantly reduces transmittance of wavelength bands other than the predetermined wavelength band.

In an example such as this, when authentication of the information code 600 is performed, the light receiving sensor 23 (imaging unit) of the information code reader 10 captures an image of the information code 600 through the optical filter 620. The process is identical to that in the representative example other than the use of the optical filter 620. The reader 10 obtains the first captured image in which the information code 600 is captured from the predetermined first direction and the second captured image in which the information code 600 is captured from the predetermined second direction. Authentication is then performed in a manner similar to that in the representative example.

In the present configuration, the control circuit 40 in the reader 10 in FIG. 2 corresponds to an example of the image processing unit. The control circuit 40 functions to perform authentication of the hologram portion 612 based on the imaging results of the information code 600 captured through the optical filter 620.

In the present configuration, the information code having the characteristic hologram portion that generates a predetermined image when captured through an optical filter can be used as a medium for authentication. The reader can attempt to obtain the predetermined image from the captured image obtained through the optical filter, and perform authentication based on the obtained results. Therefore, whether or not the hologram is legitimate can be more easily and accurately determined.

Second Variation Example According to the Eleventh Embodiment

Next, a second variation example according to the eleventh embodiment will be described with reference to FIG. 53.

The second variation example differs from the representative example according to the eleventh embodiment only in terms of the specific content of the hologram portion 612. Other aspects are similar to those of the representative example according to the eleventh embodiment.

The information code 600 in the second variation example is identical to that in the representative example, other than the hologram portion 612. The information code 600 includes all characteristics of that in the representative example. Additional characteristics are added to the hologram portion 612. In addition, the reading method and authentication method of the information code 600 is identical to that in the representative example. Capturing an image of the hologram portion 612 by a specific imaging method is the only addition.

The information code 600 in FIG. 53(A) is configured such at a special display portion 630 is provided within the free space 610 (image region). In the special display portion 630, when imaging is performed by a predetermined imaging method determined in advance, a predetermined display such as the captured image 600' in FIG. 53(B) appears. The predetermined display does not appear when imaging is performed by a method differing from the predetermined imaging method. In FIG. 53(B), the image of the hologram portion 612 is omitted. The predetermined imaging method for making the predetermined display appear is, for example, a method in which the light receiving sensor 23 (imaging unit) captures an image of the information code 600 while irradiating with infrared light or ultraviolet light. In this case, a predetermined pattern 630 (special display portion) may be recorded in advance in the free space 610 (image region) using infrared light emitting ink (ink that is invisible in a normal environment in which visible light is irradiated and emits light in an environment in which infrared light is irradiated), ultraviolet light emitting ink (ink that is invisible in a normal environment in which visible light is irradiated and emits light in an environment in which ultraviolet light is irradiated), or the like. As a result, in normal imaging in which an image is captured while irradiating visible light, the special pattern 630 does not appear. In addition, a publically known special imaging method may be used in which a pattern 630 (special display portion) composed of a fibrous medium (a medium that is invisible or difficult to see in a normal environment) is included in a paper medium or the like serving as the base of the free space 610, and imaging is performed such that the pattern 630 (special display portion) such as this appears within the image.

In an example such as this, when authentication of the information code 600 is performed, the imaging unit of the information code reader 10 captures an image of the information code 600 by the above-described predetermined imaging method. The process is identical to that in the representative example, other than the imaging method. The reader 10 obtains the first captured image in which the information code 600 is captured from the predetermined first direction and the second captured image in which the information code 600 is captured from the predetermined second direction. Authentication is then performed in a manner similar to that in the representative example. In this case, when authentication is performed using a method similar to that in the representative example, a determination that authentication is successful can be made under conditions that matching of the hologram images is confirmed and display of the pattern 630 is confirmed.

In the present configuration, the control circuit 40 in the reader 10 in FIG. 2 corresponds to an example of the image processing unit. The control circuit 40 functions to perform authentication of the hologram portion 612 based on the imaging results of the information code captured by a predetermined imaging method.

In the present configuration, an information code having a special display portion in which a predetermined display appears when imaging is performed by a predetermined imaging method determined in advance and the predetermined display does not appear when imaging is performed by a method other than the predetermined imaging method can be used as a medium for authentication. The reader can attempt to confirm the predetermined display in the special display portion in the captured image when imaging is performed by the predetermined imaging method, and perform authentication based on the obtained results. Therefore, whether or not the hologram is legitimate can be more easily and accurately determined.

Twelfth Embodiment

Next, a twelfth embodiment will be described.

A system which uses an information code 1 according to the eleventh embodiment is also identical to that according to the first embodiment in terms of hardware. A configuration such as that in FIG. 1 and FIG. 2, described above, is used. The producing apparatus 2 such as that in FIG. 1 produces an information code 700 (information code in which cells serving as units for displaying information are arranged within a predetermined code area) such as that in FIG. 54. The method for producing the information code 700 by the producing apparatus 2 is identical to that according to the first embodiment, other than the specific content in the free space 710.

The information code 700 produced by the producing apparatus 2 in this way differs from the information code 100 according to the first embodiment only in terms of the content in the free space 710. The information code 700 includes all characteristics of the information code 100 according to the first embodiment, other than the image in the free space 710.

Figure 54:
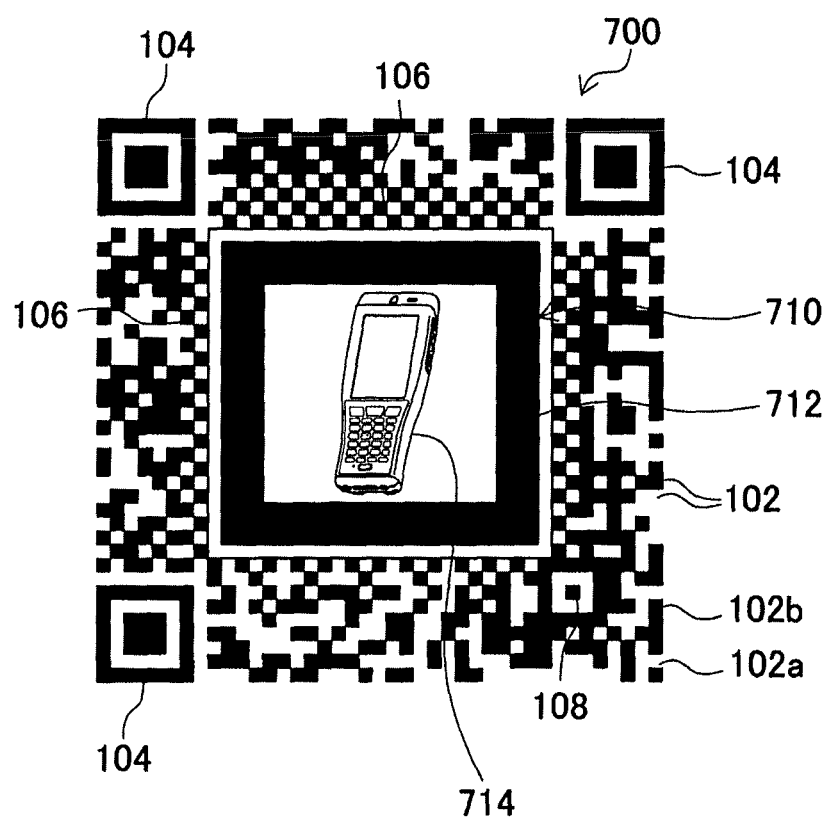
FIG. 54 is an explanatory diagram that explains an information code used in a system which uses an information code according to a twelfth embodiment.

As shown in FIG. 54, the information code 700 processed in the present system 1 is also provided with the specification pattern regions in which specification patterns each having a shape determined advance (the regions in which the position detecting patterns 104, the timing pattern (timing cells) 106, and the alignment pattern 108 are arranged, similar to that in FIG. 1) are arranged, the data recording region in which data is recorded by cells 102 of a plurality of types, and the error correction code recording region in which error correction codes are recorded by cells 102 of a plurality of types, within the code region. An image region that shows an image differing from the cells 102 is configured such as to be presented within the code region as an area wider than the size of a single cell 102. In the example in FIG. 54, the overall free space 710 is configured as the image region. For example, as in FIG. 54, an image differing from the cell 102 is presented within the free space 510. The free space 710 is a region in which at least either data recording or design display is possible by a method differing from the method for recording data in the data recording region. The free space 710 has a size that is larger than the size of a single cell 102.

As shown in FIG. 54, the information code 700 is configured such that a reference graphical form (augmented reality marker 712) having a predetermined shape is arranged in the free space 710 (image region). The augmented reality marker 712 is, for example, arranged along the outer edge of the free space 710 and is configured as a dark colored (such as black) quadrangular frame (a square frame or an oblong frame). The frame width is greater than the width of a cell.

In addition, related content indicating at least either an image or information corresponding to the augmented reality image of a display candidate is displayed in a position other than the region in which the reality marker is displayed. In the example in FIG. 54, an image 714 of an item that is the same as an augmented reality image of a display candidate is indicated within the augmented reality marker 712 (AR marker) configured as a quadrangular frame. The item to be superimposed-displayed as an augmented reality image can be visually ascertained from the content of the code.

Address information (such as a URL) corresponding to a management apparatus 790 in which augmented reality images are collected is recorded in the data recording region of the information code. In the present configuration, the reader 10 configured as an information terminal and the management apparatus 790 (server) are capable of communication via the Internet, wireless LAN, other communication networks, and the like. The reader 10 can identify the address of the management apparatus 790 (server) by reading the address information (such as a URL) from the data recording region in the information code 700. As a result, the reader 10 can transmit and receive information to and from the management apparatus 790 (server).

In addition, specification information specifying the augmented reality image to be displayed is recorded in the data recording region of the information code 700. For example, in the management apparatus 790 (server), a plurality of candidate images serving as the augmented reality images are each tied with corresponding identification information and registered. When the identification information is specified, the candidate image corresponding to the identification information can be read as the augmented reality image. Any of the identification information tied to the plurality of candidate images is recorded in the data recording region of the information code 700 as the specification information. As a result, the augmented reality image to be superimposed-displayed is identified.

Figure 55:
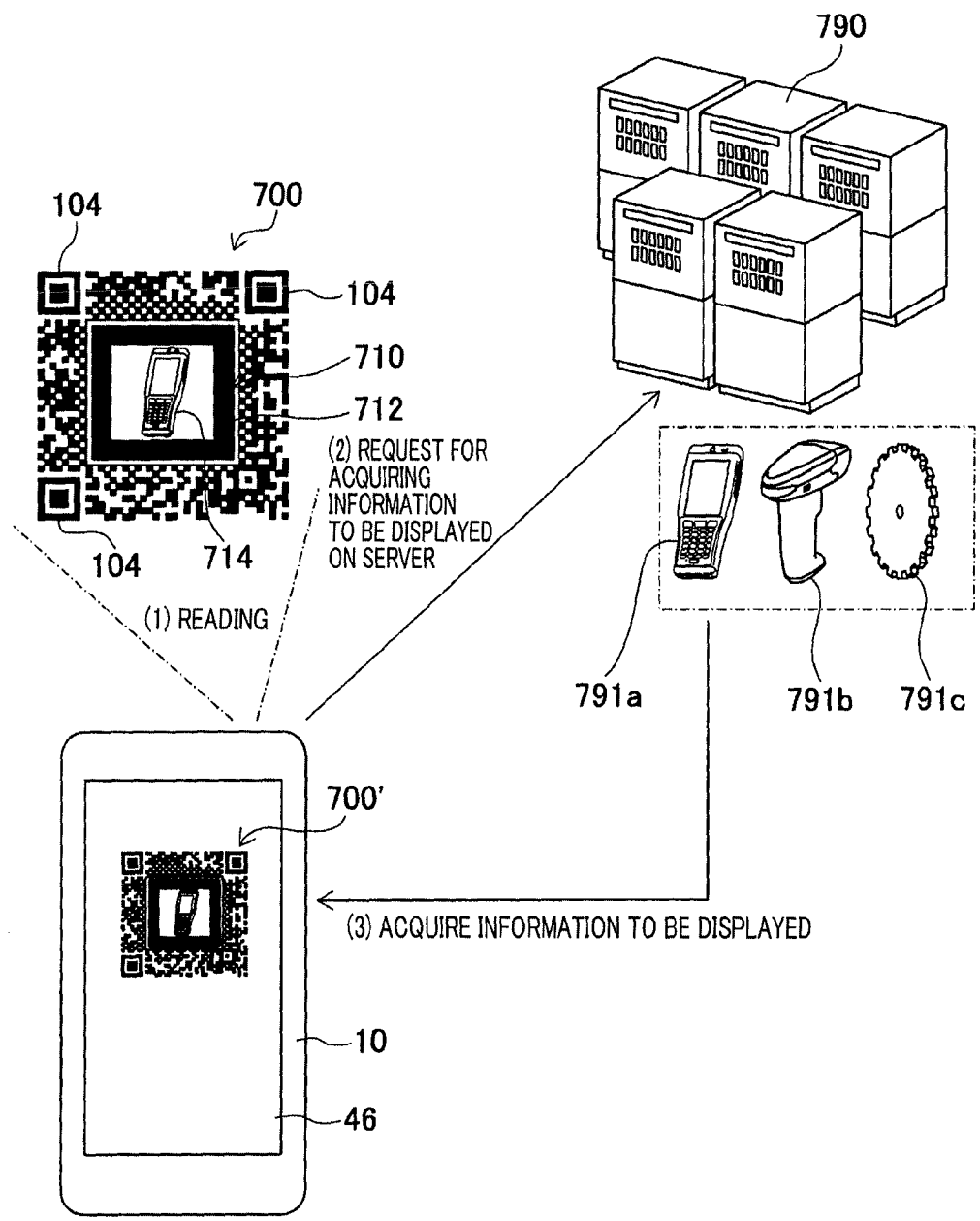
FIG. 55 is an explanatory diagram that conceptually explains an application example of the system which uses an information code according to the twelfth embodiment.
Figure 56:
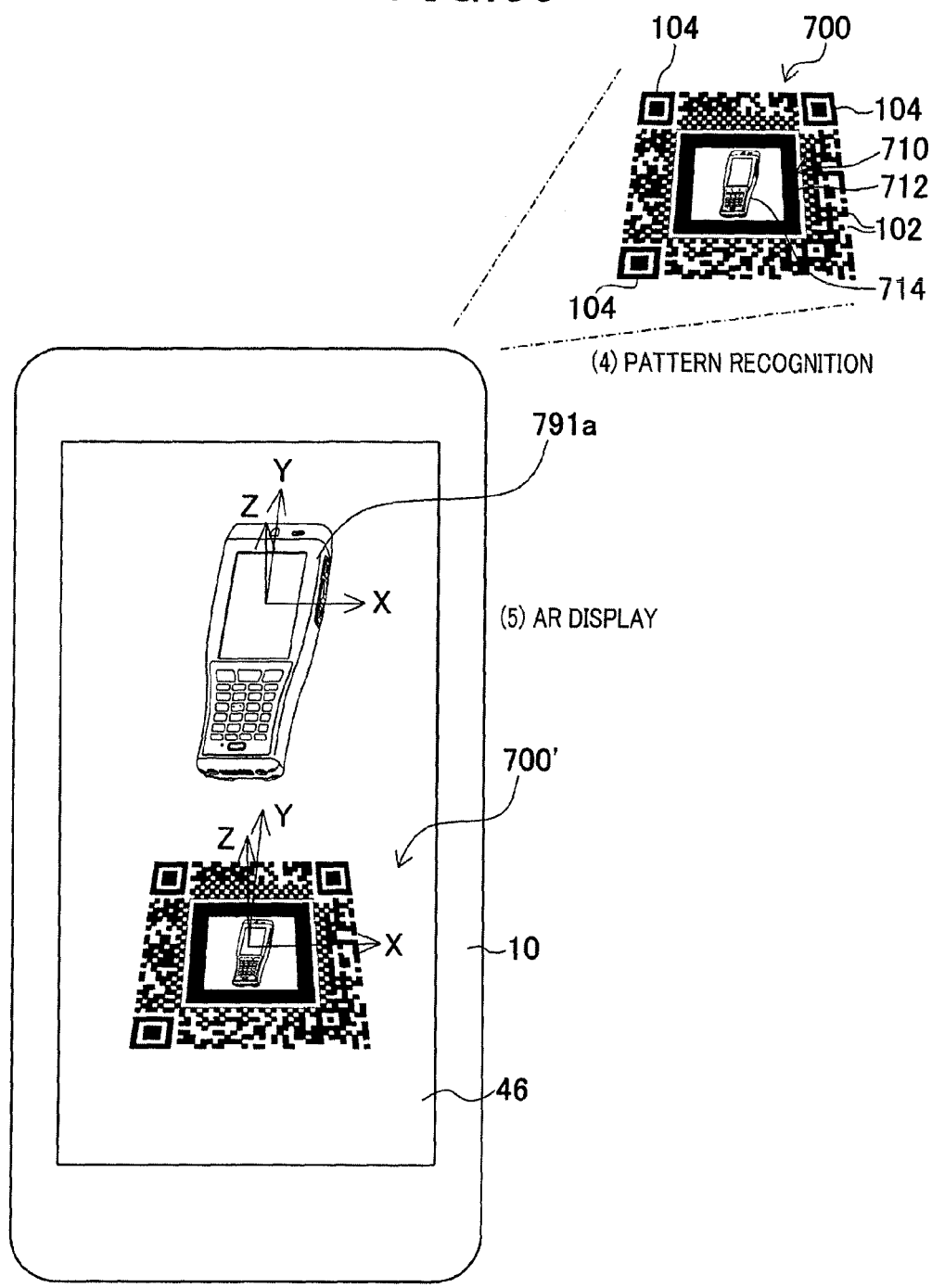
FIG. 56 is an explanatory diagram that conceptually explains AR display in the application example in FIG. 55.

FIG. 55 and FIG. 56 show operation examples of augmented reality display.

When augmented reality display is performed using the information code 700 such as this, first, the light receiving sensor 23 (imaging unit) of the reader 10 shown in FIG. 2 captures an actual image of an imaging area set outside of the reader. At this time, for example, the captured image captured by the light receiving sensor 23 is displayed in the liquid crystal display 46 (FIG. 2) in real time. Then, when the actual image captured by the light receiving sensor 23 (imaging unit) includes an image of the information code 700, the reader 10 reads the information code 700 (see (1) in FIG. 55). The method of reading the information code 700 is similar to that according to the first embodiment and the like. The address information (such as a URL or an email address) of the management apparatus 790 (server) is recorded and specification information specifying the augmented reality image is recorded in the data recording region of the information code. Therefore, the reader 10 obtains these pieces of information by reading the information code 700.

When such information is obtained, the reader 10 accesses the management apparatus 790 based on the obtained address information and requests the augmented reality image corresponding to the obtained specification information (information specifying the augmented reality image) (see (2) in FIG. 55). For example, candidate images such as images 791a, 791b, and 791c are registered in the management apparatus 790 (server) as three-dimensional image data. When the specification information (information specifying the augmented reality image) obtained by the reader 10 specifies the image 791a, a request for the image 791a is made. In this case, the management apparatus 790 (server) transmits the three dimensional image of the requested image 791a to the reader 10 (see (3) in FIG. 55).

Meanwhile, when reading the information code 700 in (1) in FIG. 55, the reader identifies the free space 710 from the code image of the information code 700 by a method similar to that according to the first embodiment or the like. The reader 10 then detects the augmented reality marker 712 from the image of the identified free space 710 (see (4) in FIG. 56). The method for detecting the augmented reality marker 712 may be, for example, a publically known method used in augmented reality technology. The method is not particularly limited as long as the method is capable of detecting the augmented reality marker 712 from the image. As a result of the augmented reality marker 712 being recognized, the posture can be detected from the shape of the augmented reality marker 712. For example, a coordinate system of an imaging space is identified such that the direction perpendicular to the surface on which the augmented reality marker 712 is attached is Z direction, the direction of a predetermined side of the augmented reality marker 712 is X direction, and a direction perpendicular to the Z direction and the X direction is Y direction.

Then, the augmented reality image obtained from the management apparatus 790 (server) is superimposed on the actual image captured by the light receiving sensor 23 (imaging unit) such as to match the orientation of the identified coordinate system. In the example in FIG. 56, an example is shown in which an augmented reality image of the information terminal is superimposed. The augmented reality images 791*a*, 791*b*, and 791*c* registered in the management apparatus 790 (server) is composed of three-dimensional image data. The X direction, Y direction, and Z direction are specified for each augmented reality image. Therefore, the augmented reality image is superimposed such that the X direction, Y direction, and Z direction of the augmented reality image matches the X direction, Y direction, and Z direction specified by the augmented reality marker 712. When the positional relationship between the augmented reality marker 712 and the reader 10 changes, the posture of the augmented reality marker 712 displayed in the liquid crystal display 46 changes, and the X direction, Y direction, and Z direction of the displayed image changes, the display posture of the augmented reality image is changed to match the X direction, Y direction, and Z direction after the change.

Here, an example is given in which the augmented reality image is superimposed-displayed on the actual image captured by the light receiving sensor 23 (imaging unit) of the reader 10. However, the background may be changed to an image other than the actual image and superimposed-displayed.

In the present configuration, the control circuit 40 in FIG. 2 corresponds to an example of a region detecting unit. The control circuit 40 functions to detect an image of the code region from an actual image captured by the light receiving sensor 23 (imaging unit). Furthermore, the control circuit 40 corresponds to an example of a free space identifying unit. The control circuit 40 functions to analyze the image of the code region detected by the region detecting unit and identify the position of the free space 710.

In addition, in the present configuration, the control circuit 40 of the reader 10 in FIG. 2 corresponds to an example of an image processing unit and a marker detecting unit. When an image of the information code is included in an actual image captured by the imaging unit, the control circuit 40 functions to detect the reference graphical form (augmented reality marker 712) from the obtained captured image of the information code 700. Specifically, the control circuit 40 functions to detect an image of the augmented reality marker 712 from the free space 710 identified by the free space identifying unit.

The light receiving sensor 23 in FIG. 2 corresponds to an example of an imaging unit that captures an actual image of an imaging area set outside of the information code reader 10. In addition, the liquid crystal display 46 in FIG. 2 corresponds to an example of a display unit that is capable of displaying the actual image captured by the imaging unit. Furthermore, the control circuit 40 in FIG. 2 corresponds to an example of a display control unit. When the image of the augmented reality marker 712 is detected by the marker detecting unit, the control circuit 40 functions to superimpose the augmented reality image on the actual image captured by the imaging unit and display the augmented reality image in the display unit. More specifically, when the image of the augmented reality marker 712 is detected by the marker detecting unit, the control circuit 40 functions to superimpose the augmented reality image (more specifically, the augmented reality image to be displayed that is specified by the specification information obtained by the specification information obtaining unit) of a display candidate corresponding to related content (image 714 in the example in FIG. 54 and the like) displayed in the free space 710 on the actual image captured by the imaging unit, and display the augmented reality image in the display unit.

In addition, the control circuit 40 corresponds to an example of the address information obtaining unit. The control circuit 40 functions to obtain the address information from the data recording region of the information code 700. Furthermore, the control circuit 40 corresponds to an example of a requesting unit. The control circuit 40 functions to request the augmented reality image from the transmission destination specified by the address information obtained by the address information obtaining unit.

In addition, the control circuit 40 in FIG. 2 corresponds to an example of the specification information obtaining unit. The control circuit 40 functions to obtain the specification information (information specifying the augmented reality image to be superimposed-displayed) from the data recording region. When the image of the augmented reality marker 712 is detected by the marker detecting unit, the control circuit 40 functions to superimpose the augmented reality image to be displayed that is specified by the specification information on the actual image captured by the light receiving sensor 23 (imaging unit) and display the augmented reality image in the display unit.

In the present configuration, the information code 700 in which the reference graphical form having the predetermined shape is provided within the image region serves as an object to be read, The information code 700 can be used not only as a data medium, but also as a reference medium for performing image processing. When a portion within the code region is used as an AR marker used in augmented reality technology as in the present configuration, the information code 700 can be applied as an element in augmented reality technology.

In addition, the augmented reality marker 712 can be detected after narrowing down to the area within the identified code region, upon detection of the information code 700. Therefore, the augmented reality marker 712 can be more easily and accurately detected.

Furthermore, an image that does not easily affect reading and augmented display can be freely placed within the code region of the information code 700. Therefore, convenience is increased. In particular, when the image related to the planned augmented reality image is displayed in the code region as in the present configuration, the augmented reality image can be ascertained or predicted before reading. Therefore, convenience is further increased.

Other Embodiments Related to the First to Ninth Embodiments

The present invention is not limited to the embodiments that are described above and in the drawings. For example, the following embodiments are also encompassed in the technical scope of the present invention.

According to the first embodiment and the like, position data (such as the image region position information shown in FIG. 3) that indicates the position of an information input region is included within the information code 100. However, the present invention is not limited to this example. For example, the information code producing apparatus 2 may be configured to produce an information code such that the image region is arranged in a predetermined position determined in advance in the free space. In this case, the information specifying the predetermined position (information such as the image region position information shown in FIG. 3) may be stored in the storage 5. In addition, in this case, in a manner similar to the information code producing apparatus 2, the information code reader 10 may store the specification information specifying the predetermined position (information such as the image region position information shown in FIG. 3) in the memory 35. Then, at S45 in FIG. 9, the information code reader 10 may read the specification information such as this from the memory 35 and identify the information input region, and perform subsequent processes thereafter. In this case, the image region position information shown in FIG. 3 may not be included in the header data.

The present invention can also be configured as a display apparatus that is capable of displaying any one of, a plurality of, or all of information codes described above. In addition, the present invention can also be configured as a printing apparatus that is capable of printing any one of, a plurality of, or all of information codes described above. Furthermore, the present invention can be configured as a computer-readable program for producing any one of, a plurality of, or all of information codes described above. In addition, the present invention can also be configured as a recording medium in which is recorded a program for producing any one of, a plurality of, or all of information codes described above. Furthermore, the present information can be understood to be an information code medium (an article configured by printed matter, direct marking, or the like) to which is attached any one of, a plurality of, or all of information codes described above. In addition, the present invention can be understood to be a display image displaying any one of, a plurality of, or all of information codes described above.

In the configuration in FIG. 1 and the like, an example is shown in which the information code producing apparatus 2 and the information code reader 10 are configured to be separate apparatuses. However, the information code producing apparatus 2 may also be configured as the information code reader 10. In addition, the information code producing apparatus 2 may be configured by a plurality of apparatuses. The information code reader 10 may be configured by a plurality of apparatuses.

According to the above-described embodiments, an example is given in which the free space 110 is provided in the center portion of the code region. However, the arrangement of the free space 110 is not limited to this example. In a similar manner, the position of the image region 121 is also not limited to the above-described example. For example, a free space may be provided near the peripheral edge of the code region, and the image region 121 may be provided in this position. In addition, as the design in the image region, various other designs may be used as long as the configuration is composed of a graphical form, a pattern, a color, or a combination thereof. In addition, when information is displayed instead of or in addition the design, the content of the information varies.

According to the above-described embodiments, the QR code is given as an example of the other type of code. The specification patterns of the QR code are given as the examples of the specification patterns used in the information code 100. However, a two-dimensional code of a type other than the QR code may also be used. For example, a data matrix code may be used as the other type of code. The specification patterns of the data matrix code may be used as the specification patterns of the information code 100.

Figure 7:
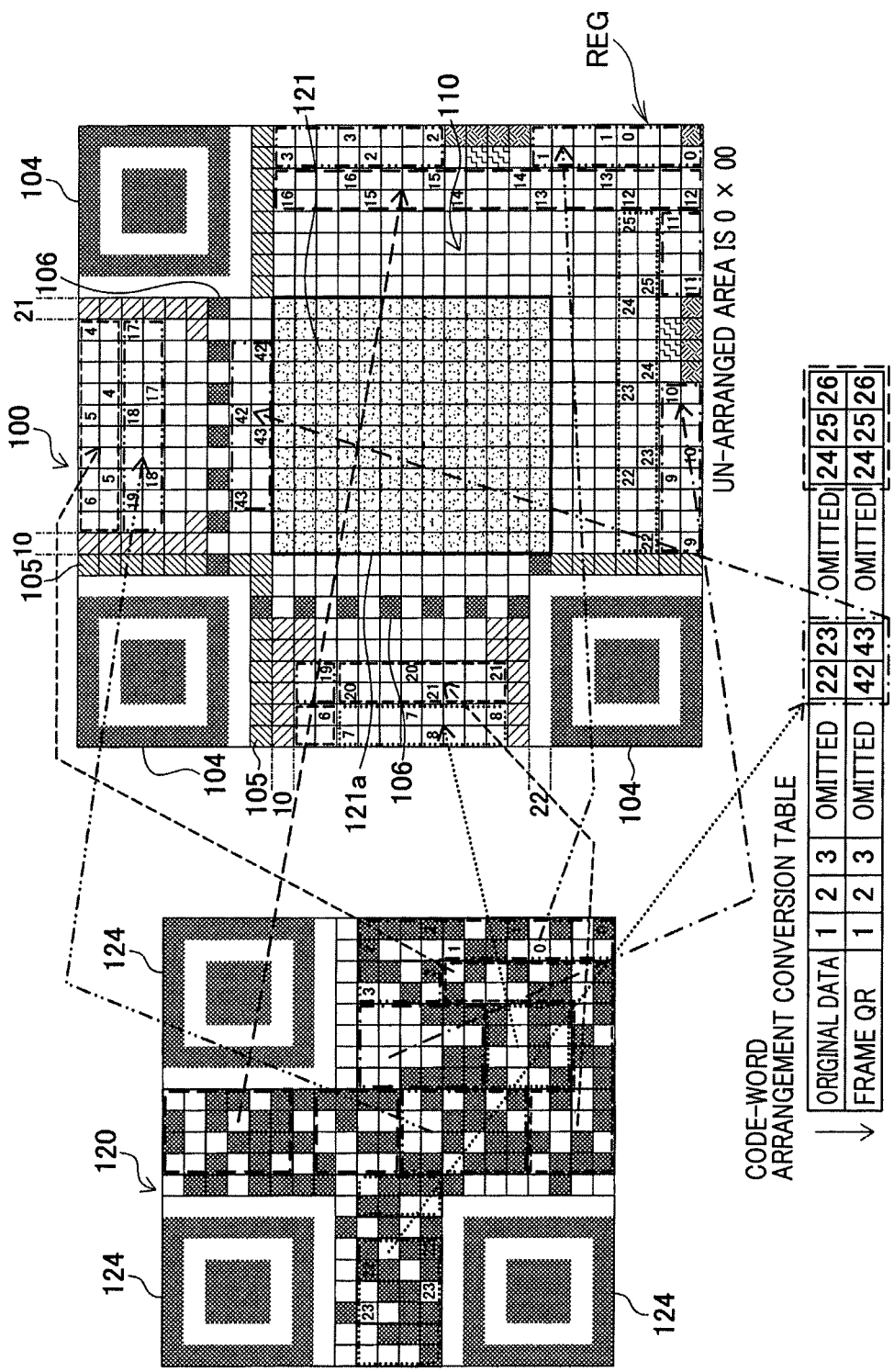
FIG. 7 is an explanatory diagram that explains the correspondence between the arrangement of each data word in an information code produced by the information code producing apparatus configuring the system which uses an information code in FIG. 1 and the arrangement of each data word in the other type of code, that has been changed to a correspondence differing from that in FIG. 5.

The correspondence in the arrangement conversion table set as in FIG. 5 can be arbitrarily changed as in FIG. 7. For example, when the arrangement conversion table set as in FIG. 5 in the information code producing apparatus 2 and the information code reader 10 is changed to that in FIG. 7, in the produced information code 100, the arrangement of the 22nd to 23rd code words is changed from that in the right-hand diagram in FIG. 5 (arranged to be recorded in the 22nd to 23rd arrangement candidate positions) to that in the right-hand diagram in FIG. 26 (arranged to be recorded in the 42nd to 43rd arrangement candidate positions). As a result, the position and shape of the free space 110 is also changed. In this case, the 22nd to 23rd arrangement candidate positions may serve as the free space or as arrangement positions for other code words. In other words, in this configuration, the position and shape of the free space 110 can be adjusted by the arrangement conversion table being adjusted. The degree of freedom when configuring the free space can be further increased.

According to the above-described embodiments, an example is given in which the free space 110 is provided and the image region is provided within the free space 110. However, the present invention is not limited to this example. For example, an image such as that described above can be provided by overwriting or the like in the cell arrangement region of a typical two-dimensional code (such as a QR code) capable of error correction. The data in the region broken by the image region such as this may be restored by error correction.

According to the above-described embodiments, an example is given in which the image region identified at S46 in FIG. 9 is extracted as a bit map image, and the processes at S47 and S48 are performed in bit map format. However, the present invention is not limited to this example. For example, the image in the image region identified at S46 in FIG. 9 may be extracted as a white and black information image in cell units, and image processing may thereafter be performed. In other words, after the information code 100 such as that in FIG. 1 and the right-hand drawing in FIG. 5 is divided into each sell region and each sell region is identified, the dell regions of the image region identified at S46 may be extracted as an light and dark information image (an image in which each cell region in the image region is expressed by white or black). Image processing may then be performed by a method differing from that of the data interpretation process performed on the data recording region. For example, light and dark determination of each cell region (each cell region within the image region when the inside of the code region is divided into cell regions of a plurality of rows and a plurality of columns) within the image region identified at S46 may be performed in a manner similar to that for the data recording region. A white and black information image of the image region may then be generated such that all cell regions determined to be light are light colored (such as white) and all cell regions determined to be dark colored are dark colored (such as black). Image processing such as this can be used in any of the embodiments. In addition, the present invention is not limited to such image processing method. Image processing may be performed by extracting the overall identified image region as a binary image or a grayscale image.

Figure 57:
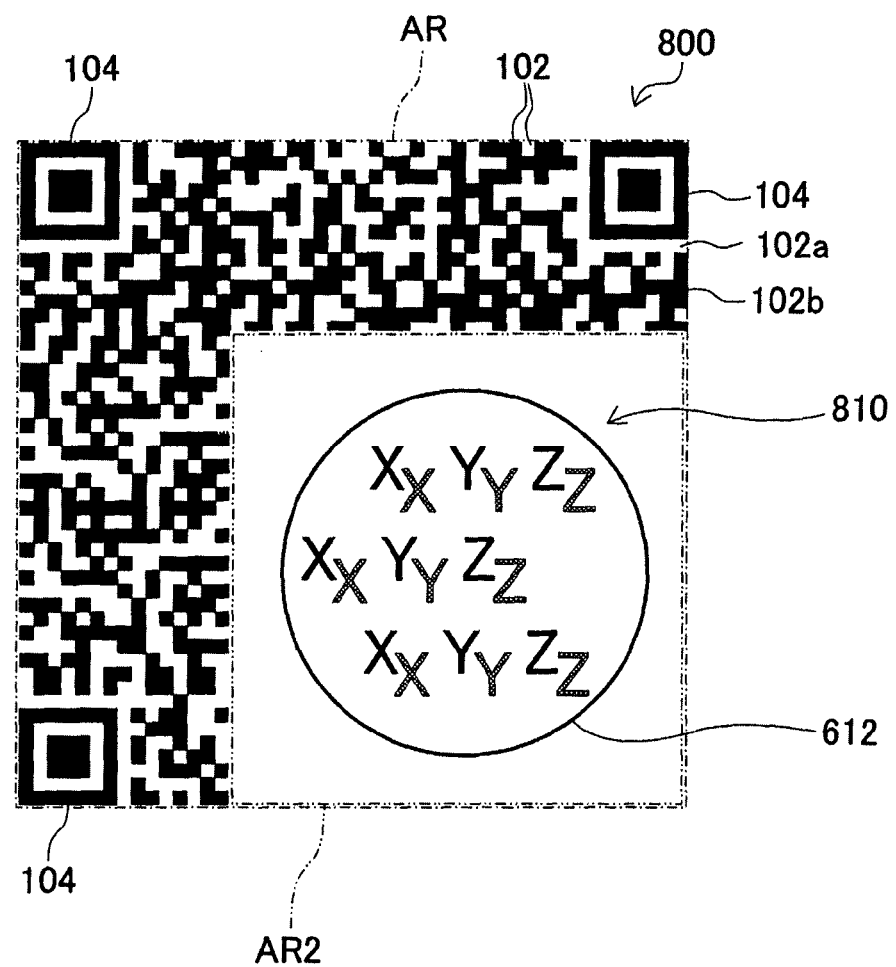
FIG. 57 is an explanatory diagram that explains an information code used in a system which uses an information code according to another embodiment.
Figure 58:
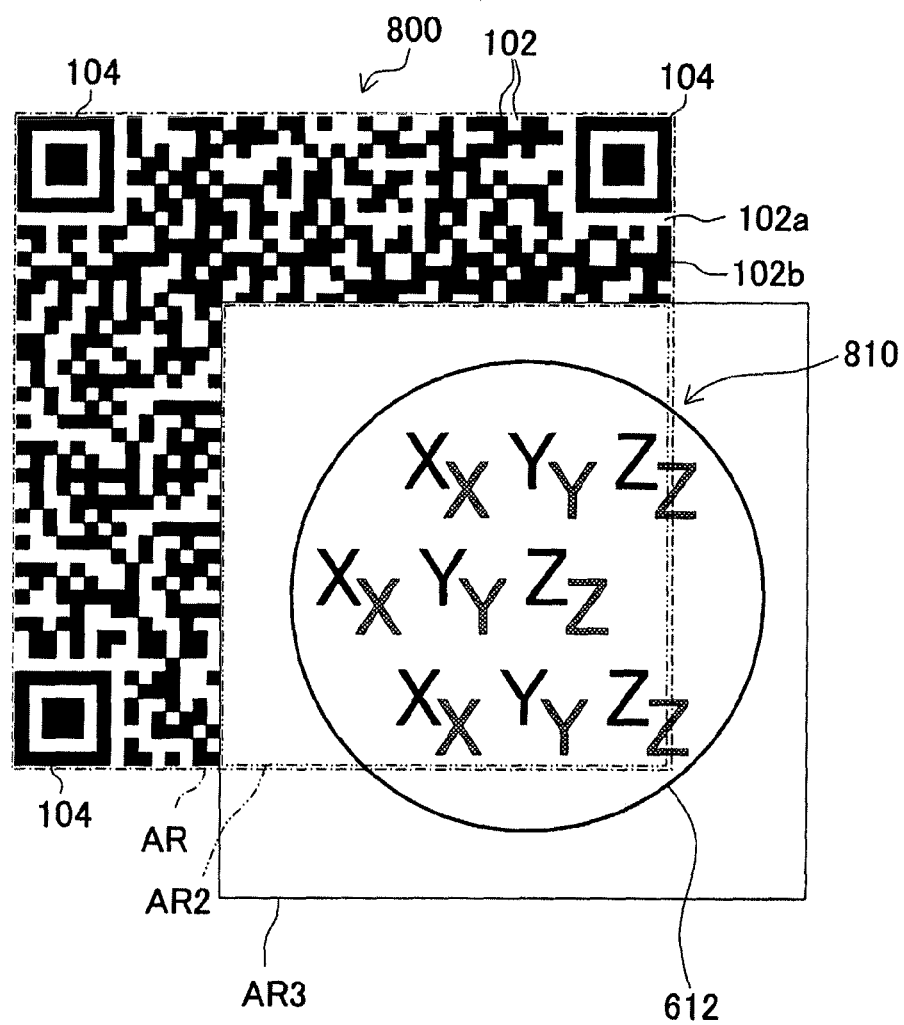
FIG. 58 is an explanatory diagram that explains an other example of an information code used in a system which uses an information code according to another embodiment.

According to the above-described embodiment, an example of a "code region" is given. However, the "code region" is merely required to be the smallest square region or oblong region that includes all cells of a plurality of types configuring the information code. A cell may not be arranged in a portion of the inner edge portion of the code region. For example, a free space 810 may be formed adjacent to the peripheral edge portion of the code region, as in an information code 800 in FIG. 57. In this case, the smallest square region or oblong region that includes all cells of a plurality of types configuring the information code 800 is like the single-dot chain line AR. The outer edge of the free space 810 is, for example, like the double-dot chain line AR2. In addition, at least a portion of the image region to be recognized is merely required to be present within the code region. A configuration in which a remaining portion is present outside of the code region, as in the image region AR3 in FIG. 58, is also possible. In the example in FIG. 58, information specifying the range of the image region AR3 may be recorded in advance in the data recording region.

According to the above-described embodiments, light colored cells such as white cells and dark colored cells such as black cells are given as examples of the cells of a plurality of types configuring the code region. However, the specification pattern regions, the data recording region, and the error correction code recording region within the code region may be composed of first type cells having a predetermined concentration, luminance, and hue, and second type cells of which any of the concentration, luminance, and hue differs from that of the first type cell. Alternatively, the specification pattern regions, the data recording region, and the error correction code recording region within the code region may be composed of cells of three or more types that each differ in terms of any of the concentration, luminance, and hue.

According to the above-described embodiment, an example is given in which a plurality of cells having a square outer shape are arranged in the specification pattern regions, the data recording region, and the error correction code recording region within the code region, arranged. However, the outer shape of the cell may be a quadrangle other than a square, and may also be a graphical form other than a quadrangle, such as a polygon, a circle, or an ellipse.

In the foregoing embodiments, the specification patterns may be fixed patterns, not limited to the position detection patterns 104, timing patterns 106, and aliment patterns 108. Independently of contents of the data recording region and the error-correction-code recording regions, the figures for the fixed patterns may be changed.

According to the above-described embodiment, an example of the free space is given. However, the free space is merely required to be a region in which data to be interpreted is not recorded by the cells, and display of information or display of an image is performed by a method differing from the method for recording data in the data recording region. For example, as according to the first embodiment, the free space may be configured as a region in which no code words are arranged at all. A region in a publically known QR code or the like in which the error correction code words expressing the error correction codes and the data code words expressing the data to be interpreted are not arranged and filler code words are arranged may serve as the free space. In addition, in either free space, "display of information by a method differing from the method for recording data in the data recording region by the cells" can be performed. In addition to the information given as examples according to the above-described embodiments, for example, the display of information may involve other information composed of characters, numeric characters, and other symbols. The method for displaying image may be that in which a specific item or service is indicated by a trademark or the like. In addition, "display of an image is performed by a method differing from the method for recording data in the data recording region" can be performed in the free space. In addition to the images given as examples according to the above-described embodiments, the display of an image enables various shapes, patterns, colors, and combinations thereof to be shown.

Figure 59:
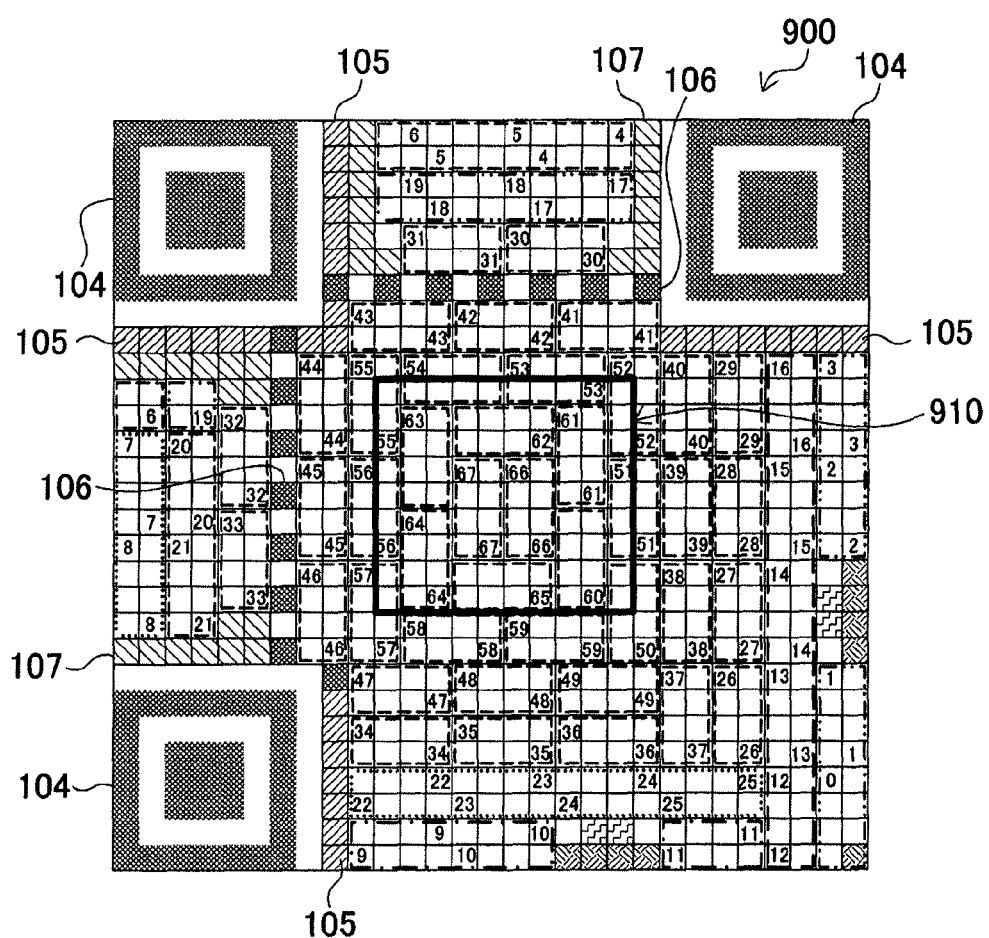
FIG. 59 is an explanatory diagram that explains a second other example of an information code used in a system which uses an information code according to another embodiment.

In addition, a configuration such as an information code 900 in FIG. 59 is also possible. The example is configured to be provided with a free space similar to that according to the first embodiment. However, the configuration differs from that according to the first embodiment only in terms of specification of the free space. In the example in FIG. 59, specific contents of regions other than some of the specification patterns are omitted. In actuality, light colored cells and dark colored cells are arranged in the outside region outside of the free space 910. In addition, an image similar to that in the free space 110 according to the first embodiment or an image similar to that in the free spaces according to the other embodiments, for example, is displayed within the free space 910.

In the present configuration as well, a plurality of versions are prepared for the type of the information code 900. The number of rows and the number of columns of the cells, the shapes and positions of the specification patterns, the position of the format information, and the candidate positions (addresses) of the code words are determined in advance for each version. When the producing apparatus 2 produces the information code 900, the version information is arranged in a position (a reserved region 107 in FIG. 59) determined within the code region. Therefore, when the reader 10 reads the information code 900, the reader 10 analyzes the code image of the information code 900 and reads the version information arranged in the predetermined position. As a result, the reader 10 can ascertain the number of rows and the number of columns of the cells, the shapes and positions of the specification patterns, the position of the format information, and the candidate positions (addresses) of the code words.

When the information code 900 is produced, any version is selected from among the plurality of versions prepared in advance. As a result, the basic configuration (the positions of the specification patterns 104, the number of rows and number of columns of the cells, and the candidate positions of the code words) within the code region is determined. For example, in the version having the configuration shown in FIG. 59, the cell arrangement is composed of 29 rows and 29 columns. Specification patterns 104 having the same structure as the clipping symbol of the QR code (registered trademark) are arranged in three corner portions determined in advance. A region (predetermined position 105) for recording the format information is provided in a predetermined position near the specification patterns 104. In addition, in the matrix region composed of 29 rows and 29 columns, the candidate positions of the code words are prescribed in advance in positions other than those of the specification patterns 104 and the predetermined position 105. An address from 0 to 67 is assigned to each candidate position. In this way, the configuration within the code region is prescribed in advance by the configuration corresponding to the version. Therefore, as long as the version is identified, the sequence of the code words and the positions in which to arrange the code words can be identified. The information on the determined version is recorded in a fixed position determined in advance in the arrangement of the version. For example, in the example in FIG. 59, the version information is recorded in the region 107 that is identified by shading of a predetermined type.

When the version is determined and the basic configuration within the code region is determined, the shape and position of the free space is determined. As the method for determining the shape of the free space, for example, the shape may be determined by a method in which the shape is selected from among a plurality of candidate shapes prepared in advance. Alternatively, the shape may be determined by a method in which a shape is set based on shape designation information inputted in the information code producing apparatus 2 from outside. Alternatively, the shape may be determined to be only a determined fixed shape. In addition, the position of the free space may be determined to be a predetermined fixed position, or the position may be determined by user input of information designating the position.

After the free space is determined, the information code 900 is produced by a configuration in which the code words in the data recording region and the code words in the error correction code recording region are each arranged in code word candidate positions outside of the determined position of the free space. For example, in the version that has a configuration such as that in FIG. 59, the specification patterns 104 are arranged in the three corner portions. With reference to the positions of the specification patterns 104, 68 code word candidate positions that are numbered from 0 to 67 are prescribed in advance. In such a layout, when the free space 910 is determined as in FIG. 59, code word candidate positions of which at least a portion falls within the free space 910 are excluded from the arrangement subject positions. The code words are arranged in sequence such as to skip the excluded code word positions. For example, in the example in FIG. 59, the free space 910 is set such as to fall within the 50th, 51st, 53rd, 54th, and 60th to 67th code word candidate positions. Therefore, the code words are not arranged in the 50th, 51st, 53rd, 54th, and 60th to 67th code word candidate positions. In other words, after the code words are arranged in sequence in the 0th to 49th positions, the 50th and 51st positions are skipped. A code word is arranged in the 52nd position. Then, the 53rd and 54th positions are skipped. The code words are arranged in sequence in the 55th to 59th positions. As a result, the data code words that are the encoded data to be interpreted and the error correction code words indicating the error correction codes can be arranged with certainty in the candidate positions outside of the free space 910.

After the specification pattern regions (regions of the specification patterns 104 and other specification patterns), the format region (predetermined position 105), the version region 107, each code word region, and the like are determined, the specific content of the free space 910 is determined. In the information code 900 as well, the information code 900 having a function similar to that in FIG. 1 can be configured by an image similar to that in the free space 110 being presented in the free space 910. The method for using the information code 900 is similar to those according to the first embodiment and other embodiments.

REFERENCE SIGNS LIST

1 system which uses an information code
2: information code producing apparatus
3: control unit
10: information code reader
23: light receiving sensor (imaging unit)
35: memory (registering unit)
40: control circuit (data recording region reading unit, image processing unit, output unit)
46: liquid crystal display (output unit)
48: communication interface (output unit)
90: external apparatus (authentication apparatus)
100: information code
102: cell
104: position detecting pattern (specification pattern)
110: free space (image region)
REG: code region
R: medium carrying information code

The invention claimed is:

1. A method of producing an information code by an information code producing apparatus,
the method comprising:
arranging, in a code region of the information code formed on a medium, i) a specification pattern region in which predetermined-shape specification patterns are arranged, the specification patterns including patterns indicating a position of the code region, and ii) a data recording region in which information is recorded based on a plurality of types of cells, each of the cells functioning as a unit of information; and
configuring, in the code region, an image region to which a recognition process is applied by an information code reader, the recognition process being independent of a decoding process applied by the information code reader to the cells of the data recording region.

2. The method of claim 1, wherein
the code region includes the specification pattern region, the data recording region, and an error-correction-code recording region in which error correction codes are recorded with a plurality of types of the cells.

3. The method of claim 1, comprising:
arranging, inside the code region, a free space at a position located outside both the specification pattern region and the data recording region, the free space having a size larger in area than a single cell of the cells, the free space having no data being interpreted based on the cells.

4. The method of claim 1, comprising:
recording, into the data recording region, position data showing a position of the image region which is located in the code region, the image region being recognized as an image by the information code reader.

5. The method of claim 1, comprising:
recording, into the data recording region, identification information showing that the image region is present in the code region, the image region being recognized as an image by the information code reader.

6. The method of claim 1, wherein
the image region recording step records the image region as a region in which a signature is recorded.

7. The method of claim 1, wherein
the configuring step configures the image region as a free space, the free space having a size larger in area than a single cell of the cells, information depicted in the free space being prevented from being decoded by the decoding process applied to the cells.

8. An information code comprising:
a code region;
a specification pattern region on is arranged in the code region of the information code formed on a medium, predetermined-shape specification patterns being arranged in the specification pattern region, the specification patterns including patterns indicating a position of the code region;

a data recording region arranged in the code region, information being recorded in the data recording region based on a plurality of types of cells, each of the cells functioning as a unit of information; and an image region is configured in the code region, a recognition process being applied to the image region, the recognition process being independent of a decoding process applied to the cells of the data recording region.

9. The information code of claim 8, wherein the code region includes the specification pattern region, the data recording region, and an error correction code recording region in which an error correction code is recorded based on a plurality of types of the cells.

10. The information code of claim 8, wherein a free space is disposed in a position other than the specification pattern region and the data recording region inside the code region, the free space being a region in which no data being interpreted is recorded by the cells, the free space having a predetermined size in area larger than a size of a single cell of the cells.

11. The information code of claim 8, wherein position data is recorded in the data recording region, the position data showing a position of the image region which is located in the code region.

12. The information code of claim 8, wherein identification information is in the data recording region, the identification information indicating that the image region is present in the code region.

13. The information code of claim 8, wherein the image region is configured as a region in which a signature is recorded.

14. An information code reader which reads an information code,
the information code comprising:
a code region;
a specification pattern region arranged in the code region of the information code formed on a medium, predetermined-shape specification patterns being arranged in the specification pattern region, the specification patterns including patterns indicating a position of the code region;
a data recording region arranged in the code region, information being recorded in the data recording region based on a plurality of types of cells, each of the cells functioning as a unit of information; and
an image region configured in the code region, recognition process being applied to the image region, the recognition process being independent of a decoding process applied to the cells of the data recording region, and
the information code reader comprising:
an imaging unit imaging the information code as a code image;
a data-recording-region reading section reading the data recorded in the data recording region based on contents of the data recording region provided in the code image of the information code when the information code is imaged by the imaging unit; and
an image processing section performs a process for recognizing an image of the image region provided in the code image, based on a method which is different from an interpretation process to be applied to the data performed by the data-recording-region reading section.

15. The information code reader of claim 14, wherein the information code comprises, in the code region, the specification pattern region, the data recording region, and an error-correction-code recording region in which error correction codes are recorded with a plurality of types of the cells.

16. The information code reader of claim 14, wherein the information code comprises, inside the code region, a free space at a position located outside both the specification pattern region and the data recording region, the free space having a size larger in area than a single cell of the cells, the free space having no data being interpreted based on the cells.

17. The information code reader of claim 14, wherein the information code includes predetermined identification information in the data recording region, and
the image processing section performs the process for recognizing the image of the image region, based on results read from the data recording region by the data-recording-region reading section, when the identification information is recorded in the data recording region.

18. The information code reader of claim 14, wherein the information code reader comprises a storage in which a pattern image is registered, the pattern image being compared with the image of the image region,
wherein the image processing section determines whether or not the image of the image region included in the code image corresponds to an image registered in the storage via a consistent judgment between the image of the image region and the pattern image registered in the storage.

19. The information code reader of claim 18, wherein a signature image is registered in the storage as the pattern image; and
the image processing section determines whether or not the image of the image region included in the code image corresponds to the signature image registered in the storage via a consistent judgment between the image of the image region and the signature image registered in the storage.

20. A system which uses an information code, comprising:
an information code producing apparatus producing an information code in which cells are arranged inside a predetermined code region of a medium, each of the cells functioning as a unit of information; and
an information code reader reading the information code produced by the information code producing apparatus,
wherein the information code producing apparatus produces the information code comprising:
a code region:
a specification pattern region arranged in the code region of the information code formed on the medium, predetermined-shape specification patterns being arranged in the specification pattern region, the specification patterns including patterns indicating a position of the code region;
a data recording region arranged in the code region, information being recorded in the data recording region based on a plurality of types of the cells; and
an image region configured in the code region, a recognition process being applied to the image region, the recognition process being independent of a decoding process applied to the cells of the data recording region, and wherein the information code reader comprises:

an imaging unit imaging the information code as a code image;

a data-recording-region reading section reading the data recorded in the data recording region based on contents of the data recording region provided in the code image of the information code when the information code is imaged by the imaging unit; and an image processing section performing a process for recognizing an image of the image region provided in the code image, based on a method which is different from an interpretation process to be applied to the data performed by the data-recording-region reading section.

* * * * *

UNITED STATES PATENT AND TRADEMARK OFFICE
CERTIFICATE OF CORRECTION

PATENT NO. : 9,704,081 B2
APPLICATION NO. : 14/654119
DATED : July 11, 2017
INVENTOR(S) : Masami Tanaka et al.

It is certified that error appears in the above-identified patent and that said Letters Patent is hereby corrected as shown below:

In the Claims

Column 86, Line 62 (Claim 8): change "region on is arranged" to -- region arranged --
Column 87, Line 5 (Claim 8): change "region is configured" to -- region configured --
Column 87, Line 62 (Claim 14): change "section performs a process" to -- section performing a process --

Signed and Sealed this
Seventh Day of November, 2017

Joseph Matal
*Performing the Functions and Duties of the*
*Under Secretary of Commerce for Intellectual Property and*
*Director of the United States Patent and Trademark Office*